US008481178B2

(12) United States Patent
Watanabe et al.

(10) Patent No.: US 8,481,178 B2
(45) Date of Patent: Jul. 9, 2013

(54) IRON POWDER COATED WITH MG-CONTAINING OXIDE FILM

(75) Inventors: Muneaki Watanabe, Kuki (JP); Ryoji Nakayama, Kashiwa (JP); Gakuji Uozumi, Mito (JP)

(73) Assignee: Diamet Corporation, Niigata-Shi (JP)

(*) Notice: Subject to any disclaimer, the term of this patent is extended or adjusted under 35 U.S.C. 154(b) by 0 days.

(21) Appl. No.: 13/228,139

(22) Filed: Sep. 8, 2011

(65) Prior Publication Data

US 2012/0138844 A1 Jun. 7, 2012

Related U.S. Application Data

(62) Division of application No. 11/814,603, filed as application No. PCT/JP2005/020204 on Nov. 2, 2005.

(30) Foreign Application Priority Data

| Jan. 25, 2005 | (JP) | 2005-016516 |
| Jan. 25, 2005 | (JP) | 2005-016517 |
| Mar. 28, 2005 | (JP) | 2005-091053 |
| Apr. 20, 2005 | (JP) | 2005-122679 |
| May 27, 2005 | (JP) | 2005-155206 |
| May 27, 2005 | (JP) | 2005-155207 |
| May 31, 2005 | (JP) | 2005-158892 |
| May 31, 2005 | (JP) | 2005-158893 |
| May 31, 2005 | (JP) | 2005-159770 |
| Jun. 1, 2005 | (JP) | 2005-161479 |
| Jun. 1, 2005 | (JP) | 2005-161480 |
| Aug. 9, 2005 | (JP) | 2005-231191 |

(51) Int. Cl.
*B32B 15/00* (2006.01)

(52) U.S. Cl.
USPC .......... 428/692.1; 428/403; 252/62.51 R; 252/62.55; 252/62.56

(58) Field of Classification Search
None
See application file for complete search history.

(56) References Cited

U.S. PATENT DOCUMENTS

| 4,011,088 A * | 3/1977 | Makishima et al. ......... 106/1.17 |
| 2004/0161600 A1 * | 8/2004 | Igarashi et al. ............... 428/328 |

FOREIGN PATENT DOCUMENTS

| EP | 0810615 A2 | 5/1997 |
| EP | 0810615 A2 | 12/1997 |
| JP | 63-115309 A | 5/1988 |
| JP | 05-258934 | 10/1993 |

(Continued)

OTHER PUBLICATIONS

Calderon et al., "Production and Magnetic Properties of Nanocomposites Made of Ferrites and Ceramic Matrices." Mat. Res. Soc. Symp. Proc. 703. (2002): VS5.9.1-V5.9.6.*

(Continued)

*Primary Examiner* — Holly Rickman
*Assistant Examiner* — Lisa Chau
(74) *Attorney, Agent, or Firm* — Leason Ellis LLP.

(57) ABSTRACT

Oxide-coated Fe powder for producing various electromagnetic circuit components requiring high resistivity is provided. The oxide-coated Fe powder is a Mg-containing oxide film-coated iron powder coated with an Mg—Fe—O ternary-based deposition film at least containing (Mg, Fe)O. The (Mg,Fe)O is a crystalline MgO-dissolving wustite. The Mg—Fe—O ternary-based oxide deposition film has a sulfur-enriched layer containing a higher concentration of sulfur than that of central portion of the iron powder, fine crystalline texture having a grain size of 200 nm or less, and the outermost surface is substantially composed of MgO. A composite soft magnetic material using the Mg-containing oxide film-coated iron powder is also provided.

6 Claims, 8 Drawing Sheets

FOREIGN PATENT DOCUMENTS

| | | | |
|---|---|---|---|
| JP | 06-260319 A | | 9/1994 |
| JP | 06260319 A | * | 9/1994 |
| JP | 07-179982 A | | 7/1995 |
| JP | 09-180924 A | | 7/1997 |
| JP | 11-001702 | | 1/1999 |
| JP | 11-087123 A | | 3/1999 |
| JP | 11-144932 A | | 5/1999 |
| JP | 2001-254168 A | | 9/2001 |
| JP | 2003-142310 | | 5/2003 |
| JP | 2003-197416 A | | 7/2003 |
| JP | 2003-217919 A | | 7/2003 |
| JP | 2003-306704 A | | 10/2003 |
| JP | 2004-253787 | | 9/2004 |
| JP | 2004253787 A | * | 9/2004 |
| JP | 2004-297036 | | 10/2004 |
| WO | WO 01/58624 A1 | | 8/2001 |

OTHER PUBLICATIONS

International Search Report mailed Feb. 14, 2006 for the corresponding PCT patent application No. PCT/JP2005/020204, (Previously submitted Oct. 21, 2008 in the parent U.S. Appl. No. 11/814,603, omitted in the IDS filed Sep. 8, 2011.).

Japanese Office Action mailed on Mar. 16, 2010 for the corresponding Japanese patent application No. 2005-155207.

Japanese Office Action mailed on Jul. 20, 2010 for the corresponding Japanese patent application No. 2005-155206.

Japanese Office Action mailed on Jul. 27, 2010 for the corresponding Japanese patent application No. 2005-158893.

T. Honda et al., Phase Relations in the MgO-Rich Region of the System MgO-Fe2O3, Journal of the Ceramic Society of Japan, 2003, pp. 841.847, vol. 111, No. 11.

European Search Report Issued Feb. 17, 2010 for the corresponding European Patent Application No. 05805498.2.

Calderon et al. "Production and Magnetic Properties of Nanocomposites Made of Ferrites and Ceramic Matrices.", *Mat. Res. Soc. Symp. Proc.*, 2002, vol. 703, pp. V5.9.1-V5.9.6.

Office Action mailed Feb. 21, 2011 for the corresponding Japanese Application No. 2005-319247.

Office Action mailed Oct. 25, 2011 for the corresponding U.S. Appl. No. 11/814,603.

Office action mailed Jun. 19, 2012 for the corresponding U.S. Appl. No. 11/814,603.

Search Report mailed Apr. 4, 2013 for the corresponding European Patent Application No. 10172637.0.

* cited by examiner

70nm

05P00908

70nm

IRON POWDER COATED WITH MG-CONTAINING OXIDE FILM

CROSS REFERENCE TO PRIOR APPLICATIONS

This application is a Divisional of U.S. patent application Ser. No. 11/814,603, filed Dec. 8, 2008, which is a U.S. National Phase Application under 35 U.S.C. §371 of International Patent Application No. PCT/JP2005/020204 filed Nov. 2, 2005, and claims the benefit of Japanese Patent Applications No. 2005-016517, filed Jan. 25, 2005; No. 2005-016516, filed Jan. 25, 2005; No. 2005-091053, filed Mar. 28, 2005; No. 2005-122679, filed Apr. 20, 2005; No. 2005-155206, filed May 27, 2005; No. 2005-155207, filed May 27, 2005; No. 2005-159770, filed May 31, 2005; No. 2005-158893, filed May 31, 2005; No. 2005-158892, filed May 31, 2005; No. 2005-161479, filed Jun. 1, 2005; No. 2005-161480, filed Jun. 1, 2005 and No. 2005-231191, filed Aug. 9, 2005, all of which are incorporated by reference herein. The International Application was published in Japanese on Mar. 8, 2006 as WO 2006/080121 under PCT Article 21(2).

TECHNICAL FIELD

The present invention relates to an iron powder coated with an oxide film containing MgO, having deposition films of Mg—Fe—O ternary-based oxide formed on surfaces of iron powder particles, where at least (Mg, Fe)O is contained in the deposition films or ultra-fine particles of metallic iron are dispersed in the matrices of the deposition film, and to a deposition-film-coated iron powder for production of a composite soft magnetic material having high resistance. The composite soft magnetic material made of the iron powder coated with the Mg-containing oxide film is used as a material for electromagnetic circuit components requiring low core loss (iron loss), for example, various electromagnetic components such as motors, actuators, yokes, cores and reactors.

The present invention also relates to iron silicide powder coated with an oxide deposition film, having coatings of Mg—Si—Fe—O quaternary-based oxide including Mg, Si, Fe and O on surfaces of the iron silicide powder particles. The present invention also relates to a composite soft magnetic material made of a heat-treated compact (compacted powder article) of the coated iron silicide powder coated with an oxide deposition film, to a core of various electromagnetic components made of the composite soft magnetic material, and to electric devices, especially reactors, equipped with the core.

The present invention also relates to an oxide deposition film-coated iron-based Fe—Si-based soft magnetic material powder formed by coating oxide deposition films including Mg, Si, Fe and O on the surfaces of the iron-based Fe—Si-based soft magnetic material powder particles, and a method of producing the same. Composite soft magnetic materials manufactured using the oxide deposition-film coated iron-based Fe—Si-based soft magnetic material powder are used as materials for above-described various components of electromagnetic circuits requiring low core loss.

The present invention also relates to composite soft magnetic powder formed by, on the surfaces of Mg-containing-iron-oxide-film-coated iron powder which are formed by coating Mg—Fe—O ternary-based oxide deposition films comprising at least (Mg,Fe)O on the surfaces of the iron powder particles, further coating MgO—SiO$_2$ composite oxide films (preferably forsterite having a MgO/SiO$_2$ value of 2 in molar ratio). The present invention also relates to low core loss composite soft magnetic materials manufactured using the composite soft magnetic powder and having high strength, high magnetic flux density, and high resistance. The low core loss composite soft magnetic materials having high strength, high magnetic flux density, and high resistance can be used as materials for various components of electromagnetic circuits requiring low core loss, for example, various electromagnetic components such as motors, actuators, yokes, rotors, cores and reactors.

The present invention also relates to a composite soft magnetic powder formed by, on the surfaces of the Mg-containing-iron-oxide-film-coated iron powder which are formed by coating Mg—Fe—O ternary-based oxide deposition films in which fine particles of metallic Fe are dispersed in the matrix on the surfaces of the iron powder, further coating a MgO—SiO$_2$ composite oxide films (preferably composed of forsterite having MgO/SiO$_2$ ratio of 2 in molar ratio). The present invention also relates to low core loss composite soft magnetic materials manufactured using the composite soft magnetic powder and having high strength, high magnetic flux density, and high resistance. The low core loss composite soft magnetic materials having high strength, high magnetic flux density, and high resistance can be used as materials for various components of electromagnetic circuits requiring low core loss, for example, various electromagnetic circuit components such as magnetic cores, cores of electric motors, cores of electric generators, solenoid cores, ignition cores, reactors, transformers, choke-coil cores, and cores of magnetic sensors.

BACKGROUND ART

Since low core loss is generally required for soft magnetic materials used in various electromagnetic circuit components, it is generally known that hysteresis loss is reduced by reducing coercive force, and eddy current loss is reduced by increasing electric resistance. Moreover, because of recent requirements for down-sizing and high response of electromagnetic circuits, relatively high magnetic flux density is considered to be important.

A Mg-containing oxide film-coated iron powder formed by coating Mg-containing ferrite films having insulating property on the surfaces of the iron powder particles is known as an example of the above-described soft magnetic material having high resistivity (see Patent Reference 1).

A Mg-containing-chemical-conversion-film-coated powder formed by coating the Mg-containing-chemical-conversion-films on the surfaces of iron silicide powder particles is known as another example (see Patent Reference 2).

In addition, an iron-based Fe—Si-based soft magnetic powder containing 0.1 to 10 weight % of Si, and the balance consisting of Fe and unavoidable impurities is known as another example, Soft magnetic powder formed by coating materials of high resistance on the surfaces of the iron-based Fe—Si-based soft magnetic powder particles is also known. A manufacturing method of a composite soft magnetic material is known, where the soft magnetic material powder provided with the surface coating of high-resistance material is press-molded, and the obtained compact is heat-treated, thereby forming a composite soft magnetic material having high resistivity and a texture in which materials of high resistance exist in interstices of soft magnetic particles (see Patent Reference 3).

In another known method, a Mg-containing iron oxide film-coated iron powder coated with a Mg-containing ferrite film by a chemical process is mixed with glass powder having a low melting point to form a mixed powder, the mixed powder is press-molded and heat-treated, and a compact powder magnetic material is manufactured (see Patent References 4 or 5).

Patent Reference 1: Japanese Unexamined Patent Application, First Publication No, H11-1702.
Patent Reference 2: Japanese Unexamined Patent Application, First Publication No. 2003-142310.
Patent Reference 3: Japanese Unexamined Patent Application, First Publication No, H5-258934.
Patent Reference 4: Japanese Unexamined Patent Application, First Publication No. 2004-253787.
Patent Reference 5: Japanese Unexamined Patent Application, First Publication No. 2004-297036.

However, in the conventional Mg-containing oxide film-coated iron powder coated with the Mg-containing ferrite film, the Mg-containing ferrite film is coated on the surface of the iron powder through a chemical process. Therefore, in the composite soft magnetic material obtained by performing high-temperature heat treatment for reducing strain of a press-molded compact, the ferrite film is destabilized and changed, and its insulation property is deteriorated. In addition, bonding of the Mg-containing ferrite film to the surface of the iron powder is not sufficient, and a composite soft magnetic material having sufficient strength cannot be manufactured by press molding and subsequently baking the Mg-containing iron oxide film-coated iron powder. In composite soft magnetic materials manufactured by press molding and baking the Mg-containing oxide film-coated iron powder coated with the conventional Mg-containing ferrite film or by press molding and heat treating the mixed powder obtained by mixing the glass powder having a low melting point with the Mg-containing iron oxide film-coated iron powder coated with the Mg-containing ferrite film, the Mg-containing ferrite film cannot exert a sufficient insulation effect because of delamination during the press molding or the like, and therefore sufficient high temperature resistivity cannot be obtained.

In addition, in the chemical-conversion-film-coated iron silicide powder coated with the conventional Mg-containing chemical conversion film, since the Mg-containing chemical conversion film is coated by a chemical process, bonding strength of the oxide film to the iron silicide powder particle is weak and the oxide film itself has weak strength. Therefore, in the complex soft magnetic material manufactured by press molding and baking the conventional chemical conversion film-coated iron silicide powder, the chemical conversion film cannot exert a sufficient insulation effect because of delamination or tearing of the film during the press molding or the like, and therefore sufficient high temperature resistivity cannot be obtained. In addition, the chemical conversion film formed by coating the above-described Mg-containing chemical conversion film by a chemical process is sometimes degraded during the high temperature baking treatment for removal of strain, thereby reducing the resistance, and therefore, a complex soft magnetic material having sufficient high temperature resistivity cannot be obtained.

An Mg-containing ferrite oxide film may be considered as an example of high resistance material formed on the particle surface of the above-described iron-based Fe—Si-based soft magnetic powder. However, even when an iron-based Fe—Si-based soft magnetic powder coated with the Mg-containing ferrite oxide film is press-molded into a compact, and strain-relief heat treatment at a high temperature is performed on the compact, sufficient high-temperature resistivity cannot be obtained. Because the Mg-containing ferrite is generally unstable in relation to heat, its insulation property is easily reduced by the change of ferrite structure caused by heating. As a result, insulation property of the obtained composite soft magnetic material is reduced.

In addition, in the iron-based Fe—Si-based soft magnetic powder coated with the conventional Mg-containing ferrite oxide film, the Mg-containing ferrite oxide film is coated on the surface of powder particle through a chemical process. Therefore, bonding of the Mg-containing ferrite oxide film to the surface of iron-based Fe—Si-based soft magnetic powder particle is not sufficient. Therefore, in the composite soft magnetic material manufactured by press molding and heat-treating the iron-based soft magnetic powder coated with the conventional Mg-containing ferrite oxide film, delamination or breakdown of the Mg-containing ferrite oxide film or the like occur during press molding, and sufficient insulation effect cannot be exerted. Therefore, sufficient high resistivity could not be obtained.

DISCLOSURE OF THE INVENTION

The inventors performed research to manufacture a Mg-containing oxide film-coated iron powder having such properties that: the oxide film is firmly bonded to the surface of iron powder particle, and when the powder is press-molded, breakdown of a high resistance oxide film on the surface of the iron powder particle does not occur during the press molding; when strain-relief heat treatment at a high temperature is performed after press molding, surface insulation is not reduced, and the powder has high resistance, low eddy current loss; and a coercive force can be further reduced and hysteresis loss can be further reduced in the case of performing heat treatment of the powder for straightening annealing.

As a result, the below-described findings could be obtained. Firstly, iron powder (hereafter referred to as oxidation-treated iron powder) having a surface coating of iron oxide is formed by heating an iron powder in an oxidizing atmosphere.

The oxidation-treated iron powder is mixed with an Mg powder, and the obtained mixed powder is subjected to heating or the like in an inert gas atmosphere or in a vacuum atmosphere. After that, a second oxidization treatment is performed on the powder.

The following are the findings with respect to this powder.
(A) MgO—FeO—$Fe_2O_3$ ternary-based oxide is represented by, for example, (Mg,Fe)O and $(Mg,Fe)_3O_4$. Among this generally known Mg—Fe—O ternary-based oxide, at least (Mg,Fe)O is contained in Mg—Fe—O ternary-based oxide deposition films formed on the surfaces of iron particles. The Mg-containing oxide film-coated iron powder having a surface coating of the Mg—Fe—O ternary-based oxide deposition film containing at least (Mg,Fe)O is remarkably superior in bonding of the oxide film to the iron powder compared with the conventional Mg-containing oxide film-coated iron powder formed by coating an Mg-containing ferrite on the particle surface of iron powder. Therefore, there is a lesser possibility that the oxide film as an insulation film is broken down during the press molding and particles of the iron powder are made to contact with each other. Therefore, when the press-molded powder is subjected to strain-relief heat treatment (heat treatment for reducing strain) at a high temperature, high resistance is maintained without reducing the insulation property of the oxide film. Therefore, eddy current loss is lowered. In addition, since the coercive force can be further reduced by the strain-relief heat treatment, hysteresis loss can be reduced to a lower level. Therefore, a composite soft magnetic material of low core loss can be obtained.
(B) It is preferable that the (Mg, Fe)O contained in the Mg—Fe—O ternary-based oxide deposition film of the above-described Mg-containing-oxide-film-coated iron powder be a crystalline MgO-dissolving wustite (a solid solution of MgO and wustite (FeO)).

(C) A sulfur-enriched layer is formed in a boundary portion between the iron particle and the Mg—Fe—O ternary-based oxide deposition film at least containing (Mg,Fe)O. Sulfur concentration of the sulfur-enriched layer is higher than that of sulfur contained in a central portion of the iron particle as an unavoidable impurity.

(D) The above-described Mg—Fe—O ternary-based oxide deposition film at least containing (Mg, Fe)O has a fine crystalline texture having a grain size of 200 nm or less.

(E) It is preferable that an outer-most surface of the above-described Mg—Fe—O ternary-based oxide deposition film at least containing (Mg, Fe)O contain as much MgO as possible. Most preferably, the outermost surface is substantially composed of MgO.

The present invention is made based on the above-described findings and has the following aspects.

(1) A Mg-containing oxide film-coated iron powder comprising iron powder particles and Mg—Fe—O ternary-based oxide deposition films which contain at least (Mg,Fe)O and are coated on surfaces of the iron powder particles.

(2) A Mg-containing-oxide-film-coated iron powder as described in the above-described (1), wherein the (Mg,Fe)O contained in the Mg—Fe—O ternary-based oxide deposition films of the Mg-containing oxide film-coated iron powder is a crystalline MgO-dissolving wustite phase.

(3) A Mg-containing-oxide-film-coated iron powder as described in the above-described (1) or (2), further comprising sulfur-enriched layers in boundary portions between the iron powder particles and the Mg—Fe—O ternary-based oxide deposition films at least containing (Mg,Fe)O, wherein sulfur concentrations of the sulfur-enriched layers are higher than that of sulfur contained as an unavoidable impurity in central portions of the iron powder particles.

(4) A Mg-containing-oxide-film-coated iron powder as described in the above-described (1), (2) or (3), wherein the Mg—Fe—O ternary-based oxide deposition films at least containing (Mg,Fe)O have microcrystalline structures having a grain size of 200 nm or less.

(5) A Mg-containing-oxide-film-coated iron powder as described in the above-described (1), (2), (3) or (4), wherein outermost surfaces of the Mg—Fe—O ternary-based oxide deposition films at least containing (Mg,Fe)O are substantially composed of MgO.

As described above, the Mg-containing-oxide-film-coated iron powder of the present invention as described in (1) to (4) can be produced by firstly producing an oxidation-treated iron powder by forming iron oxide films on the surfaces of iron powder particles by heating the iron powder in an oxidizing atmosphere, performing heating or the like in an inert gas atmosphere or in a vacuum atmosphere on the mixed powder obtained by mixing the oxidizing-treated iron powder with a Mg powder, and further performing a second oxidizing treatment to heat the mixed powder in an oxidizing atmosphere. More specifically, the Mg-containing-oxide-film-coated iron powder of the present invention may be produced by: firstly producing an oxidation-treated iron powder by forming iron oxide films on the surfaces of iron powder particles by heating the iron powder at a temperature of 50 to 500° C. in an oxidizing atmosphere, heating the mixed powder obtained by mixing the oxidizing-treated iron powder with a Mg powder at a temperature of 150 to 1100° C. in an inert atmosphere having a gas pressure of $1 \times 10^{-12}$ to $1 \times 10^{-1}$ MPa or in a vacuum atmosphere, and further performing a second oxidation treatment to heat the mixed powder at a temperature of 50 to 350° C. in an oxidizing atmosphere.

The Mg—Fe—O ternary-based oxide deposition films containing a MgO-dissolving wustite phase and having an outermost surface substantially composed of MgO as described in the above-described (5) may be produced by: firstly producing oxidation-treated iron powder by forming iron oxide films on the surfaces of iron powder particles by heating the iron powder at a temperature of 50 to 500° C. in an oxidizing atmosphere, heating the mixed powder obtained by mixing the oxidation-treated iron powder with a Mg powder of a further large amount at a temperature of 150 to 1100° C. in an inert atmosphere having a gas pressure of 1 to $1 \times 10^{-1}$ MPa or in a vacuum atmosphere, and further performing a second oxidizing treatment to heat the mixed powder for a further long duration in an oxidizing atmosphere.

The Mg—Fe—O ternary-based oxide deposition films formed on the surfaces of iron powder particles of the present invention contain at least (Mg,Fe)O. It is more preferable that the (Mg, Fe)O contained in the Mg—Fe—O ternary-based oxide film be a crystalline MgO-dissolving wustite. Most preferably, the outermost surface of the deposition film at least containing (Mg, Fe)O may be composed of MgO. Content of oxygen in (Mg,Fe)O is not limited by the ratio of (Mg,Fe):O=1:1, but may have a range of solubility.

In general, the term "deposition film" indicates a film formed by depositing vacuum-evaporated or sputtered film-forming atoms, for example, on a substrate. In the present invention, the Mg—Fe—O ternary-based oxide deposition film at least containing (Mg, Fe)O and formed on the surface of iron powder denotes a film deposited on the surface of the particles of iron powder being accompanied by reaction of Mg and iron oxide (Fe—O) on the particle surface of the oxidation-treated iron powder. The Mg—Fe—O ternary-based oxide deposition film at least containing (Mg, Fe)O and formed on the surface of iron powder preferably has a film thickness in a range from 5 nm to 500 nm so as to ensure a high magnetic flux density and high resistivity of a composite soft magnetic material formed by compacting the powder. Where the film thickness is smaller than 5 nm, it is not preferable, because the composite soft magnetic material formed by compacting the powder cannot have a sufficient resistivity and has an increased eddy current loss. On the other hand, where the film thickness is larger than 500 nm, it is not preferable because the composite soft magnetic material formed by compacting the powder has a decreased magnetic flux density. More preferably, the film thickness may be in a range from 5 nm to 200 nm.

The Mg—Fe—O ternary-based oxide film at least containing (Mg, Fe)O as a constituent of the Mg-containing-oxide-film-coated iron powder of the present invention has a sulfur-enriched layer at the boundary portion between the Mg—Fe—O ternary-based oxide film at least containing (Mg, Fe)O and the iron powder particle, where the sulfur concentration of the sulfur-enriched layer is higher than that of sulfur contained in the central portion of the iron powder particle. The presence of the sulfur-enriched layer may be confirmed by an analysis of the sulfur concentration by Auger electron spectroscopy, where a peak of the sulfur concentration is shown in the graph. By the presence of such a sulfur-enriched layer at the boundary portion, the Mg—Fe—O ternary-based oxide film at least containing (Mg, Fe)O has further improved bonding to the surface of iron powder particle, breakdown of the deposition film is prevented by tracking of the deposition film to deformation of the powder at the time of press-molding the powder, high resistance is maintained by preventing contact and bonding of iron powder particles with each other at the time of heat treatment, and therefore eddy current loss is reduced. The iron powder contains sulfur as unavoidable impurities. It is considered that most of the sulfur in the sulfur-enriched layer is provided by the sulfur contained in the surface portion of the iron powder.

It is preferable that the grain size of crystals constituting the Mg—Fe—O ternary-based oxide deposition film at least containing (Mg, Fe)O and formed on the surface of the iron powder particle of the present invention be as small as possible. Preferably, the deposition film has a fine crystalline texture having a grain size of 200 nm or less. Because the fine crystalline Mg—Fe—O ternary-based oxide deposition film has such a fine crystalline texture, the deposition film tracks the deformation of powder particle during formation of the compact, and is prevented from breakdown. At the time of heat treatment, the iron powder particles are prevented from contacting and bonding with each other. When the powder is subjected to strain-relief heat treatment at a high temperature, because of the stable property of the oxide, reduction of insulation is prevented, and eddy current loss is lowered. Where the grain size is larger than 200 nm, it is not preferable, because the film thickness of the Mg—Fe—O ternary-based oxide deposition film exceeds 500 nm, and magnetic flux density of compacted composite soft magnetic material is reduced.

The MgO content in the outermost surface of the Mg—Fe—O ternary-based oxide deposition film at least containing (Mg, Fe)O and constituting the Mg-containing oxide film-coated iron powder of the present invention is preferably as high as possible. It is most preferable that the outermost surface be substantially composed of MgO. Where the outermost surface is substantially MgO, diffusion of Fe is inhibited at the time of heat treatment of the press-molded compact, the iron powder particles are prevented from contacting and bonding with each other, reduction of insulation is prevented, high resistance is ensured, and eddy current loss is lowered.

The above-described Mg—Fe—O ternary-based oxide deposition film at least containing (Mg,Fe)O and constituting the Mg-containing oxide-film coated iron powder of the present invention may be a pseudo ternary oxide film in which 10% or less of Mg is replaced by one or more elements selected from Al, Si, Ni, Mn, Cu, and Co.

In the Mg-containing oxide film-coated iron powder of the present invention, it is preferable to use the powder having a mean grain size in a range from 5 to 500 μm. The reason for this limitation is explained as follows. Where the mean grain size is smaller than 5 it is not preferable, because the compressibility of the powder is lowered and volume fraction of the powder is decreased, and therefore the value of magnetic flux density is lowered. On the other hand, where the mean grain size is larger than 500 μm, current in the powder is increased, and magnetic permeability at high frequency is reduced.

Next, a method of producing a composite soft magnetic material using the Mg-containing oxide film-coated iron powder of the present invention is explained.

A Mg-containing oxide film-coated iron powder of the present invention may be subjected to compacting and heat treatment in accordance with a usual method. The composite soft magnetic material produced using the Mg-containing oxide film-coated iron powder of the present invention is preferably constituted of an iron particle phase and grain boundary phase surrounding the iron particle phase, where the grain boundary phase contains Mg—Fe—O ternary-based oxide including crystalline MgO-dissolving wustite phase.

Alternatively, the soft magnetic material may be produced by preparing a mixed powder such that 0.05 to 1% weight of one or two selected from silicon oxide and aluminum oxide each having a grain size of 0.5 μm or less and the balance consisting of the Mg-containing oxide film-coated iron powder of the present invention are blended in the mixed power, compacting, and heat-treating the mixed powder in accordance with the usual method. According to this production method, the Mg—Fe—O ternary-based oxide deposition film at least containing (Mg, Fe)O and constituting the Mg-containing oxide film-coated iron powder of the present invention reacts with the silicon oxide and/or aluminum oxide to form a complex oxide. Therefore, it is possible to obtain a composite soft magnetic material having a texture in which complex oxide of high resistance present in the grain boundary of the iron powder, and having high resistivity. In addition, since the iron powder is heat-treated interposing the silicon oxide and/or aluminum oxide, it is possible to produce a composite soft magnetic material having excellent mechanical strength. In this case, since the silicon oxide and/or the aluminum oxide have a main role in the heat treatment, a coercive force can be maintained at a low value, and therefore, it is possible to produce a composite soft magnetic material having low hysteresis loss. It is preferable that the above-described heat treatment be performed at a temperature of 400 to 1300° C. in an inert gas atmosphere or in an oxidizing gas atmosphere.

In addition, a composite soft magnetic material may be produced by mixing the Mg-containing oxide film-coated iron powder of the present invention and a wet solution such as a sol-gel (silicate) solution of silica and sol-gel solution of alumina added to the powder, drying the mixture of the powder and the solution, compacting the dried mixture, and heat-treating the compacted mixture at a temperature of 400 to 1300° C. in an inert gas atmosphere or in an oxidizing gas atmosphere. Preferably, these composite soft magnetic materials produced using the Mg-containing oxide film-coated iron powder of the present invention are constituted of an iron particle phase and grain boundary phase surrounding the iron particle phase, where the grain boundary phase includes Mg—Fe—O ternary-based oxides including a crystalline MgO-dissolving wustite phase.

Moreover, a composite soft magnetic material having further improved resistivity and strength may be produced by mixing the Mg-containing oxide film-coated iron powder of the present invention with an organic insulating material, inorganic insulating material, or a mixture of an organic insulating material and inorganic insulating material, compacting the mixed material, and heat-treating the compacted material. In this case, epoxy resin, fluororesin, phenol resin, urethane resin, silicone resin, polyester resin, phenoxy resin, urea resin, isocyanate resin, acrylic resin, polyimide resin or the like may be applied as the organic insulating material. Phosphate such as iron phosphate, various glassy insulating materials, water glass mainly composed of sodium silicate, insulating oxide or the like may be applied as the inorganic insulating material.

In addition, a composite soft magnetic material may be produced by mixing the Mg-containing oxide film-coated iron powder of the present invention with one or two or more selected from boron oxide, vanadium oxide, bismuth oxide, antimony oxide, and molybdenum oxide such that, in reduced mass of $B_2O_3$, $V_2O_5$, $Bi_2O_3$, $Sb_2O_3$, and $MoO_3$, 0.05 to 1 weight % is blended in the mixture, compacting the mixture, and heat-treating the compact at a temperature of 500 to 1000° C. The thus produced composite soft magnetic material has a composition containing, in reduced mass of $B_2O_3$, $V_2O_5$, $Bi_2O_3$, $Sb_2O_3$, and MoO3, 0.05 to 1 weight % of one or more selected from boron oxide, vanadium oxide, bismuth oxide, antimony oxide, and molybdenum oxide, and the balance consisting of Mg-containing oxide film-coated iron powder of the present invention. In the composite soft magnetic material, films are formed by the reaction of the Mg—Fe—O ternary-based oxide deposition films at least containing (Mg,Fe)O and one or more selected from boron oxide, vanadium oxide, bismuth oxide, antimony oxide, and molybdenum oxide.

The composite soft magnetic material may be produced by blending one or more selected from a sol solution or powder of boron oxide, sol solution or powder of vanadium oxide, sol solution or powder of bismuth oxide, sol solution or powder of antimony oxide, and sol solution or powder of molybdenum oxide such that the mixture has a composition containing, in reduced mass of $B_2O_3$, $V_2O_5$, $Bi_2O_3$, $Sb_2O_3$, and $MoO_3$, 0.05 to 1 weight %, and the balance consisting of Mg-containing oxide film-coated iron powder of the present invention, mixing and drying the mixture, thereby producing mixed-oxide film-coated iron powder made by coating the dried gel or powder of the mixed oxide on the Mg-containing oxide film-coated iron powder of the present invention, compacting and molding the mixed-oxide-coated iron powder, and heat-treating the compact at a temperature of 500 to 1000° C. These composite soft magnetic materials having high resistivity and produced using the Mg-containing oxide film-coated iron powder of the present invention is preferably constituted of an iron particle phase and grain boundary phase surrounding the iron particle phase, where the grain boundary phase includes Mg—Fe—O ternary-based oxide including crystalline MgO-dissolving wustite phase.

The composite soft magnetic material produced using the Mg-containing oxide film-coated iron powder of the present invention, has high density, high strength, and high magnetic flux density. The composite soft magnetic material having high magnetic flux density and high frequency core loss may be applied as a material of various electromagnetic circuit components utilizing the above-described properties. Examples of the above-described electromagnetic circuit components include a magnetic core, core of a motor, core of a generator, solenoid core, ignition core, reactor, transformer, core of a choke coil, and core of a magnetic sensor or the like. The electromagnetic circuit component comprising the composite soft magnetic material having high resistance and utilizing the Mg-containing oxide film-coated iron powder of the present invention may be equipped to electric apparatuses such as a motor, generator, solenoid, injector, electromagnetic valve, inverter, converter, transformer, potential transformer, electric relay, magnetic sensor or the like, and contributes to improving efficiency and performance, downsizing, and weight saving of the apparatuses.

The inventors performed research to manufacture a Mg-containing oxide film-coated iron powder having such properties that: the oxide film is firmly bonded to the surface of iron powder particle, and when the powder is press-molded, breakdown of a high resistance oxide film on the surface of iron powder does not occur during the press molding; when strain-relief heat treatment at a high temperature is performed after press molding, surface insulation is not reduced, and the powder has high resistance, low eddy current loss; and a coercive force can be further reduced and hysteresis loss can be reduced in the case of performing heat treatment of the powder for straightening annealing.

As a result, the below-described findings could be obtained. Firstly, an iron powder (hereafter referred to as oxidation-treated iron powder) having a surface coating of iron oxide is formed by heating an iron powder in an oxidizing atmosphere. The oxidation-treated iron powder is mixed with an Mg powder, and the obtained mixed powder is subjected to heating in an inert gas atmosphere or in an vacuum atmosphere while tumbling (rolling) the powder.

(F) By the above-described treatment, an Mg—Fe—O ternary-based oxide deposition film is formed on the particle surface of the iron powder such that ultra-fine grains of metallic Fe are dispersed in the matrix of the Mg—Fe—O ternary-based oxide film. Since ultra-fine metallic Fe grains are dispersed in the matrix, the Mg—Fe—O ternary-based oxide deposition film comprising ultra-fine grained metallic Fe dispersed in the matrix has high toughness and is excellent in deformability compared to the conventional Mg-containing ferrite film. In addition, in the Mg-containing oxide film-coated iron powder coated with the Mg—Fe—O ternary-based oxide deposition film comprising ultra-fine grained metallic Fe particles dispersed in the matrix, since the extremely fine particles of metallic iron are dispersed in the matrix of the Mg-containing oxide film, the oxide deposition film has high toughness and sufficiently tracks the deformation of iron powder particle, and remarkably excellent bonding to the iron particle compared to the conventional Mg-containing oxide film-coated iron powder in which Mg-containing ferrite is formed on the surface of the iron particle. Therefore, there is a lesser likelihood that particles of the iron powder is made to contact with each other by the deformation of the oxide film as an insulation film occurring in the press molding. Therefore, even when strain-relief heat treatment at a high temperature is performed after press molding the powder, the oxide film is escaped from deterioration of insulation property, and maintains high resistance. Therefore it is possible to obtain a composite soft magnetic material having low eddy current loss, further reduced coercive force in the case of being subjected to the strain-relief heat treatment, having reduced hysteresis loss, and therefore having low core loss.

(G) The above-described Mg—Fe—O ternary-based oxide deposition film comprising ultra-fine grained metallic Fe grains dispersed in the matrix has a concentration gradient such that Mg and O decrease from exterior surface to the interior direction, and Fe increase to the interior.

(H) The above-described Mg—Fe—O ternary-based oxide deposition film comprising ultra-fine grained metallic Fe grains dispersed in the matrix includes MgO-dissolving wustite phase (a material composed of solid solution of MgO and wustite (FeO)).

(I) More preferably, the MgO-dissolving wustite described in (H) has a crystalline structure.

(J) A sulfur-enriched layer is formed in a boundary portion between the particle of the iron powder and the Mg—Fe—O ternary-based oxide deposition film comprising ultra-fine grained metallic Fe dispersed in the matrix, where the sulfur concentration of the sulfur-enriched layer is higher than that of sulfur contained in a central portion of the iron powder particle.

(K) The Mg—Fe—O ternary-based oxide deposition film comprising ultra-fine grained metallic Fe dispersed in the matrix has a fine crystalline texture having a grain size of 200 nm or less.

(L) It is preferable that the outermost surface of the above-described Mg—Fe—O ternary-based oxide deposition film formed on the surface of the iron powder particle and comprising ultra-fine grained metallic Fe dispersed in the matrix is substantially composed of MgO.

The present invention is made based on the above-described findings and has the following aspects.

(8) A Mg-containing oxide film-coated iron powder comprising iron powder particles and Mg—Fe—O ternary-based oxide deposition films which include ultra-fine metallic Fe grains dispersed in the matrix and are coated on surfaces of the iron powder particles.

(9) A Mg-containing oxide film-coated iron powder as described in (8), wherein the Mg—Fe—O ternary-based oxide deposition films including ultra-fine metallic Fe grains dispersed in the matrix have concentration gradients where Mg and O decrease from the exterior surfaces to interior direction, and Fe increases towards the interior direction.

(10) A Mg-containing oxide film-coated iron powder as described in the above-described (8) or (9), wherein the Mg—Fe—O ternary-based oxide deposition films including ultra-fine metallic Fe grains dispersed in the matrix have a MgO-dissolving wustite phase in matrices.

(11) A Mg-containing oxide film-coated iron powder as described in the above-described (10), wherein the MgO-dissolving wustite phase is crystalline MgO-dissolving wustite phase.

(12) A Mg-containing oxide film-coated iron powder as described in the above-described (8), (9), (10) or (11), further comprising sulfur-enriched layers in boundary portions between the iron powder particles and the Mg—Fe—O ternary-based oxide deposition films including ultra-fine metallic Fe grains dispersed in the matrix, wherein sulfur concentrations of the sulfur-enriched layers are higher than that of sulfur contained as unavoidable impurities in central portions of the iron powder particles.

(13) A Mg-containing oxide film-coated iron powder as described in (8), (9) (10), (11), or (12), wherein the above-described Mg—Fe—O ternary-based oxide deposition films including ultra-fine metallic Fe grains dispersed in the matrix have microcrystalline structures having a grain size of 200 nm or less.

(14) A Mg-containing oxide film-coated iron powder as described in (8), (9) (10), (11), (12), or (13), wherein outermost surfaces of the Mg—Fe—O ternary-based oxide deposition films including ultra-fine metallic Fe grains dispersed in the matrix are substantially composed of MgO.

The Mg-containing oxide film-coated iron powder of the present invention as described in the above-described (8) to (13) is produced by forming a oxidation-treated iron powder by heating iron powder in an oxidizing atmosphere, adding Mg powder to the oxidation-treated iron powder and mixing the powder, and heating thus obtained mixed powder in an inert gas atmosphere or in a vacuum atmosphere while tumbling the mixed powder.

More practically, oxidation-treated iron powder having iron oxide films formed on the surfaces of iron powder particles is produced by preliminary heating the iron powder in an oxidizing atmosphere at a temperature of 50 to 500° C. Mg powder is added to and mixed with the oxidation-treated iron powder. While being rolled, obtained mixed powder is heated at a temperature of 150 to 1100° C. in an inert gas atmosphere or in a vacuum atmosphere having a pressure of $1\times10^{-12}$ to $1\times10^{-1}$ MPa. Thus the above-described powder of the present invention may be produced.

The Mg—Fe—O ternary-based oxide deposition film comprising ultra-fine grained metallic Fe dispersed in the matrix and having an outermost surface substantially composed of MgO as described in the above-described (14) may be produced by: forming a relatively thick iron oxide film on the particle surface of the iron powder by preliminary heating the iron powder at a temperature of 50 to 500° C. in an oxidizing atmosphere for relatively long duration; adding further large amount of Mg powder is added to the oxidation-treated iron powder having the relatively thick iron oxide film and mixing the powder; and heating thus obtained mixed powder at a temperature of 150 to 1100° C. in an inert gas atmosphere having a pressure of $1\times10^{-12}$ to $1\times10^{-1}$ MPa or in a vacuum atmosphere, while tumbling the mixed powder.

In general, "deposition film" is a term denoting a film made of vacuum evaporated or sputtered film-forming atoms deposited on the surface of, for example, a substrate. In the present invention, the Mg—Fe—O ternary-based oxide deposition film formed on the surface of the iron powder of the present invention and comprising ultra-fine grained metallic Fe particles in the matrix denotes a film deposited on the surface of particles of the iron powder being accompanied with a reaction of Mg and iron oxide (Fe—O) on the particle surface of the oxidation-treated iron powder. Since ultra-fine metallic Fe grains are dispersed in the matrix of the Mg-containing oxide film comprising Mg—Fe—O ternary-based oxide, the Mg—Fe—O ternary-based oxide deposition film according to the present invention, comprising ultra-fine grained metallic Fe particles dispersed in the matrix has a high toughness. Therefore, the deposition film sufficiently tracks the deformation of the iron powder particle at the time of press molding, and has remarkably excellent adherence to the iron powder particle. In addition, the Mg—Fe—O ternary-based oxide deposition film according to the present invention, comprising ultra-fine grained metallic Fe grains dispersed in the matrix preferably contains MgO-dissolving wustite. More preferably, the MgO-dissolving wustite has a crystalline structure.

Preferably, the Mg—Fe—O ternary-based oxide deposition film formed on the surface of the iron powder particle of the present invention and comprising ultra-fine grained metallic Fe grains dispersed in the matrix has a film-thickness in a range from 5 to 500 nm so as to ensure high magnetic flux density and high resistivity of the composite soft magnetic material formed by compacting the powder. Where the film thickness is smaller than 5 nm, it is not preferable, since the resistivity is not sufficient and eddy current loss is increased in the composite soft magnetic material formed by compacting the powder. On the other hand, where the film thickness is larger than 500 nm, it is not preferable since the magnetic flux density is decreased in the composite soft magnetic material formed by compacting the powder. More preferably, the film thickness is in a range from 5 to 200 nm.

The Mg—Fe—O ternary-based oxide deposition film constituting the Mg-containing oxide-coated iron powder of the present invention and comprising ultra-fine grained metallic Fe particles dispersed in the matrix preferably has a concentration gradient such that Mg and O decrease from exterior surface to the interior direction, and Fe increase to the interior. Because of such a concentration gradient, the oxide film has further excellent adherence to the iron powder. Therefore, there is a lesser possibility of breakdown of the oxide film as the insulation film during the press molding of the powder. The oxide film escapes from deterioration of insulation property and maintains high resistance even when the press-molded powder is subjected to strain-relief heat treatment at a high temperature. Therefore, eddy current loss is lowered.

In addition, a sulfur-enriched layer containing a higher concentration of sulfur than the sulfur concentration of the central portion of the iron particle of the iron powder exists in the boundary portion between the iron particle and the Mg—Fe—O ternary-based oxide deposition film comprising ultra-fine grained metallic Fe dispersed in the matrix. By the presence of such a sulfur-enriched layer in the boundary portion, the oxide film has further excellent bonding to the iron powder. Therefore, the deposition film tracks the deformation of the particle during compacting the powder, and breakdown of the coating is inhibited. At the time of heat treatment, iron powder particles are prevented from being made to contact and bonded with each other, and resistivity of the oxide film is maintained. Therefore, eddy current loss is lowered. It is considered that the sulfur in the sulfur-enriched layer is provided from unavoidable impurities contained in the iron powder.

The Mg—Fe—O ternary-based oxide deposition film constituting the Mg-containing oxide-coated iron powder of the present invention and comprising ultra-fine grained metallic Fe grains dispersed in the matrix preferably has as small a grain size as possible, and preferably has ultra-microcrystalline structure having a grain size of 200 nm or less. By the presence of such an ultra-fine grained crystalline texture, the ultra-fine grained crystalline deposition film tracks the deformation of powder particle at the time of compacting the powder, and breakdown of the coating is inhibited. In addition, the powder is prevented from being made to contact with each other even at the time of heat treatment. Even when the compacted powder is subjected to strain-relief heat treatment at a high temperature, the oxide is stable, be prevented from reduction of insulation property, and maintains high resistance. Therefore, eddy current loss is lowered. Where the grain size is larger than 200 nm, film thickness of the deposition film exceeds 500 nm, and magnetic flux density of the composite soft magnetic material is reduced.

The Mg—Fe—O ternary-based oxide deposition film comprising ultra-fine metallic Fe grains dispersed in the matrix preferably contains as high a MgO content as possible in the outermost surface. Most preferably, the outermost surface of the film is substantially composed of MgO. Where the outermost surface of the film is substantially MgO, at the time of heat treatment of the press-molded compact, diffusion of Fe is inhibited, the iron powder particles are prevented from contacting and bonding with each other, and reduction of insulation property is prevented, high resistance is maintained, and eddy current loss is lowered.

The Mg—Fe—O ternary-based oxide deposition film constituting the Mg-containing oxide-coated iron powder of the present invention and comprising ultra-fine grained metallic Fe particles dispersed in the matrix may be a pseudo ternary oxide deposition film in which Mg is partially replaced by one or more selected from Al, Si, Mn, Zn, Cu, and Co such that 10 atomic % or less of Mg is replaced.

In the Mg-containing oxide film-coated iron powder of the present invention, it is preferable to use a powder having a mean grain size in a range from 5 to 500 µm. The reason is explained as follows. Where the mean grain size is smaller than 5 µm, it is not preferable, since compressibility of the powder is lowered, volume fraction of the powder is lowered, and therefore magnetic flux density is lowered. On the other hand, where the mean grain size is too larger than 500 µm, eddy current in the interior of the powder particle is increased and magnetic permeability at high frequency is reduced.

The composite soft magnetic material according to the present invention having higher resistivity than that of the conventional one can be produced by press molding and heat-treating the Mg-containing oxide film-coated iron powder of the present invention in accordance with the usual process. A texture of the thus produced composite soft magnetic material of the present invention is constituted of an iron particle phase generated from the iron powder and grain boundary phase surrounding the iron particle phase. The above-described grain boundary phase contains Mg—Fe—O ternary-based oxide including MgO-dissolving wustite. More preferably, the MgO-dissolving wustite is a crystalline one.

Otherwise, the composite soft magnetic material may be produced by producing a mixed powder such that 0.05 to 1 mass % of one or two selected from silicon oxide and aluminum oxide having a mean grain size of 0.5 µm or less and the balance consisting of the Mg-containing-oxide-film-coated iron powder according to the present invention are blended and mixed in the mixed powder; compacting and heat-treating the mixed powder in accordance with the usual method.

In accordance with this production method, the Mg—Fe—O ternary-based oxide deposition film constituting the Mg-containing oxide film-coated iron powder of the present invention and comprising ultra-fine grained metallic Fe grains dispersed in the matrix reacts with silicon oxide and/or aluminum oxide and forms complex oxide. As a result, the composite soft magnetic material having high resistivity, in which complex oxide having high resistance exists in grain boundary of the iron powder, is obtained. In addition, because of the presence of silicon oxide and/or aluminum oxide at the time of heat treatment, the composite soft magnetic material having high mechanical strength can be produced. In this case, since the silicon oxide and/or aluminum oxide have a main roll in the heat treatment, small value of coercive force can be maintained. Therefore it is possible to produce a composite soft magnetic material having low hysteresis loss. Preferably, the above-described heat treatment is performed in an inert gas atmosphere or in an oxidizing gas atmosphere at a temperature of 400 to 1300° C.

In addition, a composite soft magnetic material may be produced by mixing the Mg-containing oxide film-coated iron powder of the present invention and a wet solution such as a sol-gel (silicate) solution of silica and sol-gel solution of alumina added to the powder, drying the mixture of the powder and the solution, compacting the dried mixture, and heat-treating the compacted mixture at a temperature of 400 to 1300° C. in an inert gas atmosphere or in an oxidizing gas atmosphere. More preferably, these composite soft magnetic materials of the present invention has a texture constituted of an iron particle phase generated from the iron powder and grain boundary phase surrounding the iron particle phase, where the grain boundary phase contains Mg—Fe—O ternary-based oxide including MgO-dissolving wustite, and the MgO-dissolving wustite has a crystalline structure.

Moreover, a composite soft magnetic material having further improved resistivity and strength may be produced by mixing the Mg-containing oxide film-coated iron powder of the present invention with an organic insulating material, inorganic insulating material, or a mixture of organic insulating material and inorganic insulating material. In this case, epoxy resin, fluororesin, phenol resin, urethane resin, silicone resin, polyester resin, phenoxy resin, urea resin, isocyanate resin, acrylic resin, polyimide resin or the like may be applied as the organic insulating material. Phosphate such as iron phosphate, various glassy insulating materials, water glass mainly composed of sodium silicate, insulating oxide or the like may be applied as the inorganic insulating material.

In addition, a composite soft magnetic material may be produced by mixing the Mg-containing oxide film-coated iron powder of the present invention with one or two or more selected from boron oxide, vanadium oxide, bismuth oxide, antimony oxide, and molybdenum oxide such that, in reduced mass of $B_2O_3$, $V_2O_5$, $Bi_2O_3$, $Sb_2O_3$, and $MoO_3$, 0.05 to 1 mass % is blended on the mixture, compacting the mixture, and heat-treating the compact at a temperature of 500 to 1000° C. The thus produced composite soft magnetic material has a composition containing, in reduced mass of $B_2O_3$, $V_2O_5$, $Bi_2O_3$, $Sb_2O_3$, and $MoO_3$, 0.05 to 1 mass % of one or more selected from boron oxide, vanadium oxide, bismuth oxide, antimony oxide, and molybdenum oxide, and the balance consisting of Mg-containing oxide film-coated iron powder of the present invention. In the composite soft magnetic material, films are formed by the reaction of the Mg—Fe—O ternary-based oxide deposition films comprising extremely fine grained metallic Fe particles dispersed in the matrix and one or more selected from boron oxide, vanadium oxide, bismuth oxide, antimony oxide, and molybdenum oxide.

The composite soft magnetic material may be produced by blending one or more selected from a sol solution or powder of boron oxide, sol solution or powder of vanadium oxide, sol solution or powder of bismuth oxide, sol solution or powder of antimony oxide, and sol solution or powder of molybdenum oxide such that the mixture has a composition containing, in reduced mass of $B_2O_3$, $V_2O_5$, $Bi_2O_3$, $Sb_2O_3$, and $MoO_3$, 0.05 to 1 mass %, and the balance consisting of Mg-containing oxide film-coated iron powder of the present invention, mixing and drying the mixture, thereby producing mixed-oxide film-coated iron powder made by coating the dried gel or powder of the mixed oxide on the Mg-containing oxide film-coated iron powder of the present invention, compacting and molding the mixed-oxide-coated iron powder, and heat-treating the compact at a temperature of 500 to 1000° C.

The composite soft magnetic materials produced in accordance with the above-described method using Mg-containing oxide film-coated iron powder of the present invention are each constituted of an iron particle phase generated from the iron powder in the Mg-containing oxide film-coated iron powder, and grain boundary phase surrounding the iron particle phase. The grain boundary phase contains Mg—Fe—O ternary-based oxides including MgO-dissolving wustite. More preferably, the above-described MgO-dissolving wustite has a crystalline structure.

The composite soft magnetic material produced using the Mg-containing oxide film-coated iron powder of the present invention, has high density, high strength, and high magnetic flux density. The composite soft magnetic material having high magnetic flux density and low core loss at high frequency may be applied as a material of various electromagnetic circuit components utilizing the above-described properties. Examples of the above-described electromagnetic circuit components include a magnetic core, core of a motor, core of a generator, solenoid core, ignition core, reactor, transformer, core of a choke coil, and core of a magnetic sensor or the like.

The electromagnetic circuit component comprising the composite soft magnetic material having high resistance and utilizing the Mg-containing oxide film-coated iron powder of the present invention may be equipped to electric apparatuses such as a motor, generator, solenoid, injector, electromagnetic valve, inverter, converter, transformer, potential transformer, electric relay, magnetic sensor or the like, and contributes to improving efficiency and performance, downsizing, and weight saving of the apparatuses.

The inventors performed research to manufacture a high resistance film-coated iron powder having such properties that: the high resistance film is firmly bonded to the surface of iron powder, and when the powder is press-molded, breakdown of a high resistance oxide film on the surface of iron powder particle does not occur during the press molding; when strain-relief heat treatment at high temperature is performed after press molding, surface insulation is not reduced, and the powder has high resistance, low eddy current loss; and a coercive force can be further reduced and hysteresis loss can be reduced in the case of performing heat treatment of the powder for straightening annealing. As a result, the below-described findings could be obtained.

(M) Firstly, by performing phosphating treatment of iron powder, iron powder having phosphate film formed on the particle surface of the iron powder (hereafter referred to as phosphate-coated iron powder) is produced. Mg powder is added to and mixed with the phosphate-coated iron powder. By performing heat treatment of the obtained mixed powder in an inert gas atmosphere or in a vacuum atmosphere while tumbling the mixed powder, it is possible to obtain a deposition film-coated iron powder having a surface coating of deposition film composed of Mg, Fe, P, and O. The deposition film composed of Mg, Fe, P, and O contains Mg—Fe—P—O quaternary phosphate compound composed of Mg, Fe, P, and O and Mg—Fe—O ternary-based oxide composed of Mg, Fe, and O, and fine iron phosphide grains dispersed in the matrix.

(N) Since the fine iron phosphide grains are dispersed in the matrix, the deposition film of the above-described deposition film-coated iron powder has high toughness. Therefore, compared with the Mg-containing ferrite film formed on the surface of conventional oxide-film coated iron powder, the above-described deposition film easily tracks deformation of the iron powder particle at the time of press molding the powder. In addition, since the deposition film has remarkably excellent adherence to the iron powder particle, there is a lesser possibility of breakdown of the deposition film as an insulation film, and the iron powder is scarcely made to contact with each other. Even when the press-molded deposition film-coated iron powder is subjected to strain-relief heat treatment at a high temperature, there is a lesser possibility of occurring reduction of insulation property of the deposition film. Therefore, high resistance is maintained, and eddy current loss is lowered. In addition, in the case of performing strain-relief heat treatment, coercive force is further reduced and hysteresis loss is lowered, and therefore it is possible to obtain a composite soft magnetic material having low core loss.

(O) Mg—Fe—P—O quaternary phosphate compound and Mg—Fe—O ternaly oxide included in the above-described deposition film include MgO-dissolving wustite phase.

(P) The above-described deposition film having fine iron phosphide particles dispersed in the matrix preferably has a microcrystalline structure having a grain size of 200 nm or less.

The present invention is made based on the above-described findings and has the following aspects.

(18) A deposition film-coated iron powder comprising iron particles and deposition films which comprise Mg, Fe, P, and O and are coated on surfaces of the iron particles.

(19) A deposition film-coated iron powder as described in (18), wherein the deposition films comprise Mg—Fe—P—O quaternary-based phosphates composed of Mg, Fe, P, and O, Mg—Fe—O ternary-based oxides composed of Mg, Fe, and O, and fine iron phosphide grains dispersed in the matrix.

(20) A deposition film-coated iron powder as described in (18) or (19), wherein the Mg—Fe—P—O quaternary phosphates and Mg—Fe—O ternary-based oxides included in the deposition film include crystalline Mg—O dissolving wustite type phase.

(21) A deposition-film-coated iron power as described in (18), (19) or (20), wherein the deposition films have microcrystalline structures having a grain size of 200 nm or less.

As described above, deposition film-coated iron powder of the present invention as described in the above (18) to (21) is formed by: adding Mg powder to phosphate-coated iron powder and mixing the powder; heating the obtained mixed powder in an inert gas atmosphere or in a vacuum atmosphere while tumbling the mixed powder; and further performing oxidation treatment of the powder in an oxidizing atmosphere. More practically, the above-described deposition film-coated iron powder may be produced by: adding Mg powder to phosphate-coated iron powder and mixing the powder; heating the obtained mixed powder at a temperature of 150 to 1100° C. in an inert gas atmosphere having a pressure of $1 \times 10^{-12}$ to $1 \times 10^{-1}$ MPa or in a vacuum atmosphere while tumbling the mixed powder; and further performing oxidation treatment of the powder in an oxidizing atmosphere.

In general, "deposition film" is a term denoting a film made of vacuum evaporated or sputtered film-forming atoms deposited on the surface of, for example, a substrate. In the present invention, the deposition film formed on the iron powder of the present invention denotes a film deposited on the surface of the particles of iron powder being accompanied with a reaction of Mg and iron phosphate (Fe—P—O) on the surface of the phosphate-coated iron particles. Since fine grains of iron phosphide are dispersed in the matrix of the deposition film formed on the surface of the iron powder of the present invention and including fine iron phosphide grains dispersed in the matrix has a high toughness. Therefore, the deposition film sufficiently tracks the deformation of the iron powder particle at the time of press molding of the powder, and has remarkably excellent adherence to the iron powder.

Preferably, the deposition film formed on the particle surface of the iron powder of the present invention has a film-thickness in a range from 5 to 500 nm so as to ensure high magnetic flux density and high resistivity of the composite soft magnetic material formed by compacting the powder. Where the film thickness is smaller than 5 nm, it is not preferable, since the resistivity is not sufficient and eddy current loss is increased in the composite soft magnetic material formed by compacting the powder. On the other hand, where the film thickness is larger than 500 nm, it is not preferable since the magnetic flux density is decreased in the composite soft magnetic material formed by compacting the powder. More preferably, the film thickness is in a range from 5 to 200 nm.

The Mg—Fe—P—O quaternary-based phosphate and Mg—Fe—O ternary-based oxide included in the deposition film constituting the deposition film-coated iron powder of the present invention preferably include crystalline Mg-dissolving wustite type phase. Preferably, the crystalline Mg-dissolving wustite type phase has a NaCl type crystal structure, while in some case, Fe and/or Mg of are partially replaced by P.

The deposition film constituting the deposition film-coated iron powder of the present invention preferably has as small a grain size as possible, and preferably has microcrystalline structure having a grain size of 200 nm or less. By the presence of such a microcrystalline structure, the fine grained crystalline deposition film tracks the deformation of the powder at the time of compacting the powder thereby being prevented from breakdown. In addition, the powder is prevented from being made to contact with each other even at the time of heat treatment. Even when the compacted powder is subjected to strain-relief heat treatment at high temperature, the oxide is stable, be prevented from reduction of insulation property, and maintains high resistance. Therefore, eddy current loss is lowered. Where the grain size is larger than 200 nm, it is not preferable since film thickness of the deposition film exceeds 500 nm, and magnetic flux density of the composite soft magnetic material is reduced.

Iron powder as a raw material for producing the deposition film-coated iron powder of the present invention preferably has a mean grain size in a range from 5 to 500 μm. The reason is explained as follows. Where the mean grain size is smaller than 5 μm, compressibility of the powder is reduced, and volume fraction of the powder is lowered, and therefore the value of the magnetic flux density is lowered. On the other hand, where the mean grain size is too larger than 500 μm, eddy current in the interior of the powder particle is increased and magnetic permeability at high frequency is reduced.

The Mg—Fe—P—O quaternary phosphate comprising Mg, Fe, P, and O and the Mg—Fe—O ternary-based oxide comprising Mg, Fe, and O, both constituting the deposition film-coated iron powder of the present invention may be a pseudo ternary-based oxide deposition film in which Mg is partially replaced by one or more selected from Al, Si, Ni, Mn, Zn, Cu, and Co such that 10% or less of Mg is replaced.

Next, a method of producing a soft magnetic material utilizing the deposition-film coated iron powder of the present invention is explained in the following.

The composite soft magnetic material can be produced by press molding and heat-treating the deposition film-coated iron powder of the present invention in accordance with the usual process. Otherwise, the composite soft magnetic material may be produced by producing a mixed powder by adding one or two selected from silicon oxide and aluminum oxide having a mean grain size of 0.5 μm and in an amount of 0.05 to 1 mass % to the deposition-film-coated iron powder according to the present invention, and compacting and heat-treating the mixed powder in accordance with the usual method.

Where the composite soft magnetic material is produced by the above-described method, it is possible to obtain a composite soft magnetic material in which silicon oxide and/or aluminum oxide bond the deposition film-coated iron powder where iron powder is surrounded by a deposition film including Mg—Fe—P—O quaternary-based phosphate comprising Mg, Fe, P, and O and Mg—Fe—O ternary-based oxide comprising Mg, Fe, and O, and fine iron phosphide particles dispersed in the matrix. Since the composite soft magnetic material is heat-treated through silicon oxide and/or aluminum oxide, it is possible to further enhance the mechanical strength.

In this case, since the silicon oxide and/or aluminum oxide have a main roll in the heat treatment, small value of coercive force can be maintained. Therefore it is possible to produce a composite soft magnetic material having low hysteresis loss. Preferably, the above-described heat treatment is performed in an inert gas atmosphere or in an oxidizing gas atmosphere at a temperature of 400 to 1300° C.

In addition, a composite soft magnetic material may be produced by mixing the deposition film-coated iron powder of the present invention and a wet solution such as a sol-gel (silicate) solution of silica and sol-gel solution of alumina added to the powder, drying the mixture of the powder and the solution, compacting the dried mixture, and heat-treating the compacted mixture at a temperature of 400 to 1300° C. in an inert gas atmosphere or in an oxidizing gas atmosphere.

Moreover, a composite soft magnetic material having further improved resistivity and strength may be produced by mixing the deposition film-coated iron powder of the present invention with an organic insulating material, inorganic insulating material, or a mixture of organic insulating material and inorganic insulating material. In this case, epoxy resin, fluororesin, phenol resin, urethane resin, silicone resin, polyester resin, phenoxy resin, urea resin, isocyanate resin, acrylic resin, polyimide resin or the like may be applied as the organic insulating material. Phosphate such as iron phosphate, various glassy insulating materials, water glass mainly composed of sodium silicate, insulating oxide or the like may be applied as the inorganic insulating material.

In addition, a composite soft magnetic material may be produced by mixing the deposition film-coated iron powder of the present invention with one or two or more selected from boron oxide, vanadium oxide, bismuth oxide, antimony oxide, and molybdenum oxide such that, in reduced mass of $B_2O_3$, $V_2O_5$, $Bi_2O_3$, $Sb_2O_3$, and $MoO_3$, 0.05 to 1 mass % is blended in the mixture, compacting the mixture, and heat-treating the obtained compact at a temperature of 500 to 1000° C. The thus produced composite soft magnetic material has a composition containing, in reduced mass of $B_2O_3$, $V_2O_5$, $Bi_2O_3$, $Sb_2O_3$, and $MoO_3$, 0.05 to 1 mass % of one or more selected from boron oxide, vanadium oxide, bismuth oxide, antimony oxide, and molybdenum oxide, and the balance consisting of deposition film-coated iron powder of the present invention. In the composite soft magnetic material, films are formed by the reaction of the deposition films and one or more selected from boron oxide, vanadium oxide, bismuth oxide, antimony oxide, and molybdenum oxide.

The composite soft magnetic material may be produced by blending one or more selected from a sol solution or powder of boron oxide, sol solution or powder of vanadium oxide, sol solution or powder of bismuth oxide, sol solution or powder of antimony oxide, and sol solution or powder of molybdenum oxide such that the mixture has a composition containing, in reduced mass of $B_2O_3$, $V_2O_5$, $Bi_2O_3$, $Sb_2O_3$, and $MoO_3$, 0.05 to 1 weight %, and the balance consisting of the above-described deposition film-coated iron powder of the present invention, mixing and drying the mixture, thereby producing mixed-oxide film-coated iron powder made by coating the dried gel or powder of the mixed oxide on the above-described deposition film-coated iron powder of the present invention, compacting and molding the mixed-oxide-coated iron powder, and heat-treating the compact at a temperature of 500 to 1000° C.

The composite soft magnetic materials having high resistivity and produced in accordance with the above-described method using the deposition film-coated iron powder of the present invention are each constituted of an iron particle phase and grain boundary phase surrounding the iron particle phase. The grain boundary phase preferably contains oxides including crystalline MgO-dissolving wustite type phase. The crystalline Mg-dissolving wustite type phase preferably has a NaCl type crystal structure, while in some case, Fe and/or Mg of are partially replaced by P.

The composite soft magnetic material produced using the deposition film-coated iron powder of the present invention, has high density, high strength, and high magnetic flux density. The composite soft magnetic material having high magnetic flux density and low core loss at high frequency may be applied as a material of various electromagnetic circuit components utilizing the above-described properties. Examples of the above-described electromagnetic circuit components include a magnetic core, core of a motor, core of a generator, solenoid core, ignition core, reactor, transformer, core of a choke coil, and core of a magnetic sensor or the like. The electromagnetic circuit component comprising the composite soft magnetic material having high resistance and utilizing the deposition film-coated iron powder of the present invention may be equipped to electric apparatuses such as a motor, generator, solenoid, injector, electromagnetic valve, inverter, converter, transformer, potential transformer, electric relay, magnetic sensor or the like, and contributes to improving efficiency and performance, downsizing, and weight saving of the apparatuses.

The inventors performed research so as to obtain a insulation film-coated iron silicide powder having such properties that: the insulation film is firmly bonded to the surface of iron silicide powder, and when the powder is press-molded, breakdown of insulation film on the surface of iron silicide powder does not occur during the press molding; when heat treatment is performed after the press molding, surface insulation of the iron silicide powder is not reduced.

As a result, the below-described findings could be obtained.

(Q) An oxide deposition film-coated iron silicide powder having Mg—Si—Fe—O quaternary-based oxide deposition film comprising Mg, Si, Fe, and O formed on the particle surface of the iron silicide powder can be obtained by: adding Mg powder to a surface oxidized iron silicide powder (here and hereafter, which includes an iron silicide powder having a spontaneously oxidized surface and an iron silicide powder having an oxide film formed on the surface) and mixing the powder, heating the obtained mixed powder in an inert gas atmosphere or in a vacuum atmosphere, and where necessary, performing second oxidizing treatment to heat the powder in an oxidizing atmosphere. Compared to the conventional chemical conversion film-coated iron silicide film having a chemical conversion film formed on the surface of the iron silicide powder, the oxide deposition film-coated iron silicide powder shows an remarkably excellent adherence of the Mg—Si—Fe—O quaternary-based oxide deposition film to the surface of the iron silicide powder. Therefore, there is a lesser possibility that the Mg—Si—Fe—O quaternary-based oxide deposition film as an insulation film is broken down during the press molding and particles of the iron silicide powder are made to contact with each other. Therefore, even when the press-molded powder is subjected to strain-relief heat treatment at a high temperature, the insulation property of the Mg—Si—Fe—O quaternary-based oxide deposition film is not reduced and its high resistance is maintained. Therefore, eddy current loss is lowered. In addition, since the coercive force can be further reduced by the heat treatment for reducing strain, hysteresis loss can be reduced to a lower level. Therefore, a composite soft magnetic material of low core loss can be obtained.

(R) The above-described Mg—Si—Fe—O quaternary-based oxide deposition film has a concentration gradient such that contents of Mg and O increase towards the surface and Fe content decrease towards the surface, and has a concentration gradient where Si content increases in the vicinity of the outermost surface such that a portion close to the outermost surface shows as a high Si content.

(S) Preferably, the above-described Mg—Si—Fe—O quaternary-based oxide deposition film includes crystalline MgO-dissolving wustite type phase.

(T) The above-described Mg—Si—Fe—O quaternary-based oxide deposition film has a fine crystalline texture having a grain size of 200 nm or less.

(U) The above-described Mg—Si—Fe—O quaternary-based oxide deposition film includes metallic Fe or Fe—Si alloy.

The present invention was made based on the above-described findings and has the following aspects.

(24) An oxide deposition film-coated iron silicide powder comprising iron silicide powder particles and Mg—Si—Fe—O quaternary-based oxide deposition films which comprise Mg, Si, Fe, and O and are formed on surfaces of the iron silicide powder particles.

(25) An oxide deposition film-coated iron silicide powder as described in (24), wherein the above-described Mg—Si—Fe—O quaternary-based oxide deposition films has a have concentration gradients where contents of Mg and O increase towards the surface and Fe contents decrease towards the surfaces, and have concentration gradients of Si where Si contents increase in the vicinity of the outermost surfaces such that portions close to the outermost surface show high Si contents.

(26) An oxide deposition film-coated iron silicide powder as described in the above (24) or (25), wherein the Mg—Si—Fe—O quaternary-based oxide deposition films include a crystalline MgO-dissolving wustite type phase.

(27) An oxide deposition film-coated iron silicide powder as described in the above (24), (25) or (26), wherein the Mg—Si—Fe—O quaternary-based oxide deposition films include metallic Fe or Fe—Si alloy.

(28) An oxide deposition film-coated iron silicide powder as described in the above (24), (25), (26), or (27), wherein the Mg—Si—Fe—O quaternary-based oxide deposition films have microcrystalline structures having a grain size of 200 nm or less.

As an iron silicide powder used in the production of the above-described oxide deposition film-coated iron silicide powder of the present invention as described in the above (24), (25), (26) or (27), iron silicide powder having a composition containing Si: 0.1 to 10 weight %, and the balance consisting of Fe and unavoidable impurities is used. This composition is a generally known composition. Therefore, the present invention has the following aspect.

(29) An deposition film-coated iron silicide powder as described in the above (24), (25), (26), (27), and (28), wherein the above-described iron silicide powder have a composition containing Si: 0.1 to 1.0 mass % and a balance consisting of Fe and unavoidable impurities.

The oxide deposition film-coated iron silicide powder of the present invention as described in the above (24), (25), (26), (27), (28), and (29) may be produced by: adding Mg powder to the iron silicide powder having the above-described composition and having a surface oxide film and mixing the powder; heating the obtained mixed powder at a temperature of 150 to 1100° C. under an inert gas atmosphere or a vacuum atmosphere having a pressure of $1 \times 10^{-12}$ to $1 \times 10^{-1}$ MPa; and where necessary, performing second oxidizing treatment of the powder to heat the powder for a long duration in an oxidizing atmosphere.

The above-described iron silicide powder having an surface oxide film may be obtained by leaving the iron silicide powder produced by gas-atomizing, water-atomizing, or gas-water-atomizing, and having a composition containing Si: 0.1 to 10 weight % and the balance consisting of Fe and unavoidable impurities to stand in air atmosphere, or be performing oxidizing treatment of the iron silicide powder. Since the iron silicide powder obtained by gas-atomizing or gas-water-atomizing has nearly spherical shape, the powder is appropriate to obtain a composite soft magnetic material having a relatively high resistance. On the other hand, since the iron silicide powder obtained by water-atomizing has an uneven surface shape of powder, the powder is appropriate to obtain a composite soft magnetic material having a relatively high strength.

In general, the term "oxide deposition film" indicates an oxide film formed by depositing vacuum-evaporated or sputtered film-forming atoms, for example, on a substrate. In the present invention, the Mg—Si—Fe—O quaternary oxide deposition film formed on the surface of iron silicide powder denotes a film formed on the surfaces of particles of the iron silicide powder being accompanied by reaction of Mg and surface oxide film of the surface-oxidized iron silicide powder.

The oxide deposition film formed on the surface of iron silicide powder preferably has a film thickness in a range from 5 nm to 500 nm so as to ensure a high magnetic flux density and high resistivity of a composite soft magnetic material formed by compacting the powder. Where the film thickness is smaller than 5 nm, it is not preferable, because the composite soft magnetic material formed by compacting the powder cannot have a sufficient resistivity and has an increased eddy current loss. On the other hand, where the film thickness is larger than 500 nm, it is not preferable because the composite soft magnetic material formed by compacting the powder has a decreased magnetic flux density. More preferably, the film thickness may be in a range of 5 nm to 200 μm.

Since the Mg—Si—Fe—O quaternary-based oxide film formed on the surface of the oxide deposition film-coated iron silicide powder of the present invention has a concentration gradient such that contents of Mg and O increase towards the surface and Fe content decrease towards the surface, adherence of the Mg—Si—Fe—O quaternary-based oxide deposition film to the iron silicide powder is improved. In addition, adherence of the Mg—Si—Fe—O quaternary-based oxide deposition film to the iron silicide powder is improved by the presence of metallic iron or Fe—Si alloy included in the film. Therefore, in the oxide deposition film-coated iron silicide powder if the present invention having such an Mg—Si—Fe—O quaternary-based oxide deposition film, breakdown or delamination of the film do not occur in the process such as press molding, and therefore, composite soft magnetic material having high resistance can be obtained.

It is preferable that the Mg—Si—Fe—O quaternary-based oxide deposition film formed on the surface of the oxide deposition film-coated iron silicide powder of the present invention includes crystalline Mg-dissolving wustite type phase. Most preferably, the above-described crystalline Mg-dissolving wustite type phase has an NaCl type structure.

The Mg—Si—Fe—O quaternary oxide deposition film formed on the surface of the oxide deposition film-coated iron silicide powder of the present invention preferably has as small a grain size as possible, and preferably has microcrystalline structure having a grain size of 200 nm or less. By the presence of such a microcrystalline structure, the fine grained crystalline oxide deposition film tracks the deformation of the powder at the time of compacting the powder thereby being prevented from breakdown. In addition, the iron silicide powder particles are prevented from being made to contact with each other even at the time of heat treatment. Even when the compacted powder is subjected to strain-relief heat treatment at a high temperature, the oxide is stable, be prevented from reduction of insulation property, and maintains high resistance. Therefore, eddy current loss is lowered. Where the grain size is larger than 200 nm, it is not preferable since the magnetic flux density of the composite soft magnetic material is reduced. More preferable grain size is 50 nm or less.

Iron silicide powder described in (29) used for producing the deposition oxide film-coated iron silicide powder as described in the above (24) to (28) preferably has a mean grain size in a range from 5 to 500 μm. The reason is explained as follows. Where the mean grain size is smaller than 5 μm, compressibility of the powder is reduced, and volume fraction of the powder is lowered, and therefore the value of the magnetic flux density is lowered. On the other hand, where the mean grain size is too larger than 500 μm, eddy current in the interior of the powder particle is increased and magnetic permeability at high frequency is reduced. More preferably, the deposition oxide film-coated iron silicide powder as described in the above (20) to (27) has a mean grain size in a range from 5 to 100 μm.

A composite soft magnetic material may be produced by compacting the oxide deposition film-coated iron silicide powder of the present invention, and heat-treating the obtained compact at a temperature of 500 to 1000° C.

A composite soft magnetic material having improved resistivity and strength may be produced by compacting and heat-treating the oxide deposition film-coated iron silicide powder of the present invention mixed with an organic insulating material or inorganic insulating material. In this case, epoxy resin, fluororesin, phenol resin, urethane resin, silicone resin, polyester resin, phenoxy resin, urea resin, isocyanate resin, acrylic resin, polyimide resin, polyphenylene sulfide resin (hereafter referred to as PPS resin) or the like may be applied as the organic insulating material. Among these organic insulating material, silicone resin, poyimid resin, or PPS resin are especially preferred. It is possible to add an appropriate amount of plasticizer for controlling the hardness of binder, coupling agent for enhancing the bonding between the binder and the powder. It is possible to add lubricant such as stearic acid, various stearate or the like so as to improve sliding of the powder during compacting the powder, and to ensure the insulation of the deposition film. In addition, it is possible to add glass binder as the inorganic insulating material.

Accordingly, the present invention has the following aspects.

(30) A composite soft magnetic material comprising a heat-treated compact of the oxide-deposition film coated iron silicide powder as described in the above (24), (25), (26), (27), (28) or (29).

(31) A composite soft magnetic material comprising a heat-treated compact including the oxide deposition film-coated iron silicide powder as described in the above (24), (25), (26), (27), (28) or (29), and interparticle insulating material composed of silicone resin, polyimide resin, or PPS resin.

It is preferable that the composite soft magnetic material produced using the deposition oxide film-coated iron silicide powder of the present invention as described in the above (24), (25), (26), (27), (28) or (29) is constituted of iron silicide phase and grain boundary phase surrounding the iron silicide phase, and the grain boundary phase includes Mg—Si—Fe—O quaternary oxide containing MgO-dissolving wustite type phase. Therefore, the present invention has the following aspect.

(32) A composite soft magnetic material as described in the above (30) or (31), comprising iron silicide phase, grain boundary phase surrounding the iron silicide phase, wherein the grain boundary phase includes Mg—Si—Fe—O quaternary oxide containing MgO-dissolving wustite type phase.

The composite soft magnetic material produced using the oxide deposition film-coated iron silicide powder of the present invention, has high density, high strength, and high magnetic flux density. The composite soft magnetic material having high magnetic flux density and low core loss at high frequency may be applied as a material of various electromagnetic circuit components utilizing the above-described properties. Examples of the cores of the above-described electromagnetic circuit components include a magnetic core, core of a motor, core of a generator, solenoid core, ignition core, reactor, transformer, core of a choke coil, and core of a magnetic sensor or the like. The electromagnetic circuit component comprising the composite soft magnetic material having high resistance and utilizing the oxide deposition film-coated iron silicide powder of the present invention may be equipped to electric apparatuses such as a motor, generator, solenoid, injector, electromagnetic valve, inverter, converter, potential transformer, electric relay, magnetic sensor system or the like, and contributes to improving efficiency and performance, downsizing, and weight saving of the apparatuses.

Recently, based on a consideration of an environmental issue, counter-steps for energy saving have been performed in the fields of general consumer electronics, automobiles, and industrial machineries. Therefore, there is a demand for enhancing the effect of electric circuit components. Among these, the reactor is known as a component used for transforming potential, that is, stepping up or stepping down the potential, of electric power source of automobile, controlling the impedance, and power supply for filter. For the reactor, in order to achieve a small size and low loss, a composite soft magnetic material having high saturation magnetization, high resistance and low coercive force. In order to improve DC superposed property, stable magnetic permeability is preferred. The core of the reactor is provided with a gap and is designed such that a predetermined inductance can be obtained irrespective of fluctuation of input current within a working range.

Where a reactor have a core material composed of the composite soft magnetic material comprising a heat-treated compact of the oxide deposition film-coated iron silicide powder of the present invention or a heat-treated compact including the oxide deposition film-coated iron silicide powder and interparticle insulating material composed of silicone resin, polyimide resin, or PPS resin, since insulation is maintained and a coercive force is reduced even when the core material is subjected to high temperature heat treatment for strain reduction, loss is reduced in the high frequency region and intermediate to low frequency region, and the reactor has an excellent alternating current property. Therefore, the reactor may be used as a reactor having small size, low loss, low noise and being excellent in DC superposition property, and may be applied as a reactor for transforming potential, that is, stepping up or stepping down the potential, of electric power source of automobile, controlling the impedance, and power supply for filter, or the like.

The inventors performed research so as to obtain an oxide film-coated iron-based Fe—Si-based soft magnetic powder having such properties that: when the powder is press-molded, breakdown of a high resistance oxide film on the surface of the iron-based Fe—Si-based soft magnetic powder does not occur during the press molding, and the high resistance material film is firmly bonded to the surface; when high temperature heat treatment is performed after the press molding, surface insulation is not reduced; and the powder has high resistance, low eddy current loss; and a coercive force can be further reduced and hysteresis loss can be further reduced.

As a result, the below-described findings could be obtained.

Firstly, by adding Si powder to an iron-based Fe—Si-based soft magnetic powder or to a Fe powder, mixing the powder, and heating the mixed powder in an non-oxidizing atmosphere, iron-based Fe—Si-based soft magnetic powder is produced such that the powder has a high concentration Si diffused layer on the surface of the iron-based Fe—Si-based soft magnetic powder or the Fe powder, where concentration of Si in the high concentration Si diffused layer is higher than that of the iron-based Fe—Si-based soft magnetic powder or of the Fe powder. By performing oxidization treatment of the obtained iron-based Fe—Si-based soft magnetic material having the high concentration Si diffused layer, surface oxidized high concentration Fe—Si iron-based soft magnetic powder having an oxide layer on the high concentration Si diffused layer is produced. By adding Mg powder to the surface oxidized high concentration iron-based Fe—Si-based soft magnetic powder and mixing the powder, and heating the obtained mixed powder at a temperature of 150 to 1100° C. under an inert gas atmosphere or a vacuum atmosphere having a pressure of $1 \times 10^{-12}$ to $1 \times 10^{-1}$ MPa, an oxide deposition film comprising Mg, Si, Fe, and O is formed on the surface of the Fe—Si iron-based soft magnetic powder.

(V) With respect to Mg contained in the oxide deposition film comprising Mg, Si, Fe, and O, Mg shows a concentration gradient such that Mg content increases towards the outermost surface. With respect to O, O shows a concentration gradient such that O content increases towards the outermost surface. On the other hand, Fe shows a concentration gradient such that Fe content decreases towards the outermost surface. With respect to Si, in the vicinity to the outer most surface of the deposition film, Si shows a concentration gradient such that Si content increases towards the outermost surface.

(W) In the above-described oxide deposition film comprising Mg, Si, Fe, and O, Mg and O are contained in the matrix as MgO-dissolving wustite (a material constituted of a solid solution of MgO and wustite (FeO)), partial amounts of Fe and Si are contained as metallic Fe or Fe—Si alloy. Since, the above-described oxide deposition film comprising Mg, Si, Fe, O includes metallic Fe, the film has toughness, and easily tracks the deformation of powder at the time of compacting the powder.

(X) Since the above-described oxide deposition film comprising Mg, Si, Fe, and O has a fine crystalline texture having a grain size of 200 nm or less, the film has toughness and easily tracks the deformation of powder at the time of compacting the powder.

Compared to the conventional Mg-containing ferrite oxide film coated iron-based Fe—Si-based soft magnetic powder having Mg-containing ferrite oxide film formed on the surface of the iron-based Fe—Si-based soft magnetic powder, the iron-based Fe—Si-based soft magnetic powder having the oxide deposition film comprising Mg, Si, Fe, and O formed on the surface is remarkably excellent in the adherence of the oxide powder to the iron-based Fe—Si-based soft magnetic powder. Therefore, there is a lesser possibility that oxide films as insulation films are deformed and particles of the iron-based Fe—Si-based soft magnetic powder are made to contact with each other. In addition, the above-described oxide deposition film comprising Mg, Si, Fe, and O is chemically more stable than the Mg-containing ferrite oxide film. Therefore, even when the press-molded powder is subjected to strain-relief heat treatment at a high temperature, insulation property of the oxide deposition film is not deteriorated, high resistance is maintained, and eddy current loss is lowered. By further performing strain relief heat treatment, coercive force is further reduced, and it is possible to depress the hysteresis loss to a low value. Therefore, it is possible to obtain a composite soft magnetic material having low core loss.

The present invention made on the results of the above-described research, and has the following aspects.

(35) An oxide deposition film-coated iron-based Fe—Si-based soft magnetic powder comprising iron-based Fe—Si-based soft magnetic powder particles and oxide deposition films which comprise Mg, Si, Fe, and O and are formed on surfaces of the iron-based Fe—Si-based soft magnetic powder particles.

(36) An oxide-deposition film-coated iron-based Fe—Si-based soft magnetic powder as described in the above (35), wherein the iron-based Fe—Si-based soft magnetic powder particles have a composition containing Si: 0.1 to 10 mass %, and the balance consisting of Fe and unavoidable impurities.

(37) An oxide-deposition film-coated iron-based Fe—Si-based soft magnetic powder as described in the above (35) or (36), wherein the oxide deposition films comprising Mg, Si, Fe and O have concentration gradients where contents of Mg and O increase towards the surfaces and Fe contents decrease towards the surfaces, and have concentration gradients of Si where Si contents increase in the vicinities of the outermost surfaces such that portions close to the outermost surfaces show high Si contents.

(38) An oxide deposition film-coated iron-based Fe—Si-based soft magnetic powder as described in the above (35), (36) or (37), wherein the oxide deposition films comprising Mg, Si, Fe and O include crystalline Mg-dissolving wustite type phase, and include metallic Fe or Fe—Si alloy.

(39) An oxide deposition film-coated iron-based Fe—Si-based soft magnetic powder as described in the above (35), (36), (37), or (38), wherein the oxide deposition films comprising Mg, Si, Fe and O have a microcrystalline structure having a mean grain size of 200 nm or less.

In general, the term "oxide deposition film" indicates an oxide film formed by depositing vacuum-evaporated or sputtered film-forming atoms, for example, on a substrate. In the present invention, the oxide deposition film comprising Mg, Si, Fe and 0 and formed on the surfaces of iron-based Fe—Si-based soft magnetic powder denotes a film deposited on the surface of particles of the iron-based Fe—Si-based soft magnetic powder being accompanied by reaction of Mg and Si on the surface of particles of iron-based Fe—Si-based soft magnetic powder. The oxide deposition film comprising Mg, Si, Fe and 0 and formed on the surface of iron-based Fe—Si-based soft magnetic powder preferably has a film thickness in a range from 5 nm to 500 nm so as to ensure a high magnetic flux density and high resistivity of a composite soft magnetic material formed by compacting the powder. Where the film thickness is smaller than 5 nm, it is not preferable, because the composite soft magnetic material formed by compacting the powder cannot have sufficient resistivity and has an increased eddy current loss. On the other hand, where the film thickness is larger than 500 nm, it is not preferable because the composite soft magnetic material formed by compacting the powder has a decreased magnetic flux density. More preferably, the film thickness may be in a range from 5 nm to 200 nm.

It is preferable that the grain size of crystals constituting oxide deposition film comprising Mg, Si, Fe and 0 and formed on the surface of iron-based Fe—Si-based soft magnetic powder as described in the above (35) to (39) is as small as possible. Preferably, the deposition film has a fine crystalline texture having a grain size of 200 nm or less. Because of such a fine crystalline texture, the fine crystalline oxide deposition film tracks the deformation of powder particle at the time of compacting the powder, and the film is prevented from breakdown. At the time of heat treatment, particles of the iron-base Fe—Si-based soft magnetic powder particles are prevented from contacting and bonding with each other. When the compacted powder is subjected to strain-relief heat treatment at a high temperature, because of the stable property of the oxide, reduction of insulation is prevented, and eddy current loss is lowered. Where the grain size is larger than 200 nm, it is not preferable, because the magnetic flux density of compacted composite soft magnetic material is reduced.

In the production of the oxide deposition film-coated iron-based Fe—Si-based soft magnetic powder as described in the above (35) to (39), it is preferable to use the powder having a mean grain size in a range from 5 to 500 µm. The reason for this limitation is explained as follows. Where the mean grain size is smaller than 5 µm, it is not preferable, because the compressibility of the powder is lowered and volume fraction of the powder is decreased, and therefore the value of magnetic flux density is lowered. On the other hand, where the mean grain size is too larger than 500 μm, eddy current in the interior of powder particle is increased, and magnetic permeability at high frequency is reduced.

A composite soft magnetic material having further improved resistivity and strength may be produced by mixing the above-described oxide deposition film-coated iron-based Fe—Si-based soft magnetic powder of the present invention with an organic insulating material, inorganic insulating material, or a mixture of organic insulating material and inorganic insulating material, compacting the mixed material, and heat-treating the compacted material. In this case, epoxy resin, fluororesin, phenol resin, urethane resin, silicone resin, polyester resin, phenoxy resin, urea resin, isocyanate resin, acrylic resin, polyimide resin, PPS resin or the like may be applied as the organic insulating material. Phosphate such as iron phosphate, various glassy insulating materials, water glass mainly composed of sodium silicate, insulating oxide or the like may be applied as the inorganic insulating material.

In addition, a composite soft magnetic material may be produced by compacting the oxide deposition film-coated iron-based Fe—Si-based soft magnetic powder of the present invention, and heat-treating the obtained compact at a temperature of 500 to 1000° C.

The composite soft magnetic material produced using the oxide deposition film-coated iron-based Fe—Si-based soft magnetic powder of the present invention, has high density, high strength, high resistivity, and high magnetic flux density. The composite soft magnetic material having high magnetic flux density and high frequency core loss may be applied as a material of various electromagnetic circuit components utilizing the above-described properties. Examples of the above-described electromagnetic circuit components include a magnetic core, core of a motor, core of a generator, solenoid core, ignition core, reactor, transformer, core of a choke coil, and core of a magnetic sensor or the like. The electromagnetic circuit component comprising the composite soft magnetic material having high resistance and utilizing the oxide deposition film-coated iron-based Fe—Si-based soft magnetic powder of the present invention may be equipped to electric apparatuses such as a motor, generator, solenoid, injector, electromagnetic valve, inverter, converter, potential transformer, electric relay, magnetic sensor system or the like, and contributes to improving efficiency and performance, downsizing, and weight saving of the apparatuses.

Moreover, so as to solve the above-described problems, the inventors previously invented Mg-containing iron oxide film-coated iron powder such as described in the following (a) to (e).

(a) A Mg-containing iron oxide film-coated iron powder having a coatings of Mg—Fe—O ternary-based oxide deposition films at least containing (Mg,Fe)O on the surface of iron powder particles.

(b) A Mg-containing iron oxide film-coated iron powder having coatings of Mg—Fe—O ternary-based oxide deposition films at least containing (Mg,Fe)O on the surfaces of iron powder particles, having sulfur-enriched layers in the boundary portions between the iron powder particles and the Mg—Fe—O ternary-based oxide deposition films at least containing (Mg,Fe)O, wherein the sulfur concentrations of the sulfur-enriched layers are higher than that of sulfur contained in a central portions of the iron powder particles.

(c) A Mg-containing oxide film-coated iron powder as described in the above (a) or (b), wherein (Mg,Fe)O included in the Mg—Fe—O ternary-based oxide deposition films is a crystalline MgO-dissolving wustite phase.

(d) A Mg-containing iron oxide film-coated iron powder as described in the above (a), (b) or (c), wherein the Mg—Fe—O ternary-based oxide deposition films at least containing (Mg, Fe)O have microcrystalline structures having a grain size of 200 nm or less.

(e) A Mg-containing iron oxide film-coated iron powder as described in the above-described (a), (b), (c) or (d), wherein outermost surfaces of the Mg—Fe—O ternary-based oxide deposition films at least containing (Mg, Fe)O are substantially composed of MgO.

The previously invented Mg-containing iron oxide film-coated iron powders as described in the above (a), (b), (c), (d) or (e) were obtained by: firstly forming an iron powder (hereafter referred to as oxidation-treated iron powder) having a surface coating of iron oxide by subjecting the iron powder to an oxidization treatment, for example, heating the iron powder in an oxidizing atmosphere; adding an Mg powder to the oxidation-treated iron powder and mixing the powder; subjecting the obtained mixed powder to heating or the like in an inert gas atmosphere or in an vacuum atmosphere; and further performing a second oxidization treatment to heat the powder in an oxidizing atmosphere. The invention of these previously invented Mg-containing iron oxide film-coated iron powder were made based on the findings such as described in the following.

(Y) MgO—FeO—$Fe_2O_3$ ternary-based oxide is represented by, for example, (Mg, Fe)O and (Mg, Fe)$_3$$O_4$. Among this generally known Mg—Fe—O ternary-based oxide, at least (Mg, Fe)O is contained in a Mg—Fe—O ternary-based oxide deposition film which is formed on the surface of iron powder. The Mg-containing oxide film-coated iron powder having a surface coating of the Mg—Fe—O ternary-based oxide deposition film containing at least (Mg, Fe)O is remarkably superior in bonding of the oxide film to the iron particle compared with the conventional Mg-containing oxide film-coated iron powder formed by coating an Mg-containing ferrite on the surface of iron powder. Therefore, there is a lesser possibility that the oxide film as an insulation film is broken down during the press molding and particles of the iron powder are made to contact with each other. Therefore, even when the press-molded powder is subjected to strain-relief heat treatment at a high temperature, the insulation property of the oxide film is not reduced and high resistance is maintained. Therefore, eddy current loss is lowered. In addition, since the coercive force can be further reduced by further performing strain relief heat treatment, hysteresis loss can be reduced to a lower level. Therefore, a composite soft magnetic material of low core loss can be obtained.

(Z) It is preferable that the (Mg,Fe)O contained in the Mg—Fe—O ternary-based oxide deposition film of the above-described Mg-containing oxide film-coated iron powder is a crystalline MgO-dissolving wustite (a solid solution of MgO and wustite (FeO)).

(Γ) A sulfur-enriched layer is formed in a boundary portion between the iron powder particle and the Mg—Fe—O ternary-based oxide deposition film at least containing (Mg,Fe)O, where the sulfur concentration of the sulfur-enriched layer is higher than that of sulfur contained in a central portion of the iron powder as an unavoidable impurity.

(Δ) The above-described Mg—Fe—O ternary-based oxide deposition film at least containing (Mg, Fe)O has a fine crystalline texture having a grain size of 200 nm or less.

(Θ) It is preferable that an outer-most surface of the above-described Mg—Fe—O ternary-based oxide deposition film at least containing (Mg, Fe)O contain as much MgO as possible. Most preferably, the outer-most surface is substantially composed of MgO.

The Mg-containing iron oxide film-coated iron powder of the previous invention as described in (a) to (d) can be produced by: firstly producing an oxidizing-treated iron powder by forming an iron oxide film on the surface of iron powder by heating the iron powder at a temperature of 50 to 500° C. in an oxidizing atmosphere; adding Mg powder to the oxidizing-treated iron powder and mixing the powder; heating the obtained mixed powder at a temperature of 150 to 1100° C. in an inert atmosphere having a gas pressure of $1 \times 10^{-12}$ to $1 \times 10^{-1}$ MPa or in a vacuum atmosphere; and where necessary, further performing a second oxidizing treatment after heating the mixed powder at a temperature of 50 to 350° C. in an oxidizing atmosphere.

The Mg—Fe—O ternary-based oxide deposition film containing MgO-dissolving wustite phase and having an outermost surface substantially composed of MgO as described in the above (e) may be produced by: firstly producing an oxidizing-treated iron powder by forming an iron oxide film on the surface of iron powder by heating the iron powder at a temperature of 50 to 500° C. in an oxidizing atmosphere; adding a Mg powder of a further large amount to the oxidizing-treated iron powder and mixing the powder; heating the mixed powder at a temperature of 150 to 1100° C. in an inert atmosphere having a gas pressure of $1 \times 10^{-12}$ to $1 \times 10^{-1}$ MPa or in a vacuum atmosphere; and further performing a second oxidizing treatment to heat the mixed powder for a further long duration in an oxidizing atmosphere.

In Mg-wustite contained in the Mg—Fe—O ternary-based oxide deposition film formed on the surface of the previously invented Mg-containing iron oxide film-coated iron powder of the above described (a) to (e), content of oxygen is not limited by the ratio of (Mg,Fe):O=1:1, but may have a range of solubility.

In general, the term "deposition film" indicates a film formed by depositing vacuum-evaporated or sputtered film-forming atoms, for example, on a substrate. In the present invention, the Mg—Fe—O ternary-based oxide deposition film at least containing (Mg,Fe)O and formed on the surface of iron powder denotes a film deposited on the surface of iron powder particle being accompanied by reaction of Mg and iron oxide (Fe—O) on the surface of the iron powder particle having an iron oxide film. The Mg—Fe—O ternary-based oxide deposition film at least containing (Mg,Fe)O and formed on the surface of iron powder preferably has a film thickness in a range from 5 nm to 500 nm so as to ensure a high magnetic flux density and high resistivity of a composite soft magnetic material formed by compacting the powder. Where the film thickness is smaller than 5 nm, it is not preferable, because the composite soft magnetic material formed by compacting the powder cannot have a sufficient resistivity, and eddy current loss is increased. On the other hand, where the film thickness is larger than 500 nm, it is not preferable because magnetic flux density is decreased in the composite soft magnetic material formed by compacting the powder. More preferably, the film thickness may be in a range of 5 nm to 200 nm.

The Mg—Fe—O ternary-based oxide film at least containing (Mg, Fe)O formed on the surface of the previously invented Mg-containing iron oxide film-coated iron powder as described in the above (a) to (e) has a sulfur-enriched layer at the boundary portion between the Mg—Fe—O ternary-based oxide film at least containing (Mg, Fe)O and the iron powder particle, where the sulfur concentration of the sulfur-enriched layer is higher than that of sulfur contained in a central portion of the iron powder particle. The presence of the sulfur-enriched layer may be confirmed by performing analysis of the sulfur concentration by Auger electron spectroscopy, showing the results of the analysis, where a peak of the sulfur concentration is shown in the graph. By the presence of such a sulfur-enriched layer at the boundary portion, the Mg—Fe—O ternary-based oxide film at least containing (Mg, Fe)O has further improved bonding to the surface of iron powder, breakdown of the deposition film is prevented by tracking of the deposition film to deformation of the powder at the time of press molding the powder. High resistance is maintained by preventing contact and bonding of iron powder particles with each other at the time of heat treatment, and therefore eddy current loss is reduced. The iron powder contains sulfur as unavoidable impurities. It is considered that most of the sulfur in the sulfur-enriched layer is provided by the sulfur contained in the surface portion of the iron powder.

It is preferable that the grain size of crystals constituting the Mg—Fe—O ternary-based oxide deposition film at least containing (Mg, Fe)O and formed on the surface of the Mg-containing iron oxide film-coated iron powder of the above (a) to (e) is as small as possible. Preferably, the deposition film has a fine crystalline texture having a grain size of 200 nm or less. Because the film has such a fine crystalline texture, the fine crystalline Mg—Fe—O ternary-based oxide deposition film tracks the deformation of powder particle at the time of compacting the powder, and is prevented from breakdown. At the time of heat treatment, the iron powder is prevented from being made to contact and bonded with each other. When the powder is subjected to strain-relief heat treatment at a high temperature, because of the stable property of the oxide, reduction of insulation is prevented, high resistance is maintained, and eddy current loss is lowered. Where the grain size is larger than 200 nm, it is not preferable, because the film thickness of the Mg—Fe—O ternary-based oxide deposition film exceeds 500 nm, and magnetic flux density of compacted composite soft magnetic material is reduced.

The MgO content in the outermost surface of the Mg—Fe—O ternary-based oxide deposition film at least containing (Mg, Fe)O and formed on the surface of the Mg-containing iron oxide film-coated iron powder of the above (e) is preferably as high as possible. It is most preferable that the outermost surface is substantially composed of MgO. Where the outermost surface is substantially MgO, diffusion of Fe is inhibited at the time of heat treatment of the press-molded compact, the iron powder particles are prevented from contacting and bonding with each other, reduction of insulation is prevented, high resistance is ensured, and eddy current loss is lowered.

In the above-description, previously invented Mg-containing iron oxide film-coated iron powder as described in (a) to (e) is explained. An object of the present invention is to provide a composite soft magnetic powder having further improved compressibility and sinterability, and a method of producing the powder. Such a powder may be provided by further coating MgO—SiO$_2$ composite oxide film having a MgO/SiO$_2$ value in a range from 1.0 to 3.0 in molar ratio on the surface of the previously invented Mg-containing iron oxide film-coated iron powder as described in (a) to (e).

In general, MgO—SiO$_2$ composite oxide film has a high electric insulation property and relatively soft hardness (1 to 4 in Mohs hardness), is enriched in antifrictional action and lubricating action, and acts as lubricant at the time of compacting the powder.

Therefore, the composite soft magnetic powder having MgO—SiO$_2$ oxide deposition film formed on the surface of the previously invented Mg-containing iron oxide film-coated iron powder as described in the above (a) to (e) has further improved compressibility. In addition, since a melting point of MgO—SiO$_2$ composite oxide film is lower than that of MgO, composite soft magnetic powder of the present invention having MgO—$SiO_2$ oxide deposition film coated on the particle surface of the Mg-containing iron oxide film-coated iron powder as described in the above (a) to (e) has further improved sinterability.

Accordingly, the present invention has the following aspects.

(48) A composite soft magnetic powder comprising: Mg-containing iron oxide film-coated iron powder particles having iron powder particles and Mg—Fe—O ternary-based oxide deposition films which contain at least (Mg, Fe)O and are formed on surfaces of the iron powder particles; and MgO—$SiO_2$ composite oxide film which have a MgO/$SiO_2$ value in a range from 1.0 to 3.0 in molar ratio and are further coated on surfaces of the Mg-containing iron oxide film-coated iron powder particles.

(49) A composite soft magnetic powder comprising: Mg-containing iron oxide film-coated iron powder particles having iron powder particles, Mg—Fe—O ternary-based oxide deposition films which contain at least (Mg, Fe)O and are coated on surfaces of the iron powder particles, and sulfur-enriched layers in boundary portions between the iron powder particles and the Mg—Fe—O ternary-based oxide deposition films at least containing (Mg, Fe)O; and MgO—$SiO_2$ composite oxide films which have a MgO/$SiO_2$ value in a range from 1.0 to 3.0 in molar ratio and are further coated on surfaces of the Mg-containing iron oxide film-coated iron powder particles, wherein sulfur concentrations of the sulfur-enriched layers are higher than that of sulfur contained as an unavoidable impurity in central portions of the iron powder particles.

(50) A composite soft magnetic powder as described in the above (48) or (49), wherein (Mg,Fe)O included in the Mg—Fe—O ternary-based oxide deposition films of the above-described Mg-containing iron oxide film-coated iron powder is a crystalline MgO-dissolving wustite phase.

(51) A composite soft magnetic powder as described in the above (48), (49) or (50), wherein the Mg—Fe—O ternary-based oxide deposition films at least containing (Mg,Fe)O have microcrystalline structures having a grain size of 200 nm or less.

(52) A composite soft magnetic powder as described in the above-described (48), (49), (50) or (51), wherein outermost surfaces of the Mg—Fe—O ternary-based oxide deposition films at least containing (Mg,Fe)O are substantially composed of MgO.

The composite soft magnetic powder of the present invention as described in the above (48), (49), (50), (51) and (52) may be produced by: preparing a mixed oxide sol-solution of MgO and $SiO_2$ obtained by mixing, in volumetric ratio, alkoxysilane solution:1 and magnesium-alkoxide solution:1 to 3; adhering the sol-solution to the surface of the Mg-containing iron oxide film-coated iron powder as described in the above (a) to (e); and heating and drying the powder.

(53) A composite soft magnetic material comprising an iron particle phase and grain boundary phase surrounding the iron particle phase, wherein the grain boundary phase contains Mg—Fe—O ternary-based oxide including a crystalline MgO-dissolving wustite phase.

In order to solve the above-described problem the inventors previously invented Mg-containing oxide film-coated iron powder such as described in the following (f) to (k).

(f) A Mg-containing oxide film-coated iron powder comprising iron powder particles and Mg—Fe—O ternary-based oxide deposition films which include fine grained metallic Fe grains dispersed in the matrix and are coated on surfaces of the iron powder particles.

(g) A Mg-containing oxide film-coated iron powder comprising iron powder particles coated with Mg—Fe—O ternary-based oxide deposition films, wherein the Mg—Fe—O ternary-based oxide deposition films include fine grained metallic Fe grains dispersed in the matrix and have concentration gradients such that Mg and O decrease from exterior surfaces to the interior direction, and Fe increases to the interior direction.

(h) A Mg-containing oxide film-coated iron powder comprising iron powder particles coated with Mg—Fe—O ternary-based oxide deposition films as described in the above (f), or (g), having sulfur-enriched layers in boundary portions between the iron powder particles and the Mg—Fe—O ternary-based oxide deposition films, where the sulfur-enriched layers contain higher concentration of sulfur than that of sulfur contained in central portions of the iron powder particles.

(i) A Mg-containing oxide film-coated iron powder as described in the above (f), (g), or (h), wherein the Mg—Fe—O ternary-based oxide deposition films comprising ultra-fine metallic Fe grains in the matrix have a crystalline MgO-dissolving wustite phase in the matrix.

(j) A Mg-containing oxide film-coated iron powder as described in (f), (g) (h), or (i), wherein the above-described Mg—Fe—O ternary-based oxide deposition films comprising ultra-fine metallic Fe grains dispersed in the matrix have a microcrystalline structure having a grain size of 200 nm or less.

(k) A Mg-containing oxide film-coated iron powder as described in the above (f), (g) (h), (i), or (j), wherein the outermost surfaces of the above-described Mg—Fe—O ternary-based oxide deposition films comprising ultra-fine grained metallic Fe dispersed in the matrix are substantially composed of MgO.

The previously invented Mg-containing oxide film-coated iron powder as described in the above (f), (g), (h), (i), (j), or (k) is obtained by: firstly forming an iron powder (hereafter referred to as oxidation-treated iron powder) having a surface coating of iron oxide by performing oxidization treatment, for example, by heating the iron powder in an oxidizing atmosphere; adding Mg powder to the oxidation-treated iron powder and mixing the powder; heating thus obtained mixed powder in an inert gas atmosphere or in a vacuum atmosphere while tumbling the mixed powder; and further performing second oxidization treatment of the powder by heating the powder in an oxidizing atmosphere.

The obtained Mg—Fe—O ternary-based oxide deposition film of the previously invented Mg-containing iron oxide-coated iron powder was formed based on the findings as described in the following.

(A) Compared with the conventional Mg-containing iron oxide film made by forming Mg-containing ferrite film on the surface of iron powder through a chemical process, the oxide deposition film has remarkably excellent bonding to the iron powder particle. Therefore, there is a lesser likelihood that the iron particles are made to contact with each other by the deformation of the oxide film as an insulation film occurring in the press molding. Even when a high temperature finding for reducing strain is performed after press molding the powder, the oxide film is escaped from deterioration of insulation property, and maintains high resistance, and eddy current loss is lowered. By further performing heat treatment, coercive force is further reduced. Therefore, hysteresis loss is reduced to a lower level, and a composite soft magnetic material having a low core loss can be obtained.

(Ω) The above-described Mg—Fe—O ternary-based oxide deposition film comprises fine metallic Fe grains dispersed in the matrix and has a concentration gradient such that Mg and O decrease from exterior surface to the interior direction, and Fe increase to the interior direction.

(Π) In the above-described Mg-containing iron oxide film-coated iron powder, a sulfur-enriched layer is formed in a boundary portion between the iron powder and the Mg—Fe—O ternary-based oxide deposition film comprising ultra-fine metallic Fe grains dispersed in the matrix, where the sulfur concentration of the sulfur-enriched layer is higher than that of sulfur contained in a central portion of the iron powder as unavoidable impurities.

(Σ) The above-described Mg—Fe—O ternary-based oxide deposition film comprising ultra-fine grained metallic Fe particles dispersed in the matrix includes MgO-dissolving wustite phase (a material composed of solid solution of MgO and wustite (FeO)).

(Φ) The above-described Mg—Fe—O ternary-based oxide deposition film comprising ultra-fine grained metallic Fe dispersed in the matrix has a fine crystalline texture having a grain size of 200 nm or less.

(Ψ) It is preferable that the outermost surface of the above-described Mg—Fe—O ternary-based oxide deposition film contains as high an amount of MgO, and most preferably, the outermost surface is substantially composed of MgO.

More practically, a production process of the previously invented Mg-containing iron oxide film-coated iron powder as described in the above (f) to (j) can be explained as following, Firstly, oxidation-treated iron powder having an iron oxide film formed on the surface of iron powder is produced by preliminary heating the iron powder in an oxidizing atmosphere at a temperature of 50 to 500° C. Mg powder is added to and mixed with the oxidation-treated iron powder. While being rolled, obtained mixed powder is heated at a temperature of 150 to 1100° C. in an inert gas atmosphere or in a vacuum atmosphere having a pressure of $1 \times 10^{-12}$ to $1 \times 10^{-1}$ MPa. After that, where necessary, a second oxidization treatment is further performed, where the powder is heated at a temperature of 50 to 350° C. in an oxidizing atmosphere, In the previously invented Mg—Fe—O ternary-based oxide deposition film comprising ultra-fine grained metallic Fe dispersed in the matrix and having an outermost surface substantially composed of MgO as described in the above-described (k) may be produced by: forming an oxidation-treated iron powder having an iron oxide film formed on the surface of iron powder by preliminary heating the iron powder in an oxidizing atmosphere at a temperature of 50 to 500° C.; adding further large amount of Mg powder to the oxidation-treated iron powder having the relatively thick iron oxide film and mixing the powder; heating thus obtained mixed powder at a temperature of 150 to 1100° C. in an inert gas atmosphere or in a vacuum atmosphere having a pressure of $1 \times 10^{-12}$ to $1 \times 10$ MPa, while tumbling the mixed powder; and further performing second oxidization treatment where the powder is heated at a temperature of 50 to 350° C. in an oxidizing atmosphere for a further long duration.

In general, "deposition film" is a term denoting a film made of vacuum evaporated or sputtered film-forming atoms deposited on the surface of, for example, a substrate. In the present invention, the Mg—Fe—O ternary-based oxide deposition film formed on the surface of the iron powder of the present invention and comprising ultra-fine grained metallic Fe particles in the matrix denotes a film deposited on the surface of the iron powder particle being accompanied with a reaction of Mg and iron oxide (Fe—O) on the surface of the oxidation-treated iron powder. Since extremely fine particles of metallic Fe are dispesed in the matrix of the Mg-containing oxide film comprising Mg—Fe—O ternary-based oxide, the Mg—Fe—O ternary-based oxide deposition film according to the present invention, comprising ultra-fine grained metallic Fe particles dispersed in the matrix has a high toughness. Therefore, the deposition film sufficiently tracks the deformation of the iron powder at the time of press molding, and has remarkably excellent adherence to the iron powder. In addition, the Mg—Fe—O ternary-based oxide deposition film according to the present invention, comprising ultra-fine grained metallic Fe particles dispersed in the matrix preferably contains MgO-dissolving wustite. More preferably, the MgO-dissolving wustite has a crystalline structure.

Preferably, the Mg—Fe—O ternary-based oxide deposition film formed on the surface of the iron powder of the present invention and comprising ultra-fine grained metallic Fe particles dispersed in the matrix has a film-thickness in a range from 5 to 500 nm so as to ensure high magnetic flux density and high resistivity of the composite soft magnetic material formed by compacting the powder. Where the film thickness is smaller than 5 nm, it is not preferable, since the resistivity is not sufficient and eddy current loss is increased in the composite soft magnetic material formed by compacting the powder. On the other hand, where the film thickness is larger than 500 nm, it is not preferable since the magnetic flux density is decreased in the composite soft magnetic material formed by compacting the powder. More preferably, the film thickness is in a range from 5 to 200 nm.

The Mg—Fe—O ternary-based oxide film formed on the surface of the previously invented Mg-containing iron oxide film-coated iron powder as described in the above (f) to (k) has a sulfur-enriched layer at the boundary portion between the iron powder and the Mg—Fe—O ternary-based oxide film comprising fine metallic Fe particles dispersed in the matrix, where the sulfur concentration of the sulfur-enriched layer is higher than that of sulfur contained in a central portion of the iron powder. The presence of the sulfur-enriched layer may be confirmed by performing analysis of the sulfur concentration by Auger electron spectroscopy, showing the results of the analysis, where a peak of the sulfur concentration is shown in the graph. By the presence of such a sulfur-enriched layer at the boundary portion, the Mg—Fe—O ternary-based oxide film comprising ultra-fine grained metallic Fe particles dispersed in the matrix has further improved bonding to the surface of iron powder, breakdown of the deposition film is prevented by tracking of the deposition film to deformation of the powder at the time of compacting the powder. High resistance is maintained by preventing contact and bonding of iron powder particles with each other at the time of heat treatment, high resistance is maintained, and therefore eddy current loss is reduced. The iron powder contains sulfur as unavoidable impurities. It is considered that most of the sulfur in the sulfur-enriched layer is provided by the sulfur contained in the surface portion of the iron powder.

It is preferable that the grain size of crystals constituting the Mg—Fe—O ternary-based oxide deposition film formed on the surface of the Mg-containing iron oxide film-coated iron powder of the above (f) to (k) is as small as possible. Preferably, the deposition film has a fine crystalline texture having a grain size of 200 nm or less. Because the film has such a fine crystalline texture, the fine crystalline Mg—Fe—O ternary-based oxide deposition film tracks the deformation of powder particle at the time of compacting the powder, and is prevented from breakdown. At the time of heat-treating, particles of the iron powder is prevented from being made to contact and bonded with each other. When the powder is subjected to strain-relief heat treatment at high temperature, because of the stable property of the oxide, reduction of insulation is prevented, high resistance is maintained, and eddy current loss is lowered. Where the grain size is larger than 200 nm, it is not preferable, because the film thickness of the Mg—Fe—O ternary-based oxide deposition film exceeds 500 nm, and magnetic flux density of compacted composite soft magnetic material is reduced.

The MgO content in the outermost surface of the Mg—Fe—O ternary-based oxide deposition film formed on the surface of the Mg-containing iron oxide film-coated iron powder of the above (k) is preferably as high as possible. It is most preferable that the outermost surface is substantially composed of MgO. Where the outermost surface is substantially MgO, diffusion of Fe is inhibited at the time of heat treatment of the press-molded compact, the iron powder particles are prevented from contacting and bonding with each other, reduction of insulation is prevented, high resistance is ensured, and eddy current loss is lowered.

An object of the present invention is to provide a composite soft magnetic powder produced by further coating MgO—$SiO_2$ composite oxide film having a $MgO/SiO_2$ value in a range from 1.0 to 3.0 in molar ratio on the surface of the previously invented Mg-containing iron oxide film-coated iron powder as described in (f) to (k). That is, the present invention has the following aspects.

(54) A composite soft magnetic powder comprising: Mg-containing iron oxide film-coated iron powder particles having iron powder particles, and Mg—Fe—O ternary-based oxide deposition films which disperse fine Fe grains in the matrices and are coated on surfaces of the iron powder particles; and MgO—$SiO_2$ composite oxide films which have a $MgO/SiO_2$ value in a range from 1.0 to 3.0 in molar ratio and are further coated on surfaces of the Mg-containing iron oxide film-coated iron powder particles.

(55) A composite soft magnetic powder comprising: Mg-containing oxide film-coated iron powder particles having iron powder particles and Mg—Fe—O ternary-based oxide deposition films coated on surfaces of the iron powder particles; and MgO—$SiO_2$ composite oxide films which have a $MgO/SiO_2$ value in a range from 1.0 to 3.0 in molar ratio and are coated on surfaces of the Mg-containing oxide film-coated iron powder particles, wherein the Mg—Fe—O ternary-based oxide deposition films include fine metallic Fe grains dispersed in the matrices and have a concentration gradient where Mg and O decrease from exterior surfaces towards the interior direction, and Fe increases towards the interior direction.

(56) A composite soft magnetic powder as described in the above (54) or (55), wherein the Mg-containing oxide film-coated iron powder particles further comprise sulfur-enriched layers in boundary portions between the iron powder particles and the Mg—Fe—O ternary-based oxide deposition films, where the sulfur-enriched layers contain higher concentrations of sulfur than that contained in central portions of the iron powder particles.

(57) A composite soft magnetic powder as described in the above (54), (55), or (56), wherein the Mg—Fe—O ternary-based oxide deposition films dispersing ultra-fine grained metallic Fe grains in the matrix have a crystalline MgO-dissolving wustite phase in the matrices.

(58) A Mg-containing oxide film-coated iron powder as described in the above (54), (55), (56), or (57), wherein the above-described Mg—Fe—O ternary-based oxide deposition films have microcrystalline structures having a grain size of 200 nm or less.

(59) A Mg-containing oxide film-coated iron powder as described in the above (54), (55), (56), (57) or (58), wherein the outermost surfaces of the above-described Mg—Fe—O ternary-based oxide deposition films are substantially composed of MgO.

The composite soft magnetic powder of the present invention as described in the above (54), (55), (56), (57), (58) and (59) may be produced by: preparing a mixed oxide sol-solution of MgO and $SiO_2$ obtained by mixing, in volumetric ratio, alkoxysilane solution:1 and magnesium-alkoxide solution:1 to 3; adhering the sol-solution to the surface of the Mg-containing iron oxide film-coated iron powder as described in the above (f), (g), (h), (i), (j), or (k); and heating and drying the powder.

(60) A composite soft magnetic material constituted of an iron particle phase and grain boundary phase surrounding the iron particle phase, where the grain boundary phase contains Mg—Fe—O ternary-based oxide including crystalline MgO-dissolving wustite phase.

BEST MODE FOR CARRYING OUT THE INVENTION

Example 1

As a stock powder (raw powder material), pure iron powder having a mean grain size of 70 μm and including a trace amount of sulfur as an unavoidable impurity was prepared. In addition, Mg powder having a mean grain size of 50 μm was prepared. Oxidation-treated iron powder having an iron oxide film on the surface was produced by performing oxidization treatment of the pure iron powder by heating the iron powder at a temperature of 220° C. for 2 hours in air. A mixed powder was produced by adding the prepared Mg powder to the oxidation-treated iron powder in a proportion of oxidation-treated iron powder: Mg powder=99.8 mass %:0.2 mass %, and mixing the powder. The obtained mixed powder was retained at a temperature of 650° C. under a pressure of $2.7 \times 10^{-4}$ MPa for 1 hour, and further retained at a temperature of 200° C. for 1 hour in air. Thus, Mg-containing oxide film-coated iron powder 1 of the present invention having a coating of deposition film on the surface of iron powder was produced. The texture of the deposition film formed on the Mg-containing oxide film-coated iron powder 1 of the present invention was observed using a transmission electron microscope and a thickness and maximum grain size of the deposition film were determined. The results are shown in Table 1. In addition, electron beam diffraction patterns obtained from the Mg-containing oxide film-coated iron powder 1 of the present invention showed the presence of a MgO-dissolving wustite phase in the film.

By the analysis of bonding energies by analyzing the deposition film formed on the surface of Mg-containing oxide film-coated iron powder 1 of the present invention using an X-ray photoelectron spectrometer, it was confirmed that the deposition film was a Mg—Fe—O ternary-based oxide deposition film at least containing (Mg, Fe)O. In addition, boundary portion between the iron powder and the Mg—Fe—O ternary-based oxide deposition film was examined by a method using an Auger electron spectrometer, and the results are shown in the graph of FIG. 1.

Figure 1:
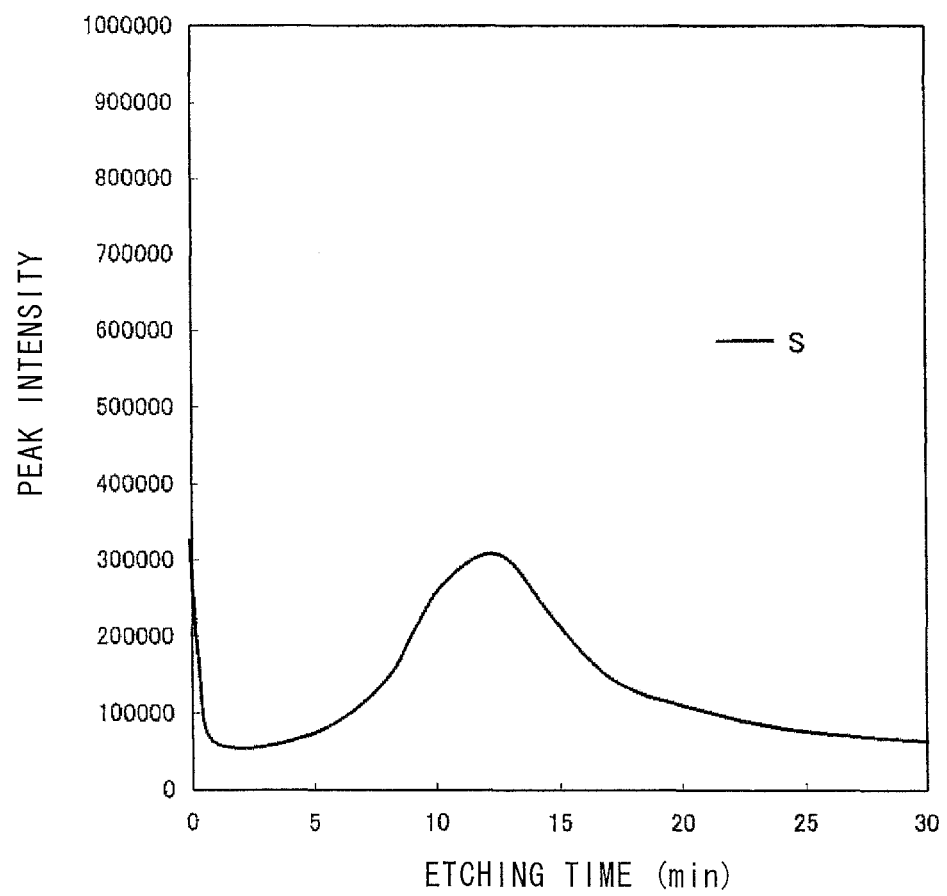
FIG. 1 is a graph showing a result of Auger electron spectroscopic analysis of sulfur distribution in the thickness direction of a Mg—Fe—O ternary-based oxide deposition film at least containing (Mg, Fe)O.

In the graph of FIG. 1, the vertical axis denotes a peak intensity of Auger electron, and the horizontal axis denotes time of etching the coating deposition film. A long etching time denotes a deep position in the coating deposition film. In FIG. 1, the graph of sulfur concentration detected by Auger electron spectroscopy shows a peak of the sulfur concentration. In this graph, a sulfur peak of Auger electron spectrum obviously higher than the background constituted of impurity sulfur contained in the central portion of iron powder was obviously detected in the boundary portion between the deposition film and iron powder, where the boundary portion corresponded to etching time of 10 to 15 minutes. Thus, from the observation of this graph, the presence of a sulfur-enriched layer containing a higher concentration of sulfur than that of the core portion of iron powder was confirmed in the boundary portion between the deposition film and iron powder.

Example 2

Oxidation-treated iron powder having an iron oxide film on the surface was produced by oxidizing the pure iron powder prepared in Example 1 by retaining at a temperature of 210° C. for 3 hours in air. Compared with Example 1, a larger amount of Mg powder was added to, and mixed with the oxidation-treated iron powder, and a mixed powder having a proportion of oxidation treated iron powder:Mg powder=99.5 mass %:0.5 mass % was prepared. The obtained mixed powder was retained for 1 hour at a temperature of 670° C. under a pressure of $1 \times 10^{-5}$ MPa, and further retained for 1 hour at a temperature of 200° C. in air. Thus the Mg-containing oxide-film coated iron powder 2 comprising iron powder having a surface coating of a deposition film was produced. The texture of the deposition film formed on the Mg-containing oxide film-coated iron powder 2 of the present invention was observed using a transmission electron microscope and a thickness and maximum grain size of the deposition film were determined. The results are shown in Table 1. In addition, from electron beam diffraction patterns obtained from the deposition film, it was confirmed that the film contained crystalline MgO-dissolving wustite.

By the analysis of bonding energies by analyzing the deposition film formed on the surface of Mg-containing oxide film-coated iron powder 2 of the present invention using an X-ray photoelectron spectrometer, it was confirmed that the deposition film was a Mg—Fe—O ternary-based oxide deposition film at least containing (Mg, Fe)O, and the outermost surface of the Mg—Fe—O ternary-based oxide deposition film was composed of MgO. In addition, in the same manner as in Example 1, concentration distributions of Mg, Fe, and O were examined using an Auger electron spectroscopic analyzer. As a result, the presence of a sulfur-enriched layer containing a higher concentration of sulfur than that of the core portion of iron powder was confirmed in the boundary portion between the deposition film and iron powder.

Example 3

Oxidation-treated iron powder having an iron oxide film on the surface was produced by oxidizing the pure iron powder prepared in Example 1 by retaining at a temperature of 220° C. for 1.5 hours in air. Compared with Example 1, a larger amount of Mg powder was added to, and mixed with the oxidation-treated iron powder, and a mixed powder having a proportion of oxidation treated iron powder:Mg powder=99.7 mass %:0.3 mass % was prepared. The obtained mixed powder was retained for 1 hour at a temperature of 640° C. under a pressure of $1 \times 10^{-4}$ MPa, and further retained for 1.5 hour at a temperature of 200° C. in air. Thus, the Mg-containing oxide-film coated iron powder 3 of the present invention comprising iron powder having a surface coating of a deposition film was produced. The texture of the deposition film was observed using a transmission electron microscope and a thickness and maximum grain size of the deposition film were determined. The results are shown in Table 1.

By the analysis of bonding energies by analyzing the deposition film formed on the surface of Mg-containing oxide film-coated iron powder 3 of the present invention using an X-ray photoelectron spectrometer, it was confirmed that the deposition film was a Mg—Fe—O ternary-based oxide deposition film at least containing (Mg, Fe)O, and the outermost surface of the Mg—Fe—O ternary-based oxide deposition film was composed of MgO. In addition, in the same manner as in Example 1, concentration distributions of Mg, Fe, and O were examined using an Auger electron spectroscopic analyzer. As a result, the presence of a sulfur-enriched layer containing a higher concentration of sulfur than that of the core portion of iron powder was confirmed in the boundary portion between the Mg—Fe—O ternary-based oxide deposition film and iron powder.

The Mg-containing oxide film-coated iron powders 1-3 of the present invention obtained in Examples 1 to 3 were charged in moulds, and were press-molded into compacts, thereby plate-shaped compacts each having a dimension of length: 55 mm, width: 10 mm, and thickness: 5 mm, and ring-shaped compacts each having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic materials constituted of the plate shaped heat-treated articles were subjected to measurements of resistivity, and the results are shown in Table.1. Windings were formed on the composite soft magnetic materials constituted of the ring-shaped heat-treated article, and magnetic flux density, coercive force, core loss under conditions of magnetic flux density of 1.5 T and frequency of 50 Hz, and core loss under conditions of magnetic flux density of LOT and frequency of 400

Hz were measured. The results are shown in Table 1. In addition, the composite soft magnetic material utilizing the Mg-containing oxide film-coated iron powder 2 of the present invention obtained in Example 2 was observed using a transmission electron microscope. As a result, an iron particle phase and grain boundary phase surrounding the iron particle phase were observed. From the electron beam diffraction pattern obtained from the grain boundary phase, it was confirmed that the grain boundary phase contained Mg—Fe—O ternary-based oxides including crystalline MgO-dissolving wustite.

Conventional Example 1

Conventional oxide-coated iron powder 1 was produced by chemically forming Mg-containing ferrite layer on the surface of the pure iron powder prepared in Example 1. The conventional oxide-coated iron powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The plate-shaped composite soft magnetic material was subjected to measurement of resistivity, and the result is shown in Table.1. Winding was formed on the composite soft magnetic material constituted of the ring-shaped heat-treated article, and magnetic flux density, coercive force, core loss under conditions of magnetic flux density of 1.5 T and frequency of 50 Hz, and core loss under conditions of magnetic flux density of 1.0 T and frequency of 400 Hz were measured. The results are shown in Table 1.

duced using conventional oxide-coated iron powder 1, composite soft magnetic materials produced using Mg-containing oxide film-coated iron powders 1-3 of the present invention have high magnetic flux density, low coercive force, remarkably high resistivity, and therefore have remarkably low core loss which is especially low as the frequency increases. Therefore, it is understood that compared to the conventional oxide-coated iron powder 1, Mg-containing oxide film-coated powders 1 to 3 of the invention are soft magnetic raw material powders which can provide composite soft magnetic materials having further excellent properties.

Example 4

Figure 4:
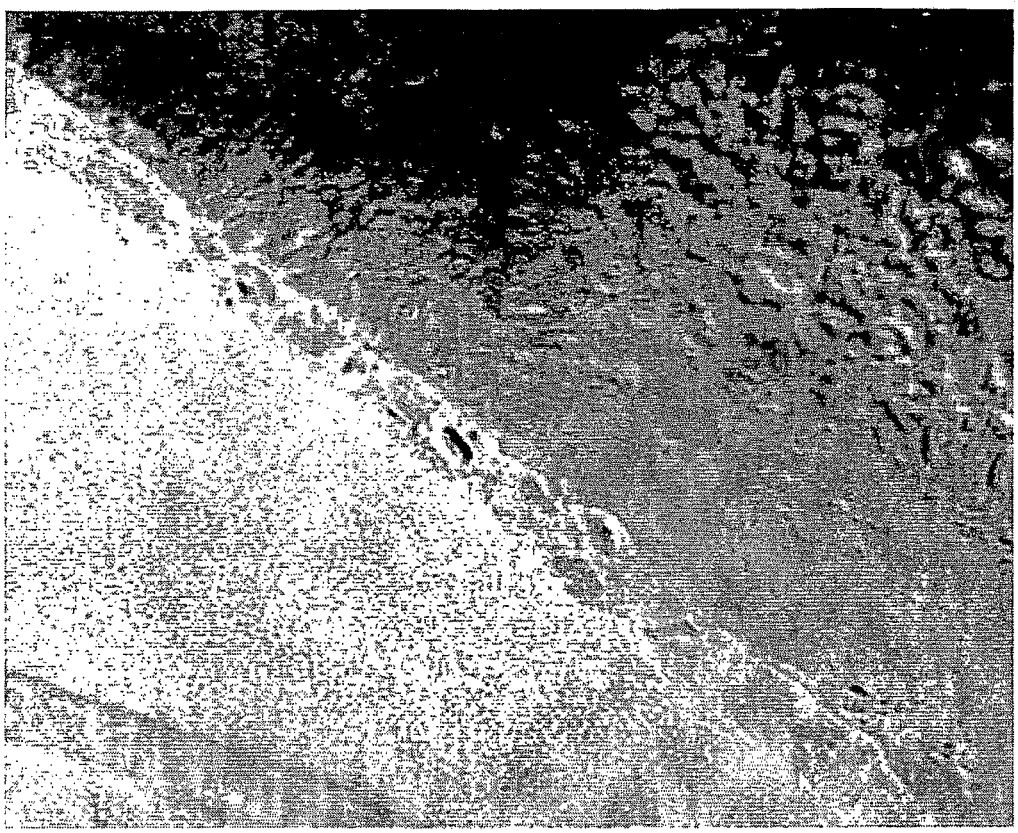
FIG. 4 is a electron microscopic image showing a texture of a section of a Mg—Fe—O ternary-based oxide deposition film having fine metallic Fe particles dispersed in the matrix.

As a stock powder, pure iron powder having a mean grain size of 70 µm and including a trace amount of sulfur as an unavoidable impurity was prepared. In addition, Mg powder having a mean grain size of 50 µm was prepared. Oxidation-treated iron powder having an iron oxide film on the surface was produced by performing oxidization treatment of the pure iron powder by heating the iron powder at a temperature of 220° C. for 2 hours in air. A mixed powder was produced by adding the prepared Mg powder to the oxidation-treated iron powder in a proportion of oxidation-treated iron powder: Mg powder ~99.8 mass %:0.2 mass %, and mixing the powder. The obtained mixed powder was retained at a temperature of 650° C. under a pressure of $1 \times 10^{-4}$ MPa for 1 hour while being rolled. Thus, Mg-containing oxide film-coated iron powder 4 of the present invention having a coating of deposition film on the surface of iron powder was produced. The texture of the deposition film formed on the Mg-containing oxide film-coated iron powder 4 of the present invention was observed using a transmission electron microscope and a thickness and maximum grain size of the deposition film were determined. The results are shown in Table 2, FIG. 4 is a

TABLE 1

| OXIDE-COATED IRON POWDER | | THE PRESENT INVENTION | | | CONVENTIONAL 1 |
|---|---|---|---|---|---|
| | | 1 | 2 | 3 | |
| Mg—Fe—O ternary-based oxide deposition film containing (Mg, Fe)O | Thickness (nm) | 40 | 100 | 50 | — |
| | Maximum grain size | 20 | 70 | 30 | — |
| | Concentration gradient of Mg, Fe, O | present | present | present | — |
| | Sulfur-enriched layer in boundary portion | present | present | present | — |
| | MgO in the outermost surface | absent | present | present | — |
| Properties of composite soft magnetic material | Density (g/cm³) | 7.67 | 7.64 | 7.66 | 7.65 |
| | Flux density B10KA/m (T) | 1.69 | 1.66 | 1.68 | 1.60 |
| | Coercive force (A/m) | 190 | 185 | 190 | 220 |
| | Core loss* (W/kg) | 8.0 | 8.0 | 7.9 | 60 |
| | Core loss** (W/kg) | 47 | 47 | 45 | 800 |
| | Resistivity (µΩm) | 110 | 130 | 120 | 0.4 |

Core loss* denotes core loss at flux density of 1.5T and frequency of 50 Hz
Core loss denotes core loss at flux density of 1.0T and frequency of 400 Hz From the result shown in Table 1, the following are understood. Where composite soft magnetic materials produced using Mg-containing oxide film-coated iron powder 1-3 of the present invention are compared with the conventional composite soft magnetic material produced using conventional oxide-coated iron powder 1, no remarkable difference can be observed in the density. On the other hand, compared to the conventional composite soft magnetic material prophotograph of texture taken in the observation of the sectional texture of the above-described deposition film using the transmission electron microscope. From FIG. 4**, it can be understood that a deposition film of the present invention is coated on the surface of the iron powder (upper right), and that the deposition film has a thickness of 40 nm and maximum grain size of 20 nm. In addition, electron beam diffraction patterns obtained from the deposition film of the present invention showed the presence of a MgO-dissolving wustite phase in the film.

By the analysis of bonding energies by analyzing the deposition film formed on the surface of Mg-containing oxide film-coated iron powder 4 of the present invention using an X-ray photoelectron spectrometer, it was confirmed that fine particles of metallic Fe were dispersed in the matrix. In addition, it was confirmed that the outermost surface of the deposition film dispersing the fine metallic Fe particles in the matrix was composed of MgO. In addition, concentration distributions of Mg, O, and Fe in depth direction of the deposition film were examined using an Auger electron spectroscopic analyzer, and the results are shown in FIG. 2

Figure 2:
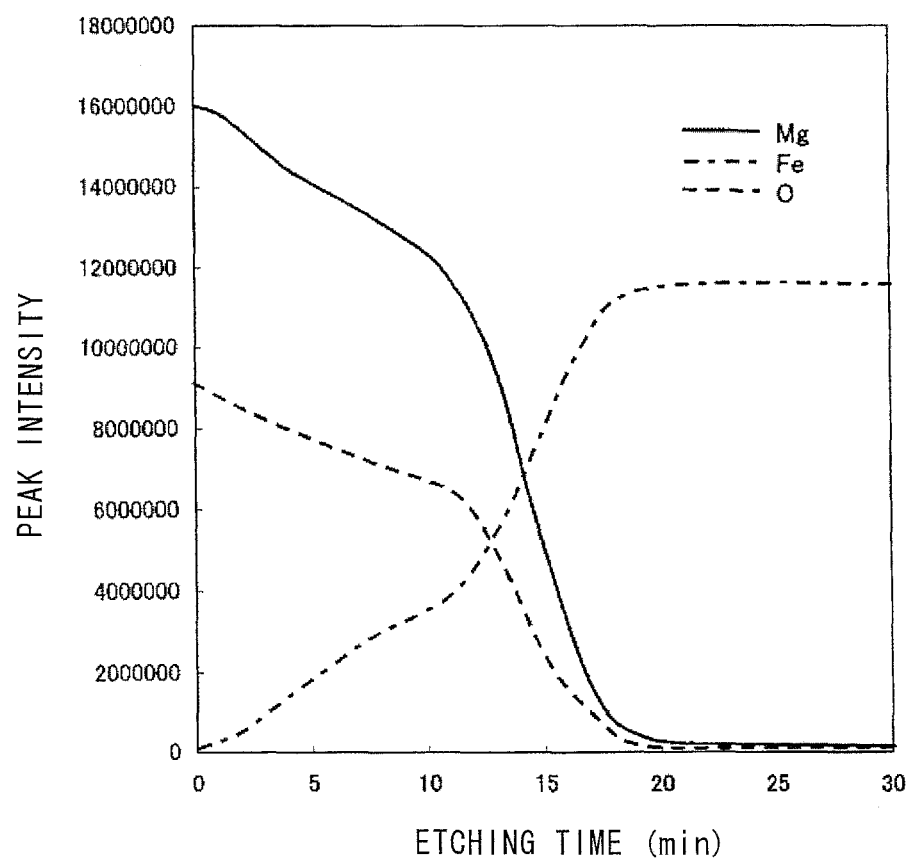
FIG. 2 is a graph showing a result of Auger electron spectroscopic analysis of distribution of Mg, O, and Fe concentrations in thickness direction of a Mg—Fe—O ternary-based oxide deposition film having fine metallic Fe particles dispersed in the matrix.

The graph of FIG. 2 shows analytical results in depth direction of the deposition film. In the graph of FIG. 2, the vertical axis denotes a peak intensity of Auger electron, and the horizontal axis denotes time of etching the coating deposition film. A long etching time denotes a deep position in the coating deposition film. From FIG. 2, it can be understood that the film has concentration gradients of Mg and O decreasing from the surface towards the interior direction, and has a concentration gradient of Fe increasing towards the interior direction. Therefore, it can be understood that: the deposition film of the Mg-containing oxide film-coated iron powder 4 of the present invention is a Mg—Fe—O ternary-based oxide deposition film dispersing fine Fe particles in the matrix; the Mg—Fe—O ternary-based oxide deposition film has concentration gradients such that Mg and O decreases from the surface towards the interior direction, and Fe increases towards the interior direction; the deposition film includes crystalline MgO-dissolving wustite phase; and the outermost surface of the deposition film was composed of MgO.

Figure 3:
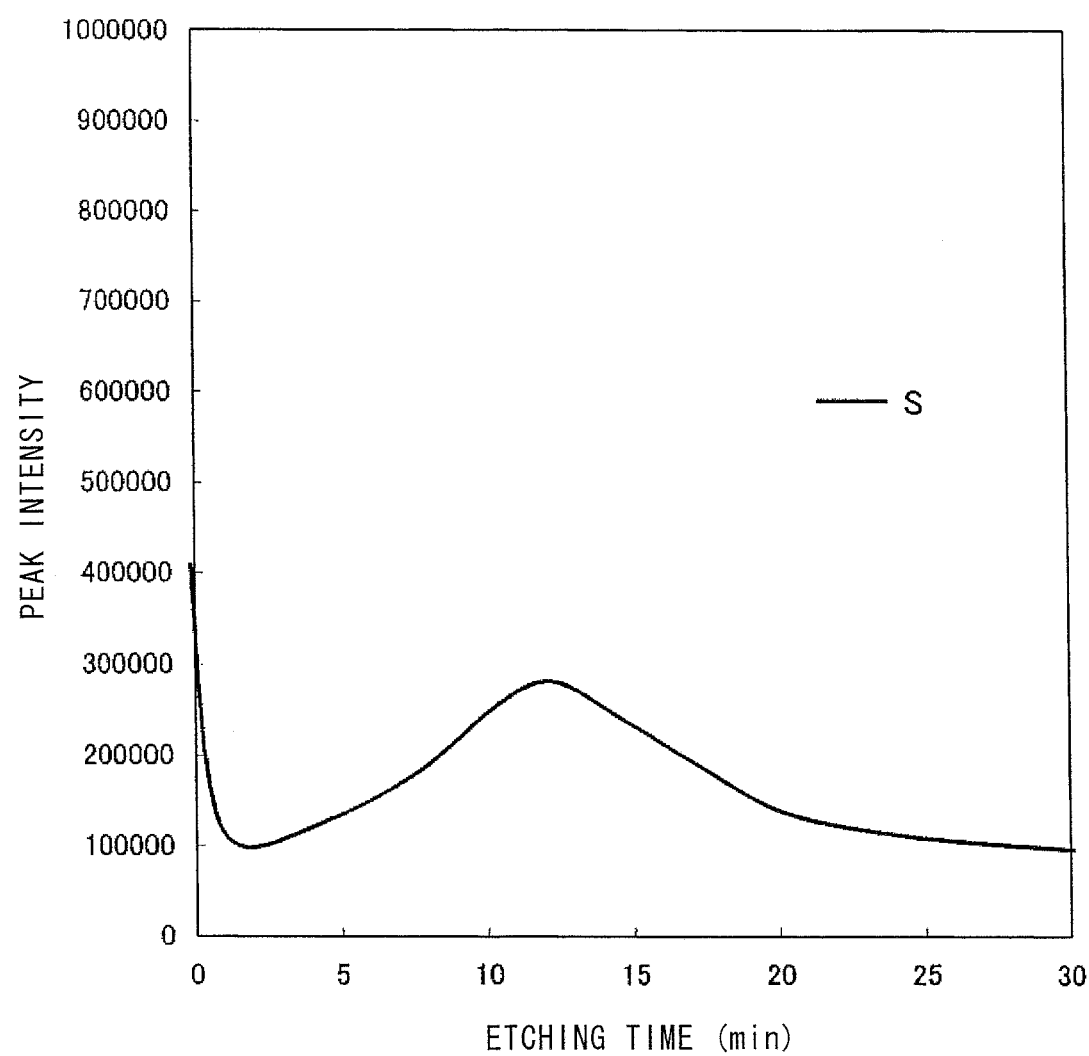
FIG. 3 is a graph showing a result of Auger electron spectroscopic analysis of sulfur distribution in the thickness direction of a Mg—Fe—O ternary-based oxide deposition film having fine metallic Fe particles dispersed in the matrix.

In addition, boundary portion between the iron powder and the Mg—Fe—O ternary-based oxide deposition film was examined by using an Auger electron spectroscopic analyzer. The results are shown in the graph of FIG. 3. In the graph of FIG. 3, the vertical axis denotes a peak intensity of Auger electron, and the horizontal axis denotes time of etching the coating deposition film. As long an etching time denotes as deep a position in the coating deposition film. In FIG. 1, the graph of sulfur concentration detected by Auger electron spectroscopy shows a peak of the sulfur concentration. In this graph, a sulfur peak of Auger electron spectrum obviously higher than the background constituted of impurity sulfur (background) contained in the central portion of iron powder was obviously detected in the boundary portion between 1 the deposition film and iron powder, where the boundary portion corresponded to etching time of 10 to 15 minutes. Thus, from the observation of this graph, the presence of a sulfur-enriched layer containing a higher concentration of sulfur than that of the core portion of iron powder was confirmed in the boundary portion between the deposition film and iron powder.

Example 5

Oxidation-treated iron powder having an iron oxide film on the surface was produced by oxidizing the pure iron powder prepared in Example 4 by retaining the powder at a temperature of 215° C. for 3 hours in air. Compared with Example 4, a larger amount of Mg powder was added to, and mixed with the oxidation-treated iron powder, and a mixed powder having a proportion of oxidation treated iron powder: Mg powder=99.5 mass %:0.5 mass % was prepared. By retaining the obtained mixed powder for 1 hour at a temperature of 660° C. under a pressure of $1 \times 10^{-4}$ MPa while tumbling the mixed powder, Mg-containing oxide-film coated iron powder 5 of the invention comprising iron powder having a surface coating of a deposition film was produced.

Texture of a section of the deposition film formed on the Mg-containing oxide film-coated iron powder 5 of the present invention was observed using a transmission electron microscope and a thickness and maximum grain size of the deposition film were determined. The results are shown in Table 2. In addition, from electron beam diffraction patterns obtained from the deposition film, it was confirmed that the film contained crystalline MgO-dissolving wustite phase.

By the analysis of bonding energies by analyzing the deposition film formed on the surface of Mg-containing oxide film-coated iron powder 5 of the present invention using an X-ray photoelectron spectrometer, it was confirmed that fine metallic iron particles were dispersed in the matrix of the deposition film, the deposition film included MgO-dissolving wustite phase, and the outermost surface of the deposition film was composed of MgO. Therefore, it can be understood that: the deposition is a Mg—Fe—O ternary-based oxide deposition film dispersing fine Fe particles in the matrix; the deposition film includes crystalline MgO-dissolving wustite phase; and the outermost surface of the deposition film was composed of MgO.

In addition, in the same manner as in Example 4, concentration distributions of Mg, Fe, and O were examined using an Auger electron spectroscopic analyzer. As a result, it was confirmed that the deposition film had concentration gradients such that Mg and O decreased from the surface towards the interior direction, and Fe increased towards the interior direction and that a sulfur-enriched layer containing a higher concentration of sulfur than that of the core portion of iron powder was present in the boundary portion between the iron powder and the Mg—Fe—O ternary-based oxide deposition film.

Example 6

Oxidation-treated iron powder having an iron oxide film on the surface was produced by oxidizing the pure iron powder prepared in Example 4 by retaining at a temperature of 220° C. for 2.0 hours in air. Compared with Example 4, a larger amount of Mg powder was added to, and mixed with the oxidation-treated iron powder, and a mixed powder having a proportion of oxidation treated iron powder Mg powder=99.7 mass %; 0.3 mass % was prepared. By retaining the obtained mixed powder for 1 hour at a temperature of 640° C. under a pressure of $1 \times 10^{-5}$ MPa while tumbling the mixed powder, Mg-containing oxide-film coated iron powder 6 of the present invention comprising iron powder having a surface coating of a deposition film was produced. The texture of the deposition film was observed using a transmission electron microscope and a thickness and maximum grain size of the deposition film were determined. The results are shown in Table 2. In addition, from the electron beam diffraction pattern obtained from the deposition film, it was confirmed that the film included crystalline MgO-dissolving wustite phase.

In the analysis of the deposition film formed on the surface of Mg-containing oxide film-coated iron powder 6 of the present invention using an X-ray photoelectron spectrometer, from the bonding energies, it was confirmed that at least fine metallic Fe particles were dispersed in the matrix of the deposition film, the deposition film included MgO dissolving wustite phase, and that the outermost surface of the Mg—Fe—O ternary-based oxide deposition film was composed of MgO. Therefore, it can be understood that the deposition film of the Mg-containing oxide film-coated iron powder 6 of the present invention is a Mg—Fe—O ternary-based oxide deposition film, the deposition film includes crystalline MgO-dissolving wustite phase, and the outermost surface of the deposition film is composed of MgO.

In addition, in the same manner as in Example 4, concentration distributions of Mg, O, and Fe of the deposition film was examined using an Auger electron spectroscopic analyzer. As a result, it was confirmed that: the deposition film had concentration gradients such that Mg and O decreased from the surface towards the interior direction, and Fe increased towards the interior direction; and that a sulfur-enriched layer containing a higher concentration of sulfur than that of the core portion of iron powder was present in the boundary portion between the iron powder and the Mg—Fe—O ternary-based oxide deposition film.

The Mg-containing oxide film-coated iron powders 4-6 of the present invention obtained in Examples 4 to 6 were charged in moulds, and were press-molded into compacts, thereby plate-shaped compacts each having a dimension of length: 55 mm, width: 10 mm, and thickness: 5 mm, and ring-shaped compacts each having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The plate-shaped composite soft magnetic materials were subjected to measurements of resistivity, and the results are shown in Table.2. Windings were formed on the composite soft magnetic materials constituted of the ring-shaped heat-treated article, and magnetic flux density, coercive force, core loss under conditions of magnetic flux density of 1.5 T and frequency of 50 Hz, and core loss under conditions of magnetic flux density of 1.0 T and frequency of 400 Hz were measured. The results are shown in Table 2. In addition, composite soft magnetic materials utilizing the Mg-containing oxide film coated iron powder 4 to 6 of the present invention obtained in Example 4 to 6 were observed using a transmission electron microscope. As a result, iron particle phase originated from the iron powder and grain boundary phase surrounding the iron particle phase were observed in each of the composite soft magnetic materials. From the electron beam diffraction patterns obtained from the grain boundary phases, it was confirmed that the grain boundary phases contained Mg—Fe—O ternary-based oxides including crystalline MgO-dissolving wustite phase.

Conventional Example 2

Conventional oxide-coated iron powder 2 was produced by chemically forming Mg-containing ferrite layer on the surface of the pure iron powder prepared in Example 4. The conventional oxide-coated iron powder 2 was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of resistivity, and the result is shown in Table.2. Winding was formed on the composite soft magnetic material constituted of the ring-shaped heat-treated article, and magnetic flux density, coercive force, core loss under conditions of magnetic flux density of 1.5 T and frequency of 50 Hz, and core loss under conditions of magnetic flux density of 1.0 T and frequency of 400 Hz were measured. The results are shown in Table 2.

TABLE 2

| OXIDE-COATED IRON POWDER | | THE PRESENT INVENTION | | | CONVENTIONAL 1 |
|---|---|---|---|---|---|
| | | 4 | 5 | 6 | |
| Mg—Fe—O ternary-based oxide deposition film dispersing ultra-fine metallic Fe particles | Thickness (nm) | 40 | 110 | 60 | — |
| | Maximum grain size | 20 | 80 | 30 | — |
| | Concentration gradient of Mg, Fe, O | present | present | present | — |
| | Sulfur-enriched layer in boundary portion | present | present | present | — |
| | MgO in the outermost surface | present | present | present | — |
| Properties of composite soft magnetic material | Density (g/cm$^3$) | 7.68 | 7.65 | 7.67 | 7.65 |
| | Flux density B10KA/m (T) | 1.70 | 1.67 | 1.70 | 1.60 |
| | Coercive force (A/m) | 185 | 180 | 185 | 220 |
| | Core loss* (W/kg) | 8.1 | 8.0 | 8.0 | 60 |
| | Core loss** (W/kg) | 49 | 48 | 47 | 800 |
| | Resistivity (μΩm) | 105 | 120 | 115 | 0.4 |

Core loss* denotes core loss at flux density of 1.5T and frequency of 50 Hz
Core loss** denotes core loss at flux density of 1.0T and frequency of 400 Hz From the results shown in Table 2, the following are understood. Where composite soft magnetic materials produced using Mg-containing oxide film-coated iron powders 4-6 of the present invention are compared with the conventional composite soft magnetic material produced using conventional oxide-coated iron powder 2, no remarkable difference can be observed in the density. On the other hand, compared to the conventional composite soft magnetic material produced using conventional oxide-coated iron powder 2, composite soft magnetic materials produced using Mg-containing oxide film-coated iron powders 4-6 of the present invention have high magnetic flux density, low coercive force, remarkably high resistivity, and therefore has remarkably low core loss which is especially low as the frequency increase. Therefore, it is understood that, compared to the conventional oxide-coated iron powder 2, Mg-containing oxide film-coated powders 4 to 6 of the invention are soft magnetic raw material powders which can provide composite soft magnetic materials having further excellent properties.

Example 7

Figure 5:
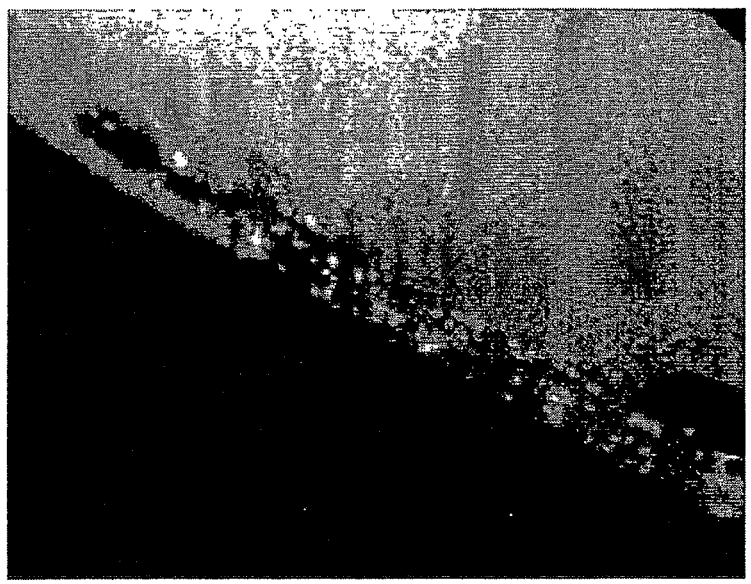
FIG. 5 is a transmission electron microscopic image of a texture of a section of a deposition film formed in the deposition film-coated iron powder of the present invention.

As a stock powder, commercially available sulfate-coated iron powder having a mean grain size of 70 nm, and Mg powder having a mean grain size of 50 μm were prepared. A mixed powder was produced by adding the Mg powder to the sulfate-coated iron powder in such a proportion that the sulfate-coated iron powder: Mg powder=99.8 mass %:0.2 mass %, and mixing the powder. By retaining the obtained mixed powder at a temperature of 650° C. under a pressure of $1 \times 10^{-4}$ MPa for 1 hour while tumbling the powder, deposition film-coated iron powder of the present invention comprising iron powder and a deposition film coated on the surface of the iron powder was produced. Texture of a section of the deposition film formed on the deposition film-coated iron powder of the present invention was observed using a transmission electron microscope, and electron micrograph of the texture was shown in FIG. 5. From the photograph of FIG. 5, thickness and maximum grain size of the deposition film formed on the deposition film-coated iron powder of the present invention were determined. The results are shown in Table 3.

Figure 6:
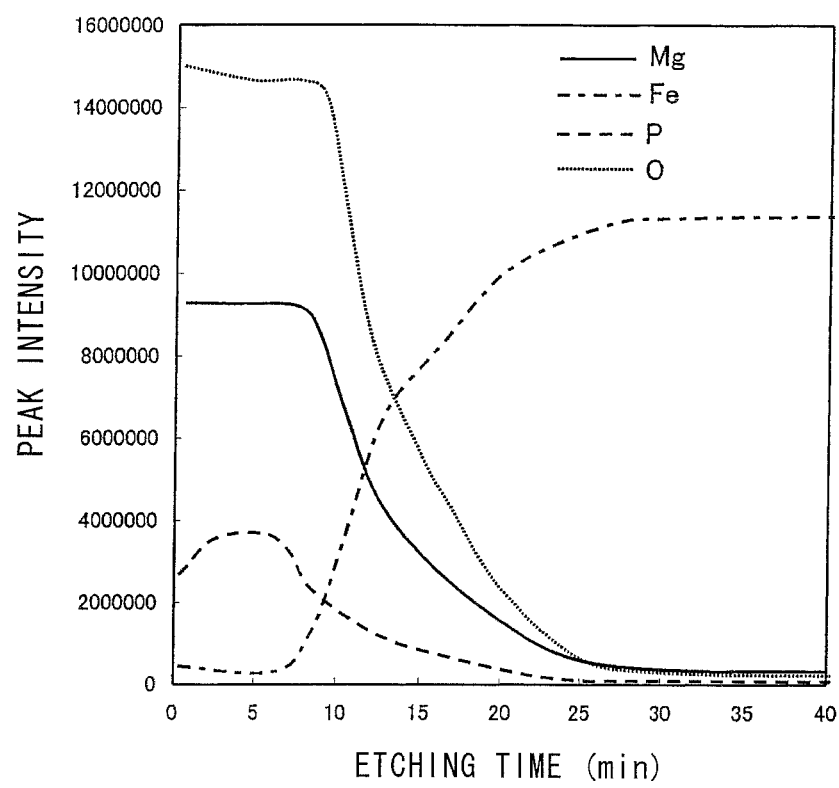
FIG. 6 is a graph showing a result of Auger electron spectroscopic analysis of distribution of Mg, O, P, and Fe concentrations in thickness direction of a deposition film formed in the deposition film-coated iron powder of the present invention.

The graph of FIG. 6 shows analytical results of concentration gradient of Mg, Fe, O, and P in depth direction of the deposition film. From the results shown in he graph of FIG. 6, it was confirmed that elements constituting the deposition film were Mg, Fe, P and O.

The deposition film formed on the deposition film-coated iron powder of the present invention was analyzed using an X-ray photoelectron spectrometer. From the results of analysis of bonding energies, it was confirmed that fine particles of iron phosphide were dispersed in the matrix and that Mg—Fe—P—O quaternary-based phosphate comprising Mg, Fe, P, and O, and Mg—Fe—O ternary-based oxide comprising Mg, Fe, and O were present in the film. Further, from the electron beam diffraction pattern of the deposition film formed on the surface of the deposition film-coated iron powder of the present invention, it was confirmed that the Mg—Fe—P—O quaternary-based phosphate comprising Mg, Fe, P, and O, and Mg—Fe—O ternary-based oxide comprising Mg, Fe, and O included crystalline MgO-dissolving wustite type phase.

The obtained deposition film-coated iron powder of the present invention was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The plate-shaped composite soft magnetic material was subjected to measurement of density and resistivity, and the results are shown in Table.3. Winding was formed on the composite soft magnetic material constituted of the ring-shaped heat-treated article, and magnetic flux density, coercive force, core loss under conditions of magnetic flux density of 1.5 T and frequency of 50 Hz, and core loss under conditions of magnetic flux density of 1.0 T and frequency of 400 Hz were measured. The results are shown in Table 3.

In addition, composite soft magnetic materials utilizing the deposition film-coated iron powder of the present invention were observed using a transmission electron microscope. As a result, iron particle phase and grain boundary phase surrounding the iron particle phase were observed. From the electron beam diffraction pattern obtained from the grain boundary phase, it was confirmed that the grain boundary phase included crystalline MgO-dissolving wustite phase.

Conventional Example 3

Conventional oxide-coated iron powder was produced by chemically forming Mg-containing ferrite layer on the surface of pure iron powder. The conventional oxide-coated iron powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of resistivity, and the result is shown in Table.3. Winding was formed on the composite soft magnetic material constituted of the ring-shaped heat-treated article, and magnetic flux density, coercive force, core loss under conditions of magnetic flux density of 1.5 T and frequency of 50 Hz, and core loss under conditions of magnetic flux density of 1.0 T and frequency of 400 Hz were measured. The results are shown in Table 3.

TABLE 3

| | TYPE | DEPOSITION FILM-COATED IRON POWDER OF THE INVENTION | CONVENTIONAL OXIDE FILM-COATED IRON POWDER |
|---|---|---|---|
| Deposition film | Thickness (nm) | 60 | — |
| | Maximum grain size | 20 | — |
| Properties of composite soft magnetic material | Density (g/cm3) | 7.69 | 7.65 |
| | Flux density B10KA/m (T) | 1.72 | 1.60 |
| | Coercive force (A/m) | 170 | 210 |
| | Core loss* (W/kg) | 7.8 | 60 |
| | Core loss** (W/kg) | 49 | 800 |
| | Resistivity (μΩm) | 50 | 0.4 |

Core loss* denotes core loss at flux density of 1.5T and frequency of 50 Hz
Core loss** denotes core loss at flux density of 1.0T and frequency of 400 Hz From the result shown in Table 3, the following are understood. Where composite soft magnetic materials produced using the deposition film-coated iron powder of the present invention are compared with the conventional composite soft magnetic material produced using conventional oxide-coated iron powder, no remarkable difference can be observed in the density. On the other hand, compared to the conventional composite soft magnetic material produced using conventional oxide-coated iron powder, composite soft magnetic materials produced using the deposition film-coated iron powder of the present invention have high magnetic flux density, low coercive force, remarkably high resistivity, and therefore has remarkably low core loss which is especially low as the frequency increase. Therefore, it is understood that, compared to the conventional oxide-coated iron powder, the deposition film-coated powder of the invention is soft magnetic raw material powder which can provide composite soft magnetic materials having further excellent properties.

Example 8

As a stock powder, gas-water-atomized iron silicide powder having a composition containing Si:3 mass % and the balance consisting of Fe and unavoidable impurities, and having a mean grain size of 70 μm was prepared. In addition, Mg powder having a mean grain size of 50 μm was prepared.

An oxide film was formed on the surface of the gas-water-atomized iron silicide powder. A mixed powder was produced by adding the Mg powder to the iron silicide powder in such a proportion that the iron silicide powder: Mg powder=99.8 mass %:0.2 mass %, and mixing the powder. The obtained mixed powder was retained at a temperature of 650° C. under a pressure of $2.7 \times 10^{-4}$ MPa for 1 hour, and was further retained at a temperature of 200° C. for 1 hour in air. Thus, deposition oxide-film-coated iron silicide powder of the invention comprising iron silicide powder and oxide deposition film formed on the surface of the iron silicide powder was produced.

Figure 7:
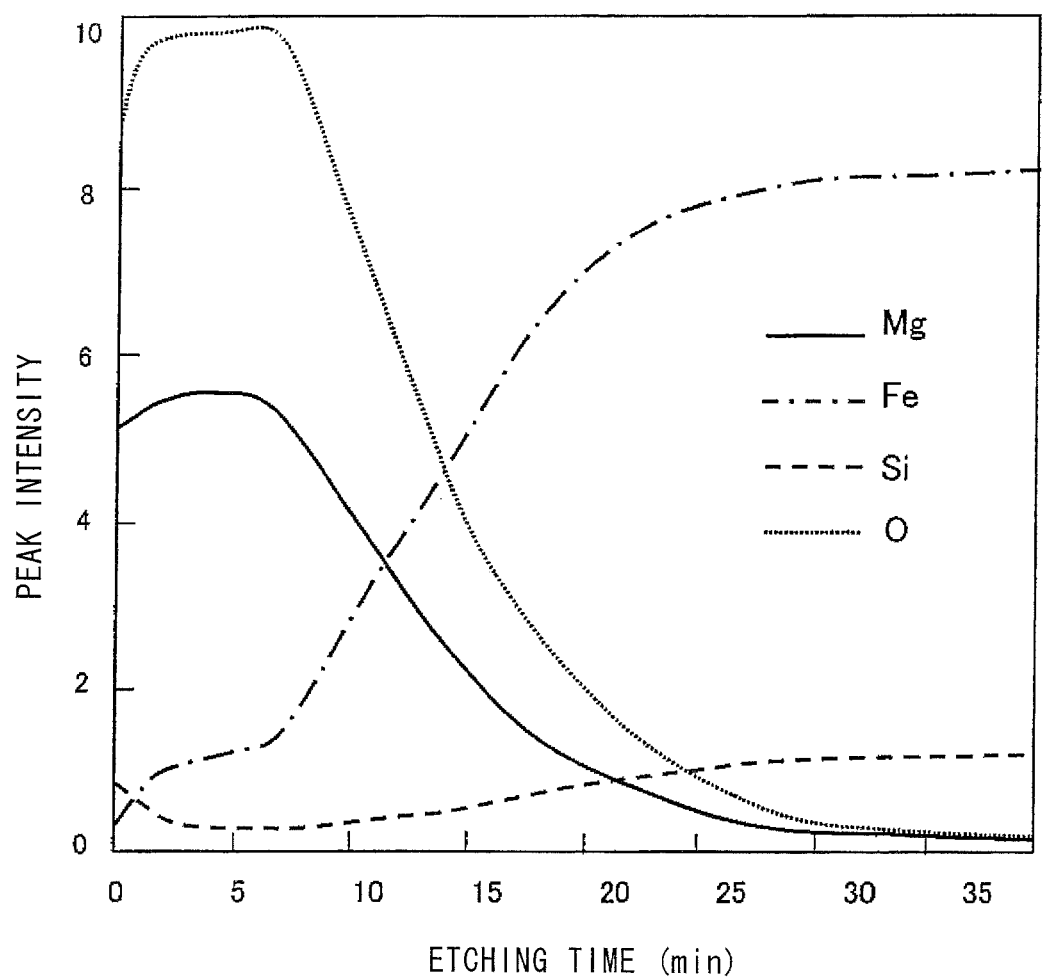
FIG. 7 is a graph showing a result of Auger electron spectroscopic analysis of distribution of Mg, Si, O, and Fe concentrations in thickness direction of an oxide deposition film.

Concentration distributions of Mg, Si, and O in depth direction of the deposition film of the deposition film-coated iron silicide powder were examined using an Auger electron spectroscopic analyzer. The results are shown in FIG. 7. The graph of FIG. 7 shows analytical results in depth direction of the deposition film. In the graph of FIG. 7, the vertical axis denotes a peak intensity of Auger electron, and the horizontal axis denotes time of etching the deposition film. As long an etching time denotes as deep a position in the deposition film. From FIG. 7, it is understood that the deposition film has concentration gradients where Mg and O decreases from the surface towards the interior direction, Fe increases towards the interior direction, and Si content increases in the vicinity of the outermost surface such that a portion close to the outermost surface shows as a high Si content.

In addition, the deposition film formed on the surface of the deposition-film coated iron silicide powder was analyzed using a X-ray photoelectron spectroscopic analyzer, and bonding energies were examined. As a result, it was confirmed that metallic Fe or Fe—Si alloy were included in the deposition film.

From the electron beam diffraction pattern of the deposition film formed on the surface of the deposition-film coated iron silicide powder of the present invention, it was confirmed that the Mg—Si—Fe—O quaternary-based oxide deposition film included MgO-dissolving wustite type phase.

Therefore, the followings can be understood. The deposition oxide film formed on the surface of the deposition-film coated iron silicide powder of the present invention is a Mg—Si—Fe—O quaternary-based oxide deposition film comprising Mg, Si, Fe, and O. The Mg—Si—Fe—O quaternary-based oxide deposition film of the present invention has concentration gradients where Mg and O decreases from the surface towards the interior direction, Fe increases towards the interior direction, and has a concentration gradient of Si where Si content increases in the vicinity of the outermost surface such that a portion close to the outermost surface shows as a high Si content. Metallic Fe or Fe—Si alloy is contained. The Mg—Si—Fe—O quaternary-based oxide deposition film includes crystalline MgO-dissolving wustite-type phase. In addition, the texture of the deposition film in the deposition film-coated iron silicide powder was observed using a transmission electron microscope, and thickness and maximum grain size of the oxide deposition film were measured. As a result, the oxide deposition film had an average thickness of 40 nm and maximum grain size of 10 nm.

The obtained oxide deposition film-coated iron silicide powder of the present invention was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 600° C., and retention time: 30 minutes. Thus, composite soft magnetic materials constituted of a plate-shaped or ring-shaped heat-treated article were produced. The plate-shaped composite soft magnetic material was subjected to measurement of resistivity, and the result is shown in Table.4. Winding was formed on the composite soft magnetic material constituted of the ring-shaped heat-treated article, and magnetic flux density, coercive force, core loss under conditions of magnetic flux density of 0.1 T and frequency of 10 kHz, and core loss under conditions of magnetic flux density of 1.0 T and frequency of 400 Hz were measured. The results are shown in Table 4. In addition, composite soft magnetic materials utilizing the oxide deposition film-coated iron silicide powder of the present invention were observed using a transmission electron microscope. As a result, iron particle phase and grain boundary phase surrounding the iron particle phase were observed. From the electron beam diffraction pattern obtained from the grain boundary phase, it was confirmed that the grain boundary phase included crystalline MgO-dissolving wustite type phase.

Conventional Example 4

Conventional conversion treatment film-coated iron silicide powder was produced by chemically forming Mg-containing conversion treatment film on the surface of the iron silicide powder prepared in Example 8. The conventional conversion treatment film-coated iron silicide powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 600° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of resistivity, and the result is shown in Table.4. Winding was formed on the composite soft magnetic material constituted of the ring-shaped heat-treated article, and magnetic flux density, coercive force, core loss under conditions of magnetic flux density of 0.1 T and frequency of 10 kHz, and core loss under conditions of magnetic flux density of 1.0 T and frequency of 400 Hz were measured. The results are shown in Table 4.

Example 9

Silicone resin in an amount of 1 mass % was added to, and mixed with the oxide deposition film-coated iron silicide powder of the present invention produced in Example 8. The obtained mixed powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of vacuum atmosphere, temperature: 800° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of resistivity, and the result is shown in Table.4. Winding was formed on the composite soft magnetic material constituted of the ring-shaped heat-treated article, and magnetic flux density, coercive force, core loss under conditions of magnetic flux density of 0.1 T and frequency of 10 kHz, and core loss under conditions of magnetic flux density of 1.0 T and frequency of 400 Hz were measured. The results are shown in Table 4. In addition, composite soft magnetic materials were observed using a transmission electron microscope. As a result, iron particle phase and grain boundary phase surrounding the iron particle phase were observed. From the electron beam diffraction pattern obtained from the grain boundary phase, it was confirmed that the grain boundary phase included crystalline MgO-dissolving wustite type phase.

Conventional Example 5

Silicone resin in an amount of 1 mass % was added to, and mixed with the conventional conversion treatment film-coated iron silicide powder produced in Conventional Example 4 by chemically forming Mg-containing conversion treatment film on the surface of the iron silicide powder. The obtained mixed powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of vacuum atmosphere, temperature: 800° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of resistivity, and the result is shown in Table.4. Winding was formed on the composite soft magnetic material constituted of the ring-shaped heat-treated article, and magnetic flux density, coercive force, core loss under conditions of magnetic flux density of 0.1 T and frequency of 10 kHz, and core loss under conditions of magnetic flux density of 1.0 T and frequency of 400 Hz were measured. The results are shown in Table 4.

Example 10

Polyimide resin in an amount of 1 mass % was added to, and mixed with the oxide deposition film-coated iron silicide powder of the present invention produced in Example 8. The obtained mixed powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were thermally hardened under conditions of a nitrogen atmosphere, temperature: 550° C., and retention time: 30 minutes. Thus, composite soft magnetic materials constituted of a plate-shaped or ring-shaped heat-treated compact were produced. The composite soft magnetic material constituted of the plate-shaped heat-treated article was subjected to measurement of resistivity, and the result is shown in Table.4. The composite soft magnetic material was observed using a transmission electron microscope. As a result, iron particle phase and grain boundary phase surrounding the iron particle phase were observed. From the electron beam diffraction pattern obtained from the grain boundary phase, it was confirmed that the grain boundary phase included crystalline MgO-dissolving wustite type phase.

Further, winding was formed on the composite soft magnetic material constituted of the ring-shaped heat-treated compact, and magnetic flux density, coercive force, core loss under conditions of magnetic flux density of 1.5 T and frequency of 50 Hz, and core loss under conditions of magnetic flux density of 1.0 T and frequency of 400 Hz were measured. The results are shown in Table 4.

Conventional Example 6

Polyimide resin in an amount of 1 mass % was added to, and mixed with the conventional conversion treatment film-coated iron silicide powder produced in Conventional Example 4 by chemically forming Mg-containing conversion treatment film on the surface of the iron silicide powder. The obtained mixed powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were thermally hardened under conditions of a nitrogen atmosphere, temperature: 550° C., and retention time: 30 minutes. Thus, composite soft magnetic materials constituted of a plate-shaped or ring-shaped heat-treated compact were produced. The composite soft magnetic material constituted of the plate-shaped heat-treated compact was subjected to measurement of resistivity, and the result is shown in Table.4. Winding was formed on the composite soft magnetic material constituted of the ring-shaped heat-treated compact, and magnetic flux density, coercive force, core loss under conditions of magnetic flux density of 0.1 T and frequency of 10 kHz, and core loss under conditions of magnetic flux density of 1.0 T and frequency of 400 Hz were measured. The results are shown in Table 4.

Example 11

PPS resin in an amount of 1 mass % was added to, and mixed with the oxide deposition film-coated iron silicide powder of the present invention produced in Example 8. The obtained mixed powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated compact were produced. The composite soft magnetic material constituted of the plate-shaped heat-treated article was subjected to measurement of resistivity, and the result is shown in Table.4. The composite soft magnetic material was observed using a transmission electron microscope. As a result, iron particle phase and grain boundary phase surrounding the iron particle phase were observed. From the electron beam diffraction pattern obtained from the grain boundary phase, it was confirmed that the grain boundary phase included crystalline MgO-dissolving wustite type phase.

Further, winding was formed on the composite soft magnetic material constituted of the ring-shaped heat-treated compact, and magnetic flux density, coercive force, core loss under conditions of magnetic flux density of 0.1 T and frequency of 10 kHz, and core loss under conditions of magnetic flux density of 1.0 T and frequency of 400 Hz were measured. The results are shown in Table 4.

Conventional Example 7

PPS resin in an amount of 1 mass % was added to, and mixed with the conventional conversion treatment film-coated iron silicide powder produced in Conventional Example 4 by chemically forming Mg-containing conversion treatment film on the surface of the iron silicide powder. The obtained mixed powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated compact were produced. The composite soft magnetic material constituted of the plate-shaped heat-treated compact was subjected to measurement of resistivity, and the result is shown in Table.4. Winding was formed on the composite soft magnetic material constituted of the ring-shaped heat-treated compact, and magnetic flux density, coercive force, core loss under conditions of magnetic flux density of 0.1 T and frequency of 10 kHz, and core loss under conditions of magnetic flux density of LOT and frequency of 400 Hz were measured. The results are shown in Table 4, treatment film-coated iron silicide powder produced in Conventional Example 4, composite soft magnetic materials produced using the oxide deposition film-coated iron silicide powder of the present invention produced in Example 8 have high magnetic flux density, low coercive force, remarkably high resistivity, and therefore has remarkably low core loss which is especially low as the frequency increase.

Where the composite soft magnetic materials produced in Example 9 constituted of heat-treated compacts comprising oxide-deposition film coated iron silicide powder of the present invention and intergranular insulation material composed of silicone resin is compared with the composite soft magnetic materials produced in Conventional Example 5 constituted of heat-treated compacts comprising conventional conversion treatment film-coated iron silicide powder and intergranular insulation material composed of silicone resin, no remarkable difference can be observed in the density. On the other hand, compared to the composite soft magnetic materials produced in Conventional Example 5 constituted of heat-treated compacts comprising conventional conversion treatment film-coated iron silicide powder and intergranular insulation material composed of silicone resin, composite soft magnetic materials produced in Example 9 constituted of heat-treated compacts comprising oxide-deposition film coated iron silicide powder of the present invention and intergranular insulation material composed of silicone resin have high magnetic flux density, low coercive force, remarkably high resistivity, and therefore has remarkably low core loss which is especially low as the frequency increase.

In addition, it is understood that similar results are obtained where the composite soft magnetic materials produced in Example 10 constituted of heat-treated compacts comprising oxide-deposition film coated iron silicide powder of the present invention and intergranular insulation material composed of polyimide resin are compared with the composite soft magnetic materials produced in Conventional Example 6

TABLE 4

| TYPE | | SPECIES AND AMOUNT OF ADDITION OF RESIN | | | PROPERTIES OF COMPOSITE SOFT MAGNETIC MATERIAL | | | | | |
|---|---|---|---|---|---|---|---|---|---|---|
| | | Silicone resin | Polyimide resin | PPS resin | Density (g/cm$^3$) | Flux density $B_{10\,KA/m}$ (T) | Coersive force (A/m) | Core loss* (W/kg) | Core loss** (W/kg) | Resistivity (μΩm) |
| EXAMPLE | 8 | — | — | — | 7.5 | 1.52 | 100 | 25 | 23 | 1000 |
| CONVENTIONAL | 4 | — | — | — | 7.4 | 1.50 | 150 | — | 60 | 30 |
| EXAMPLE | 9 | 1 mass % | — | — | 7.5 | 1.55 | 85 | 16 | 20 | 23000 |
| CONVENTIONAL | 5 | — | — | — | 7.4 | 1.52 | 100 | 19 | 22 | 8000 |
| EXAMPLE | 10 | — | 1 mass % | — | 7.4 | 1.45 | 120 | 18 | 22 | 20000 |
| CONVENTIONAL | 6 | — | — | — | 7.4 | 1.47 | 170 | 22 | 25 | 5000 |
| EXAMPLE | 11 | — | — | 1 mass % | 7.4 | 1.44 | 130 | 19 | 23 | 21000 |
| CONVENTIONAL | 7 | — | — | — | 7.3 | 1.41 | 180 | 23 | 26 | 6000 |

Core loss* denotes core loss at flux density of 0.1T and frequency of 10 kHz
Core loss** denotes core loss at flux density of 1.0T and frequency of 400 Hz From the result shown in Table 4, the following are understood. Where composite soft magnetic materials produced using the oxide deposition film-coated iron silicide powder of the present invention produced in Example 8 is compared with the conventional composite soft magnetic material produced using conventional conversion treatment film-coated iron silicide powder produced in Comparative Example 4, no remarkable difference can be observed in the density. On the other hand, compared to the conventional composite soft magnetic material produced using conventional conversion constituted of heat-treated compacts comprising conventional conversion treatment film-coated iron silicide powder and intergranular insulation material composed of polyimide resin, and where the composite soft magnetic materials produced in Example 11 constituted of heat-treated compacts comprising oxide-deposition film coated iron silicide powder of the present invention and intergranular insulation material composed of PPS resin are compared with the composite soft magnetic materials produced in Conventional Example 7 constituted of heat-treated compacts comprising conventional conversion treatment film-coated iron silicide powder and intergranular insulation material composed of PPS resin, Example 12

The oxide deposition film-coated iron silicide powder of the present invention produced in Example 8 was pretreated with silane coupling agent. After that, silicone resin diluted in organic solvent was added to the pretreated powder such that 1 mass % of silicone resin was added. By drying the powder at 200° C., mixed powder was prepared. 0.1 mass % of zinc stearate was added to, and mixed with the mixed powder, and the mixed powder was molded into compacts, thereby a ring-shaped compact having a dimension of external diameter: 35 mm, internal diameter: 25 mm, and height: 5 mm, and a ring-shaped compact having a dimension of external diameter: 50 mm, internal diameter: 25 mm, and height: 25 mm were formed. The obtained compacts were subjected to strain-relief heat treatment at 850° C. in a vacuum atmosphere. Thus, composite soft magnetic materials constituted of a ring-shaped heat-treated compact having a small external diameter and a ring-shaped compact having a large external diameter were produced. Under the observation of these composite soft magnetic materials using a transmission electron microscope, iron particle phase and grain boundary phase surrounding the iron particle phase were observed. From the electron beam diffraction pattern obtained from the grain boundary phase, it was confirmed that the grain boundary phase included crystalline IMO-dissolving wustite type phase.

Winding was formed on the ring-shaped heat-treated compact having the small diameter, and DC magnetic property and core loss under conditions of 0.1 T and 10 kHz were measured. The results are shown in Table 5. Using the ring-shaped heat-treated compact having the small external diameter, inductance at 20 kHz was measured while superimposing direct current of 20 A, and AC magnetic permeability was determined. The result is shown in Table 5.

Next, winding was formed using the ring-shaped heat-treated compact having the large external diameter, and a reactor having almost constant inductance was produced. The reactor was connected to a switching power supply equipped with a general type of active filter. Efficiencies (%) of output power versus input power of 1000 W and 1500 W were measured. The results are shown in Table 5.

Example 13

As a stock powder, gas-water-atomized iron silicide powder having a composition containing Si:6.5 mass % and the balance consisting of Fe and unavoidable impurities, having a mean grain size of 55 and having nearly spherical particle shape was prepared. In addition, Mg powder having a mean grain size of 40 μm was prepared, Surface oxidation treatment of the gas-water-atomized powder was performed under conditions of retaining 1 hour at 220° C. in air. A mixed powder was produced by adding the Mg powder to the oxidation-treated gas-water-atomized iron silicide powder in such a proportion that the gas-water-atomized iron silicide powder: Mg powder=99.6:0.4, and mixing the powder. The mixed powder was retained at a temperature of 650° C. under a pressure of $1 \times 10^{-5}$ MPa for 1.5 hour. Thus, deposition oxide-film-coated iron silicide powder of the present invention comprising gas-water-atomized iron silicide powder and oxide deposition film coated on the surface of the iron silicide powder was produced.

Concentration distributions of Mg, Si, O, and Fe in depth direction of the deposition film of the deposition film-coated iron silicide powder were examined using an Auger electron spectroscopic analyzer. As a result, it was confirmed that the deposition film had concentration gradients where Mg and O decreases from the surface towards the interior direction, Fe increased towards the interior direction, and the film had a concentration gradient of Si where Si content increased in the vicinity of the outermost surface such that a portion close to the outermost surface showed as a high Si content.

In addition, the oxide deposition film formed on the surface of the deposition-film coated iron silicide powder was analyzed using a X-ray photoelectron spectroscopic analyzer, and bonding energies were examined. As a result, it was confirmed that metallic Fe or Fe—Si alloy were included in the deposition film.

Therefore, the followings can be understood. The oxide deposition film formed on the surface of the oxide deposition-film coated iron silicide powder of the present invention is a Mg—Si—Fe—O quaternary-based oxide deposition film comprising Mg, Si, Fe, and a The Mg—Si—Fe—O quaternary-based oxide deposition film of the present invention has concentration gradients where Mg and O decreases from the surface towards the interior direction, Fe increases towards the interior direction, and has a concentration gradient of Si where Si content increases in the vicinity of the outermost surface such that a portion close to the outermost surface shows as a high Si content. Metallic Fe or Fe—Si alloy is contained. In addition, the texture of the deposition film in the deposition film-coated iron silicide powder was observed using a transmission electron microscope, and thickness and maximum grain size of the oxide deposition film were measured. As a result, the oxide deposition film had an average thickness of 60 nm and maximum grain size of 20 nm.

The oxide deposition film-coated iron silicide powder of the present invention was pretreated with silane coupling agent. After that, silicone resin diluted in organic solvent was added to the pretreated powder such that 1 mass % of silicone resin was added. By drying the powder at 250° C., mixed powder was prepared. 0.1 mass % of zinc stearate was added to, and mixed with the mixed powder, and the mixed powder was molded into compacts, thereby a ring-shaped compact having a dimension of external diameter: 35 mm, internal diameter: 25 mm, and height: 5 mm, and a ring-shaped compact having a dimension of external diameter: 50 mm, internal diameter: 25 mm, and height: 25 mm were formed. These compacts were subjected to strain-relief heat treatment at 850° C. in a vacuum atmosphere. Thus, composite soft magnetic materials constituted of a ring-shaped heat-treated compact having a small external diameter and a ring-shaped compact having a large external diameter were produced. Under the observation of these composite soft magnetic materials using a transmission electron microscope, iron particle phase and grain boundary phase surrounding the iron particle phase were observed. From the electron beam diffraction pattern obtained from the grain boundary phase, it was confirmed that the grain boundary phase included crystalline MgO-dissolving wustite type phase.

Winding was formed on the ring-shaped heat-treated compact having the small diameter, and DC magnetic property and core loss under conditions of 0.1 T and 10 kHz were measured. The results are shown in Table 5. Using the ring-shaped heat-treated compact having the small external diameter, inductance at 20 kHz was measured while superimposing direct current of 20 A, and AC magnetic permeability was determined. The result is shown in Table 5.

Next, winding was formed using the ring-shaped heat-treated compact having the large external diameter, and a reactor having almost constant inductance was produced. The reactor was connected to a switching power supply equipped with a general type of active filter. Efficiencies (%) of output powers versus input powers of 1000 W and 1500 W were measured. The results are shown in Table 5.

Gas-water-atomized iron silicide powder prepared in Example, having a composition containing Si:3 mass % and the balance consisting of Fe and unavoidable impurities, and having a mean grain size of 70 μm was pretreated with silane coupling agent. After that, mixed powder was produced such that the iron silicide powder was mixed with 1.0 mass % of silicone resin and 0.2 mass % of MgO powder. The obtained mixed powder was compacted, and the compacts were subjected to strain-relief heat treatment at 850° C. in a vacuum atmosphere, thereby heat-treated compacts having the same shapes and dimensions as Example 12 were produced.

Winding was formed on the ring-shaped heat-treated compact having the small diameter, and DC magnetic property and core loss under conditions of 0.1 T and 10 kHz were measured. The results are shown in Table 5. Using the ring-shaped heat-treated compact having the small external diameter, inductance at 20 kHz was measured while superimposing direct current of 20 A, and AC magnetic permeability was determined. The result is shown in Table 5.

Next, winding was formed using the ring-shaped heat-treated compact having the large external diameter, and a reactor having almost constant inductance was produced. The reactor was connected to a switching power supply equipped with a general type of active filter. Efficiencies (%) of output power versus input power of 1000 W and 1500 W were measured. The results are shown in Table 5.

Example 8

As a stock powders, iron based Fe—Si-based soft magnetic powder having a composition containing Si:1 mass % and the balance consisting of Fe and unavoidable impurities, and having a mean grain size of 75 μm, and pure silicon powder having a mean grain size of 1 μm or less were prepared. In addition, Mg powder having a mean grain size of 50 μm was prepared.

Firstly, a mixed powder was produced by blending and mixing the pure silicon powder with the iron-based Fe—Si-based soft magnetic powder in such a proportion that the iron-based Fe—Si-based soft magnetic powder: pure Si powder=99.5 mass %:0.5 mass %. By heat treating the obtained mixed powder using conditions of hydrogen atmosphere, temperature: 950° C., and retention time: 1 hour, high concentration Si diffused-layer was formed on the surface of iron-based Fe—Si-based soft magnetic powder. After that, by retaining the powder at 250° C. in air, surface oxidized iron-based Fe—Si-based soft, magnetic powder having an oxide layer on the surface of the high concentration Si diffused-layer was produced.

A mixed powder was produced by blending and mixing the prepared Mg powder with the surface oxidized iron-based Fe—Si-based soft magnetic powder in such a proportion that the surface oxidized iron-based Fe—Si-based soft magnetic powder: Mg powder=99.8 mass %:0.2 mass %. By retaining the obtained mixed powder for 1 hour at a temperature of 650° C. under a pressure of $2.7 \times 10^{-4}$ MPa while tumbling the mixed powder, oxide deposition film-coated iron-based Fe—Si-based soft magnetic powder of the present invention (hereafter referred to as oxide deposition film-coated powder of the invention) 1 having an oxide deposition film compris-

TABLE 5

| Type | Flux density $B_{10K}$ (T) | Coercive force Hc (A/m) | Core loss* (W/kg) | Permeability 20 A, 20 kHz | Switching power supply INPUT POWER (W) | Efficiency (%) |
|---|---|---|---|---|---|---|
| EXAMPLE 12 | 1.55 | 83 | 16 | 31 | 1000 | 92.8 |
|  |  |  |  |  | 1500 | 92.1 |
| EXAMPLE 13 | 1.56 | 80 | 16 | 32 | 1000 | 93.1 |
|  |  |  |  |  | 1500 | 92.5 |
| CONVENTIONAL EXAMPLE 8 | 1.53 | 103 | 19 | 27 | 1000 | 91.6 |
|  |  |  |  |  | 1500 | 91.0 |

From the results shown in Table 5, the following are understood. Compared to the composite soft magnetic materials of Conventional Example produced using iron silicide powder, composite soft magnetic materials of Examples 12 to 13 produced using the oxide deposition film-coated iron silicide powder of the present invention have low coercive force, low core loss, and excellent DC superimposing property. In addition, compared to the switching power supply connected to the reactor using composite soft magnetic material produced in Conventional Example 8, efficiency is increased in switching power supplies connected to the reactors using composite soft magnetic materials produced in Examples 12 to 13. Therefore, properties are further increased in reactors having a core constituted of composite soft magnetic material made of heat-treated compact comprising the oxide deposition film-coated iron silicide powder of the present invention and intergranular silicone resin.

ing Mg, Si, Fe and O formed in the surface of the iron-based Fe—Si-based soft magnetic powder was produced.

By the analysis using an X-ray photoelectron spectroscopic analyzer and examination of bonding energies, it was confirmed that the oxide deposition film formed in the oxide deposition film-coated powder 1 of the present invention was an oxide deposition film comprising Mg, Fe, Si, and O, and metallic Fe and Fe—Si alloy were included in the matrix of the oxide deposition film. Texture of the oxide deposition film in the oxide deposition film-coated powder of the present invention was observed using a transmission electron microscope and a thickness and maximum grain size of the oxide deposition film were determined. The results are shown in Table 6. In addition, from the electron beam diffraction patterns, it was confirmed that Mg and O were contained as crystalline MgO dissolving wustite type phase in the oxide deposition film comprising Mg, Fe, Si, and O.

Figure 8:
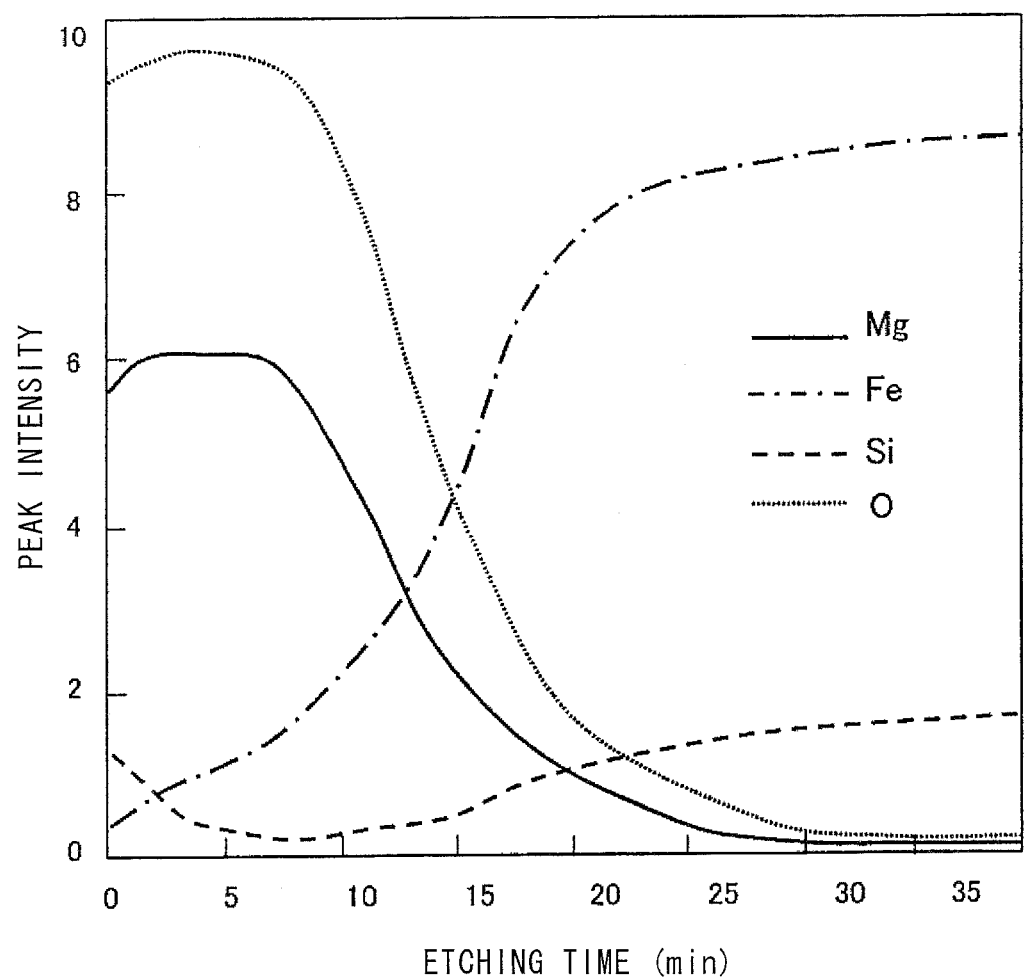
FIG. 8 is a graph showing a result of Auger electron spectroscopic analysis of distribution of Mg, Si, O, and Fe concentrations in thickness direction of an oxide deposition film.

Concentration distributions of Mg, O, Si, and Fe in depth direction of the oxide deposition film comprising Mg, Si, Fe, and O were analyzed using an Auger electron spectroscopic analyzer. The results are shown in Table 6. FIG. 8 shows a analytical graph obtained by analyzing the distributions of Mg, O, Si, and Fe in depth direction of the oxide deposition film comprising Mg, Si, Fe, and O of the oxide deposition film-coated powder 1 of the invention. In the horizontal axis of FIG. 8, Etching time 0 corresponds to the outermost surface. In FIG. 8, it is understood that the oxide deposition film comprising Mg, Si, Fe, and O shows concentration gradients where Mg and O increases towards the surface, Fe content decreases towards the surface, and Si increases in the vicinity of the outermost surface such that a portion close to the outermost surface shows as a high Si content.

The obtained oxide deposition film-coated powder 1 of the present invention was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of resistivity, and the result is shown in Table.6. Winding was formed on the composite soft magnetic material constituted of the ring-shaped heat-treated article, and magnetic flux density, coercive force, core loss under conditions of magnetic flux density of 1.5 T and frequency of 50 Hz, and core loss under conditions of magnetic flux density of 1.0 T and frequency of 400 Hz were measured. The results are shown in Table 6.

By chemically forming an Mg-containing ferrite oxide layer on the surface of the iron-based Fe—Si-based soft magnetic powder prepared in Example 14, conventional Mf-containing ferrite oxide-coated iron-based Fe—Si-based soft magnetic powder (hereafter referred to as conventional oxide deposition film-coated powder) was produced. The obtained conventional ferrite oxide deposition film-coated powder was charged in moulds, and was press-molded into compacts, thereby a plate-shaped compact having a dimension of length: 55 mm, width: 10 mm, and thickness: 5 mm, and a ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of resistivity, and the result is shown in Table.6. Winding was formed on the composite soft magnetic material constituted of the ring-shaped heat-treated article, and magnetic flux density, coercive force, core loss under conditions of magnetic flux density of 1.5 T and frequency of 50 Hz, and core loss under conditions of magnetic flux density of 1.0 T and frequency of 400 Hz were measured. The results are shown in Table 6.

TABLE 6

| TYPE | | EXAMPLE 14 | CONVENTIONAL EXAMPLE 9 |
|---|---|---|---|
| Properties of Mg—Si—Fe—O quaternary-based oxide deposition film | Thickness (nm) | 100 | — |
| | Maximum grain size | 30 | — |
| Properties of composite soft magnetic material | Density (g/cm3) | 7.6 | 7.4 |
| | Flux density B10KA/m (T) | 1.57 | 1.50 |
| | Coercive force (A/m) | 90 | 145 |
| | Core loss* (W/kg) | 23 | — |
| | Core loss** (W/kg) | 20 | 58 |
| | Resistivity (μΩm) | 1200 | 35 |

Core loss* denotes core loss at flux density of 1.5T and frequency of 50 Hz
Core loss** denotes core loss at flux density of 1.0T and frequency of 400 Hz From the results shown in Table 6, the following are understood. Where composite soft magnetic materials produced using oxide deposition film-coated powder 1 of the present invention produced in Example 14 are compared with the conventional composite soft magnetic materials produced using Mg-containing ferrite oxide-coated iron-based Fe—Si-based soft magnetic powder produced in Conventional Example 9, no remarkable difference can be observed in the density. On the other hand, compared to the conventional composite soft magnetic material produced using Mg-containing ferrite oxide-coated iron-based Fe—Si-based soft magnetic powder produced in Conventional Example 9, composite soft magnetic material produced using oxide deposition film-coated powder 1 of the present invention produced in Example 14 has high magnetic flux density, low coercive force, remarkably high resistivity, and therefore has remarkably low core loss which is especially low as the frequency increase.

Example 15

As stock powders, iron-based Fe—Si-based soft magnetic powders each having a grain size shown in Table 7 and having a composition containing Si:1 mass % and the balance consisting of Fe and unavoidable impurities were prepared. In addition, pure silicon powder having a mean grain size of 1 μm or less and Mg powder having a mean grain size of 50 μm were prepared.

Mixed powders were produced by blending and mixing the pure silicon powder with the each of the iron-based Fe—Si-based soft magnetic powders having different grain size in such a proportion that the iron-based Fe—Si-based soft magnetic powder: pure Si powder ~97 mass %:2 mass %. By heat treating the obtained mixed powders using conditions of hydrogen atmosphere, temperature: 950° C., and retention time: 1 hour, a high concentration Si diffused-layer was formed on the surface of iron-based Fe—Si-based soft magnetic powders. After that, by retaining the powder at 220° C. in air, surface-oxidized iron-based Fe—Si-based soft magnetic powders having an oxide layer on the surface of the high concentration Si diffused-layer were produced.

Mixed powders were produced by blending and mixing the prepared Mg powder with the surface-oxidized iron-based Fe—Si-based soft magnetic powders in such a proportion that the surface-oxidized iron-based Fe—Si-based soft magnetic powder: Mg powder=99.8 mass %:0.2 mass %. By performing a treatment retaining the obtained mixed powder for 1 hour at a temperature of 650° C. under a pressure of 2.7×10⁻⁴ MPa while tumbling the mixed powder (hereafter, the treatment comprising production of a mixed powder in such a proportion that the surface-oxidized iron-based Fe—Si-based soft magnetic powder: Mg powder=99.8 mass %:0.2 mass %, and retaining the obtained mixed powder for 1 hour at a temperature of 650° C. under a pressure of 2.7×10⁻⁴ MPa while tumbling the mixed powder is referred to as Mg-coating treatment), methods 1 to 3 of the present invention for producing oxide deposition film-coated iron-based Fe—Si-based soft magnetic powders of the present invention having an oxide deposition film comprising Mg, Si, Fe and O formed in the surface of the iron-based Fe—Si-based soft magnetic powder were performed.

By the analysis using an X-ray photoelectron spectroscopic analyzer and examination of bonding energies, it was confirmed that the oxide deposition films formed on the oxide deposition film-coated powders obtained by methods 1 to 3 of the present invention were oxide deposition films comprising Mg, Fe, Si, and O, and metallic Fe and Fe—Si alloy were included in the matrices of the oxide deposition films. The textures of the oxide deposition films in the oxide deposition film-coated iron-based Fe—Si-based soft magnetic powders were observed using a transmission electron microscope. From the electron beam diffraction patterns, it was confirmed that Mg and O were contained as crystalline MgO-dissolving wustite type phases in the oxide deposition films comprising Mg, Fe, Si, and O. Concentration distributions of Mg, O, Si, and Fe in depth direction of the oxide deposition films comprising Mg, Si, Fe, and O were analyzed using an Auger electron spectroscopic analyzer, and it was confirmed that the oxide deposition films comprising Mg, Si, Fe, and O showed concentration gradients where Mg and O increases towards the surface, Fe content decreases towards the surface, and Si increases in the vicinity of the outermost surface such that a portion close to the outermost surface shows as a high Si content.

By adding silicone resin in a blending ratio of 2 mass % to oxide deposition film-coated iron-based Fe—Si-based soft magnetic powders obtained by the methods 1 to 3 of the present invention, and mixing the powders, resin-coated composite powders each having a coating of silicone resin on the surface of the oxide deposition film-coated iron-based Fe—Si-based soft magnetic powders were produced. The resin-coated composite powders were charged in moulds heated at 120° C., and were press-molded into compacts, thereby plate-shaped compacts having a dimension of length: 55 mm, width: 10 mm, and thickness: 5 mm, and ring-shaped compacts having a dimension of external diameter: 35 mm, internal diameter: 25 mm, and height: 5 mm were formed. The obtained compacts were heat-treated under conditions of vacuum atmosphere, temperature: 700° C., and retention time: 30 minutes. Thus, composite soft magnetic materials constituted of a plate-shaped or ring-shaped heat-treated article were produced. The composite soft magnetic materials constituted of the plate-shaped heat-treated articles were subjected to measurement of resistivity, and the results are shown in Table.6. Windings were formed on the composite soft magnetic materials constituted of the ring-shaped heat-treated articles, and magnetic flux density, coercive force, core loss under conditions of magnetic flux density of 0.1 T and frequency of 20 Hz were measured. The results are shown in Table 7.

Conventional Example 10

As stock powders, iron-based Fe—Si-based soft magnetic powders each having a grain size shown in Table 7 and having a composition containing Si:1 mass % and the balance consisting of Fe and unavoidable impurities were prepared. Without performing the Mg coating treatment, silicone resin in a blending ratio of 2 mass % was added to, and mixed with the iron-based Fe—Si-based soft magnetic powders. Thus, resin-coated composite powders each having a coating of silicone resin on the surface of the iron-based Fe—Si-based soft magnetic powders were produced. The resin-coated composite powders were charged in moulds heated at 120° C., and were press-molded into compacts, thereby plate-shaped compacts having a dimension of length: 55 mm, width: 10 mm, and thickness: 5 mm, and ring-shaped compacts having a dimension of external diameter: 35 mm, internal diameter: 25 mm, and height: 5 mm were formed. The obtained compacts were heat-treated under conditions of vacuum atmosphere, temperature: 700° C., and retention time: 30 minutes. Thus, composite soft magnetic materials constituted of a plate-shaped or ring-shaped heat-treated article were produced.

The composite soft magnetic materials constituted of the plate-shaped heat-treated articles were subjected to measurement of resistivity, and the results are shown in Table.7. Windings were formed on the composite soft magnetic materials constituted of the ring-shaped heat-treated articles, and magnetic flux density, coercive force, core loss under conditions of magnetic flux density of 0.1 T and frequency of 20 Hz were measured. The results are shown in Table 7.

TABLE 7

| Type | | Mean grain size of Fe—1% Si stock powder (μm) | Mg coating treatment | Magnetic properties | | | |
| --- | --- | --- | --- | --- | --- | --- | --- |
| | | | | Flux density $B_{10\,KA/m}$ (T) | Coercive force (A/m) | Core loss* (W/kg) | Resistivity (μΩm) |
| Method of the invention | 1 | 60 | performed | 1.30 | 95 | 46 | 25000 |
| | 2 | 150 | performed | 1.32 | 90 | 41 | 24000 |
| | 3 | 300 | performed | 1.35 | 80 | 39 | 20000 |
| Conventional method 1 | | 150 | not performed | 1.32 | 130 | 1000 | 150 |

Core loss* denotes core loss at flux density of 0.1T and frequency of 20 kHz

It can be understood that compared to the composite soft magnetic material produced in conventional method 1, composite soft magnetic materials produced in accordance with the methods 1 to 3 of the present invention have high magnetic flux density, low coercive force, remarkably high resistivity, and therefore have remarkably low core loss which is especially low as the frequency increases.

Example 16

As stock powders, iron-based Fe—Si-based soft magnetic powders each having a grain size shown in Table 8 and having a composition containing Si:3 mass % and the balance consisting of Fe and unavoidable impurities were prepared. In addition, pure silicon powder having a mean grain size of 1 μm or less and Mg powder having a mean grain size of 50 μm were prepared.

Mixed powders were produced by blending and mixing the pure silicon powder with the each of the iron-based Fe—Si-based soft magnetic powders having different grain size in such a proportion that the iron-based Fe—Si-based soft magnetic powder: pure Si powder=99.5 mass %:0.5 mass %. By heat treating the obtained mixed powders using conditions of hydrogen atmosphere, temperature: 950° C., and retention time: 1 hour, high concentration Si diffused-layer was formed on the surface of iron-based Fe—Si-based soft magnetic powders. After that, by retaining the powder at 220° C. in air, surface-oxidized iron-based Fe—Si-based soft magnetic powders having an oxide layer on the surface of the high concentration Si diffused-layer were produced.

By performing the Mg coating treatment of the surface-oxidized iron-based Fe—Si-based soft magnetic powders methods 4 to 6 of the present invention for producing oxide deposition film-coated iron-based Fe—Si-based soft magnetic powders of the present invention having an oxide deposition film comprising Mg, Si, Fe and O formed in the surface of the iron-based Fe—Si-based soft magnetic powder were performed.

By the analysis using an X-ray photoelectron spectroscopic analyzer and examination of bonding energies, it was confirmed that the oxide deposition films formed in the oxide deposition film-coated powders obtained by methods 4 to 6 of the present invention were oxide deposition films comprising Mg, Fe, Si, and O, and metallic Fe and Fe—Si alloy were included in the matrices of the oxide deposition films. Textures of the oxide deposition films in the oxide deposition film-coated iron-based Fe—Si-based soft magnetic powders were observed using a transmission electron microscope. From the electron beam diffraction patterns, it was confirmed that Mg and O were contained as crystalline MgO dissolving wustite type phases in the oxide deposition films comprising Mg, Fe, Si, and O. Concentration distributions of Mg, O, Si, and Fe in depth direction of the oxide deposition films comprising Mg, Si, Fe, and O were analyzed using an Auger electron spectroscopic analyzer, and it was confirmed that the oxide deposition films comprising Mg, Si, Fe, and O showed concentration gradients where Mg and O increases towards the surface, Fe content decreases towards the surface, and Si increases in the vicinity of the outermost surface such that a portion close to the outermost surface shows as a high Si content.

By adding silicone resin in a blending ratio of 2 mass % to oxide deposition film-coated iron-based Fe—Si-based soft magnetic powders obtained by the methods 4 to 6 of the present invention, and mixing the powders, resin-coated composite powders each having a coating of silicone resin on the surface of the oxide deposition film-coated iron-based Fe—Si-based soft magnetic powders were produced. The resin-coated composite powders were charged in moulds heated at 120° C., and were press-molded into compacts, thereby plate-shaped compacts having a dimension of length: 55 mm, width: 10 mm, and thickness: 5 mm, and ring-shaped compacts having a dimension of external diameter: 35 mm, internal diameter: 25 mm, and height: 5 mm were formed. The obtained compacts were heat-treated under conditions of vacuum atmosphere, temperature: 700° C., and retention time: 30 minutes. Thus, composite soft magnetic materials constituted of a plate-shaped or ring-shaped heat-treated article were produced. The composite soft magnetic materials constituted of the plate-shaped heat-treated articles were subjected to measurement of resistivity, and the results are shown in Table.8, Windings were formed on the composite soft magnetic materials constituted of the ring-shaped heat-treated articles, and magnetic flux density, coercive force, core loss under conditions of magnetic flux density of 0.1 T and frequency of 20 Hz were measured. The results are shown in Table 8.

Conventional Example 11

As stock powders, iron-based Fe—Si-based soft magnetic powders each having a grain size shown in Table 8 and having a composition containing Si:1 mass % and the balance consisting of Fe and unavoidable impurities were prepared. Without performing the Mg coating treatment, silicone resin in a blending ratio of 3 mass % was added to, and mixed with the iron-based Fe—Si-based soft magnetic powders. Thus, resin-coated composite powders each having a coating of silicone resin on the surface of the iron-based Fe—Si-based soft magnetic powders were produced. The resin-coated composite powders were charged in moulds heated at 120° C., and were press-molded into compacts, thereby plate-shaped compacts having a dimension of length: 55 mm, width: 10 mm, and thickness: 5 mm, and ring-shaped compacts having a dimension of external diameter: 35 mm, internal diameter: 25 mm, and height: 5 mm were formed. The obtained compacts were heat-treated under conditions of vacuum atmosphere, temperature: 700° C., and retention time: 30 minutes. Thus, composite soft magnetic materials constituted of a plate-shaped or ring-shaped heat-treated article were produced. The composite soft magnetic materials constituted of the plate-shaped heat-treated articles were subjected to measurement of resistivity, and the results are shown in Table.8, Windings were formed on the composite soft magnetic materials constituted of the ring-shaped heat-treated articles, and magnetic flux density, coercive force, core loss under conditions of magnetic flux density of 0.1 T and frequency of 20 Hz were measured. The results are shown in Table 8.

TABLE 8

| Type | | Mean grain size of Fe—1% Si stock powder (μm) | Mg coating treatment | Magnetic properties | | | Resistivity (μΩm) |
|---|---|---|---|---|---|---|---|
| | | | | Flux density $B_{10\,KA/m}$ (T) | Coercive force (A/m) | Core loss* (W/kg) | |
| Method of the invention | 4 | 60 | performed | 1.43 | 100 | 55 | 21000 |
| | 5 | 150 | performed | 1.43 | 97 | 52 | 20000 |
| | 6 | 300 | performed | 1.47 | 83 | 47 | 17000 |

TABLE 8-continued

| Type | Mean grain size of Fe—1% Si stock powder (μm) | Mg coating treatment | Magnetic properties | | | Resistivity (μΩm) |
|---|---|---|---|---|---|---|
| | | | Flux density $B_{10\ KA/m}$ (T) | Coercive force (A/m) | Core loss* (W/kg) | |
| Conventional method 2 | 150 | not performed | 1.43 | 140 | 9900 | 115 |

Core loss* denotes core loss at flux density of 0.1 T and frequency of 20 kHz

It can be understood that compared to the composite soft magnetic material produced in conventional method 2, composite soft magnetic materials produced in accordance with the methods 4 to 6 of the present invention have high magnetic flux density, low coercive force, remarkably high resistivity, and therefore have remarkably low core loss which is especially low as the frequency increases.

Example 17

As stock powders, Fe powders each having grain size shown in Table 9 were prepared. In addition, pure Si powder having a mean grain size of 1 μm or less and Mg, powder having a grain size of 50 μm were prepared.

Mixed powders were produced by blending and mixing the pure silicon powder with the each of the Fe powders having different grain size in such a proportion that the Fe powder: pure Si powder=97 mass %: 3 mass %. By heat treating the obtained mixed powders using conditions of hydrogen atmosphere, temperature: 950° C., and retention time: 1 hour, high concentration Si diffused-layer was formed on the surface of iron-based Fe—Si-based soft magnetic powders. After that, by retaining the powders at 220° C. in air, surface-oxidized iron-based Fe—Si-based soft magnetic powders having an oxide layer on the surface of the high concentration Si diffused-layer were produced.

By performing the Mg coating treatment of the surface-oxidized iron-based Fe—Si-based soft magnetic powders, methods 7 to 9 of the present invention for producing oxide deposition film-coated iron-based Fe—Si-based soft magnetic powders of the present invention having an oxide deposition film comprising Mg, Si, Fe and O formed in the surface of the iron-based Fe—Si-based soft magnetic powder were performed.

By the analysis using an X-ray photoelectron spectroscopic analyzer and examination of bonding energies, it was confirmed that the oxide deposition films formed on the oxide deposition film-coated powders obtained by methods 7 to 9 of the present invention were oxide deposition films comprising Mg, Fe, Si, and O, and metallic Fe and Fe—Si alloy were included in the matrices of the oxide deposition films. Textures of the oxide deposition films in the oxide deposition film-coated iron-based Fe—Si-based soft magnetic powders were observed using a transmission electron microscope. From the electron beam diffraction patterns, it was confirmed that Mg and O were contained as crystalline MgO dissolving wustite type phases in the oxide deposition films comprising Mg, Fe, Si, and a Concentration distributions of Mg, O, Si, and Fe in depth direction of the oxide deposition films comprising Mg, Si, Fe, and O were analyzed using an Auger electron spectroscopic analyzer, and it was confirmed that the oxide deposition films comprising Mg, Si, Fe, and O showed concentration gradients where Mg and O increases towards the surface, Fe content decreases towards the surface, and Si increases in the vicinity of the outermost surface such that a portion close to the outermost surface shows as a high Si content.

By adding silicone resin in a blending ratio of 2 mass % to oxide deposition film-coated iron-based Fe—Si-based soft magnetic powders obtained by the methods 7 to 9 of the present invention, and mixing the powders, resin-coated composite powders each having a coating of silicone resin on the surface of the oxide deposition film-coated iron-based Fe—Si-based soft magnetic powders were produced. The resin-coated composite powders were charged in moulds heated at 120° C., and were press-molded into compacts, thereby plate-shaped compacts having a dimension of length: 55 mm, width: 10 mm, and thickness: 5 mm, ring-shaped compacts having a dimension of external diameter: 35 mm, internal diameter: 25 mm, and height: 5 mm, and ring-shaped compacts having a dimension of external diameter: 50 mm, internal diameter: 25 mm, and height: 25 mm were formed. The obtained compacts were heat-treated under conditions of vacuum atmosphere, temperature: 700° C., and retention time: 30 minutes. Thus, composite soft magnetic materials constituted of a plate-shaped or ring-shaped heat-treated article were produced. The composite soft magnetic materials constituted of the plate-shaped heat-treated articles were subjected to measurement of resistivity, and the results are shown in Table.9. Windings were formed on the composite soft magnetic materials constituted of the ring-shaped heat-treated articles having the small diameter, and magnetic flux density, coercive force, core loss under conditions of magnetic flux density of 0.1 T and frequency of 20 Hz were measured. The results are shown in Table 9.

Using the ring-shaped heat-treated compact having the small external diameter, inductance at 20 kHz was measured while superimposing direct current of 20 A, and AC magnetic permeability was determined. The results are shown in Table 10. Next, winding was formed on the ring-shaped heat-treated compact having the large external diameter, and a reactor having almost constant inductance was produced. The reactor was connected to a switching power supply equipped with a general type of active filter. Efficiencies (%) of output power versus input power of 1000 W and 1500 W were measured. The results are shown in Table 10.

Conventional Example 12

As stock powder, Fe powders having a grain size shown in Table 8 was prepared. Without performing the Mg coating treatment, silicone resin in a blending ratio of 2 mass % was added to, and mixed with the Fe powder. Thus, resin-coated Fe powder having a coating of silicone resin on the surface of the Fe powder was produced. The resin-coated Fe powder was charged in moulds heated at 120° C., and was press-molded into compacts, thereby a plate-shaped compact having a dimension of length: 55 mm, width: 10 mm, and thickness: 5 mm, ring-shaped compact having a dimension of external diameter: 35 mm, internal diameter: 25 mm, and height: 5 mm, and ring-shaped compact having a dimension of external diameter: 50 mm, internal diameter: 25 mm, and height: 25 mm were formed. The obtained compacts were heat-treated under conditions of vacuum atmosphere, temperature: 700° C., and retention time: 30 minutes. Thus, composite soft magnetic materials constituted of a plate-shaped or ring-shaped heat-treated compact were produced. The composite soft magnetic material constituted of the plate-shaped heat-treated compact was subjected to measurement of resistivity, and the results are shown in Table.9. Winding was formed on the composite soft magnetic material constituted of the ring-shaped heat-treated compact having the small diameter, and magnetic flux density, coercive force, core loss under conditions of magnetic flux density of 0.1 T and frequency of 20 Hz were measured. The results are shown in Table 9.

Using the ring-shaped heat-treated compact having the small external diameter, inductance at 20 kHz was measured while superimposing direct current of 20 A, and AC magnetic permeability was determined. The results are shown in Table 7. Next, winding was formed on the ring-shaped heat-treated compact having the large external diameter, and a reactor having almost constant inductance was produced. The reactor was connected to a switching power supply equipped with a general type of active filter, Efficiencies (%) of output power versus input power of 1000 W and 1500 W were measured. The results are shown in Table 10.

able impurity was prepared. In addition, Mg powder having a mean grain size of 50 μm was prepared.

Firstly, oxidation-treated iron powder was produced by performing oxidation treatment by retaining the pure iron powder at 220° C. for 2 hours in air. A mixed powder was produced by adding the prepared Mg powder to the oxidation-treated iron powder in a proportion of oxidation-treated iron powder: Mg powder=99.8 mass %:0.3 mass %, and mixing the powder. The obtained mixed powder was retained at a temperature of 650° C. under a pressure of $2.7 \times 10^{-4}$ MPa for 1 hour, and further retained at a temperature of 200° C. for 1 hour in air. Thus, Mg-containing iron oxide film-coated iron powder having a coating of deposition film on the surface of iron powder was produced. By the analysis of bonding energies by analyzing the deposition film formed on the surface of Mg-containing oxide film-coated iron powder using an X-ray photoelectron spectroscopic analyzer, it was confirmed that the deposition film was a Mg—Fe—O ternary-based oxide deposition film at least containing (Mg, Fe)O.

Boundary portion between the iron powder and the Mg—Fe—O ternary-based oxide deposition film of the Mg-containing iron-oxide coated iron powder was examined by a method using an Auger electron spectroscopic analyzer. As a result, a sulfur peak of Auger electron spectrum obviously higher than the background constituted of impurity (background) sulfur contained in the central portion of iron powder was obviously detected in the boundary portion between the

TABLE 9

| Type | | Mean grain size of Fe stock powder (μm) | Mg coating treatment | Magnetic properties | | | Resistivity (μΩm) |
| --- | --- | --- | --- | --- | --- | --- | --- |
| | | | | Flux density $B_{10\,KA/m}$ (T) | Coercive force (A/m) | Core loss* (W/kg) | |
| Method of the invention | 7 | 80 | performed | 1.50 | 115 | 62 | 18000 |
| | 8 | 150 | performed | 1.52 | 100 | 68 | 15000 |
| | 9 | 300 | performed | 1.55 | 90 | 75 | 12000 |
| Conventional method 3 | | 150 | not performed | 1.51 | 150 | 1000 | 80 |

Core loss* denotes core loss at flux density of 0.1T and frequency of 20 kHz

TABLE 10

| Type | Flux density $B_{10K}$ (T) | Coercive force Hc (A/m) | Core loss* W1/10k (W/kg) | Permeability 20 A, 20 kHz | Switching power supply | |
| --- | --- | --- | --- | --- | --- | --- |
| | | | | | INPUT POWER (W) | Efficiency (%) |
| EXAMPLE 17 | 1.55 | 90 | 17 | 32 | 1000 | 92.7 |
| | | | | | 1500 | 91.9 |
| CONVENTIONAL EXAMPLE 12 | 1.51 | 150 | 30 | 28 | 1000 | 89.0 |
| | | | | | 1500 | 88.0 |

It can be understood that compared to the composite soft magnetic material produced in conventional method 3, composite soft magnetic materials produced in accordance with the methods 7 to 9 of the present invention have high magnetic flux density, low coercive force, remarkably high resistivity, and therefore has remarkably low core loss which is especially low as the frequency increases.

Example 18

As stock powder, pure iron powder having mean grain size of 70 μm and containing trace amount of sulfur as unavoiddeposition film and iron powder. Therefore, the presence of a sulfur-enriched layer containing a higher concentration of sulfur than that of the core portion of iron powder was confirmed in the boundary portion between the deposition film and iron powder. As a result of observation of texture of the Mg—Fe—O ternary-based oxide deposition film at least containing (Mg, Fe)O formed on the Mg-containing oxide film-coated iron powder using a transmission electron microscope, it was confirmed that the deposition film had an average thickness of 60 nm and maximum grain size of 40 nm.

Prehydrosys alkoxysilane solution added with water and hydrochloric acid and magnesium-alkoxide solution were prepared. By mixing the solutions in such a volumetric ratio that prehydrosys alkoxysilane solution:1 magnesium-alkoxide solution:2, mixed oxide sol-solution of MgO and $SiO_2$ was produced. The mixed oxide sol-solution of MgO and $SiO_2$ was added to, and mixed with the preliminary produced Mg-containing iron oxide-film coated iron powder, such that, in reduced mass of a mixture of MgO and $SiO_2$, 0.2 mass % was added in the mixed powder. By drying the mixed powder by heating at a temperature of 150° C., composite soft magnetic powder of the present invention having coating of MgO—$SiO_2$ composite oxide film composed of $2MgO.SiO_2$ on the surface of Mg-containing iron oxide film-coated iron powder was produced.

The composite soft magnetic powder of the present invention was charged in moulds, and were press-molded into compacts, thereby a plate-shaped compact having a dimension of length: 55 mm, width: 10 mm, and thickness: 5 mm, and ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of relative density, resistivity, and transverse rupture strength, and the results are shown in Table.11. Winding was formed on the composite soft magnetic material constituted of the ring-shaped heat-treated article, and magnetic flux density was measured using a BH tracer. The result is shown in Table 11.

TABLE 11

| Type | Constitution of soft magnetic powder | Relative Density (%) | Transverse rupture strength (MPa) | Flux density B10KA/m | Resistivity (μΩm) |
|---|---|---|---|---|---|
| Composite soft magnetic powder of the invention | Composite soft magnetic powder comprising: Mg-containing iron oxide film-coated iron powder particles that has iron powder particles and Mg—Fe—O ternary-based oxide films which contain at least (Mg, Fe)O and are coated on surfaces of the iron powder particles; and MgO—$SiO_2$ composite oxide films which are composed of $2MgO•SiO_2$ and are coated on surfaces of the Mg-containing iron oxide film-coated iron powder particles. | 98 | 182 | 1.68 | 71 |
| Conventional composite soft magnetic powder. | Composite soft magnetic powder comprising Mg-containing ferrite-coated iron powder particles which have Mg-containing ferrite layers formed by a chemical process, and surfaces of which are further coated with silicone resin and MgO. | 98 | 165 | 1.62 | 10 | diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of relative density, resistivity, and transverse rupture strength, and the results are shown in Table.11. Winding was formed on the composite soft magnetic material constituted of the ring-shaped heat-treated article, and magnetic flux density was measured using a BH tracer. The result is shown in Table 11.

Conventional Example 13

Mg-containing ferrite-coated iron powder was prepared by forming Mg-containing ferrite film on the surface of pure iron powder through chemical process. Conventional mixed powder was produced by adding silicone resin and MgO powder to the Mg-containing ferrite-coated iron powder so as to have a mixing ratio of silicone resin: 0.14, MgO: 0.06, and the balance consisting of Mg-containing ferrite-coated iron powder. The obtained conventional mixed powder was charged in the moulds, and was press-molded into compacts, thereby a plate-shaped compact having a dimension of length: 55 mm, width: 10 mm, and thickness: 5 mm, and ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of relative density, resistivity, and transverse rupture strength, and the results are shown in Table.11. Winding was formed on the composite soft magnetic material constituted of the ring-shaped heat-treated article, and magnetic flux density was measured using a BH tracer. The result is shown in Table 11.

From the results shown in Table 1.1, it is understood that compared to the composite soft magnetic materials made of the conventional composite soft magnetic powder, composite soft magnetic materials produced using the composite soft magnetic powders of the present invention have excellent transverse rupture strength, magnetic flux density, and resistivity.

As stock powder, pure iron powder having mean grain size of 70 μm and containing trace amount of sulfur as unavoidable impurity was prepared. Oxidation-treated iron powder was produced by performing oxidation treatment by retaining the pure iron powder at 220° C. for 2 hours in air. In addition, Mg powder having a mean grain size of 50 μm was prepared. A mixed powder was produced by adding the prepared Mg powder to the oxidation-treated iron powder in a proportion of oxidation-treated iron powder: Mg powder=99.8 mass %:0.2 mass %, and mixing the powder. By heating the obtained mixed powder at a temperature of 650° C. under a pressure of $1\times10^{-4}$ MPa for 1 hour while tumbling the mixed powder, Mg-containing iron oxide film-coated iron powder having a coating of deposition film on the surface of iron powder was produced. Thickness and maximum grain size of the deposition film formed on the surface of the iron powder were determined by the observation of texture of a section of the deposition film using a transmission electron microscope. As a result, it was confirmed that the deposition film had a thickness of 40 nm and maximum grain size of 20 nm.

The deposition film formed on the surface of Mg-containing oxide film-coated iron powder was analyzed using an X-ray photoelectron spectroscopic analyzer. Based on the analysis of bonding energies, it was confirmed that fine metallic Fe particles were dispersed in the matrix of deposition film, and that outermost surface of the deposition film dispersing fine metallic Fe particles in its matrix was composed of MgO, Concentration distributions of Mg, O, and Fe in depth direction of the deposition film were examined using an Auger electron spectroscopic analyzer. As a result, it was confirmed that: the deposition film was a Mg—Fe—O ternary-based oxide deposition film dispersing fine metallic Fe particles in its matrix; the Mg—Fe—O ternary-based oxide deposition film had concentration gradients where Mg and O decrease from the surface towards the interior direction, and Fe increases towards the interior direction; and the outermost surface of the deposition film was composed of MgO. Sulfur distribution in boundary portion between the iron powder and the Mg—Fe—O ternary-based oxide deposition film was examined by a method using an Auger electron spectroscopic analyzer. As a result, the presence of a sulfur-enriched layer containing a higher concentration of sulfur than that of the core portion of iron powder was confirmed in the boundary portion between the deposition film and the iron powder.

Prehydrosys alkoxysilane solution added with water and hydrochloric acid and magnesium-alkoxide solution were prepared. By mixing the solutions in such a volumetric ratio that prehydrosys alkoxysilane solution:1 magnesium-alkoxide solution:2, mixed oxide sol-solution of MgO and $SiO_2$ was produced. The mixed oxide sol-solution of MgO and $SiO_2$ was added to, and mixed with the preliminary produced Mg-containing iron oxide-film coated iron powder, such that, in reduced mass of a mixture of MgO and $SiO_2$, 0.2 mass % was added in the mixed powder. By drying the mixed powder by heating at a temperature of 150° C., composite soft magnetic powder of the present invention having coating of MgO—$SiO_2$ composite oxide film composed of 2MgO.$SiO_2$ on the surface of Mg-containing iron oxide film-cpated iron powder was produced.

The composite soft magnetic powder of the present invention was charged in moulds, and were press-molded into compacts, thereby a plate-shaped compact having a dimension of length: 55 mm, width: 10 mm, and thickness: 5 mm, and ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of relative density, resistivity, and transverse rupture strength, and the results are shown in Table.12. Winding was formed on the composite soft magnetic material constituted of the ring-shaped heat-treated article, and magnetic flux density was measured using a BH tracer. The result is shown in Table 12.

Conventional Example 14

Mg-containing ferrite-coated iron powder was prepared by forming Mg-containing ferrite film on the surface of pure iron powder through chemical process. Conventional mixed powder was produced by adding silicone resin and MgO powder to the Mg-containing ferrite-coated iron powder so as to have a mixing ration of silicone resin: 0.14, MgO: 0.06, and the balance consisting of Mg-containing ferrite-coated iron powder. The obtained conventional mixed powder was charged in the moulds, and was press-molded into compacts, thereby a plate-shaped compact having a dimension of length: 55 mm, width: 10 mm, and thickness: 5 mm, and ring-shaped compact having a dimension of external diameter: 35 mm, internal diameter: 25 mm, and height: 5 mm were formed. The obtained compacts were heat-treated under conditions of a nitrogen atmosphere, temperature: 500° C., and retention time: 30 minutes. Thus, composite soft magnetic materials constituted of a plate-shaped or ring-shaped heat-treated article were produced. The composite soft magnetic material constituted of the plate-shaped heat-treated article was subjected to measurement of relative density, resistivity, and transverse rupture strength, and the results are shown in Table.12. Winding was formed on the composite soft magnetic material constituted of the ring-shaped heat-treated article, and magnetic flux density was measured using a BH tracer. The result is shown in Table 12,

TABLE 12

| Type | Constitution of soft magnetic powder | Relative Density (%) | Transverse rupture strength (MPa) | Flux density B10KA/m | Resistivity (μΩm) |
|---|---|---|---|---|---|
| Composite soft magnetic powder of the invention | Composite soft magnetic powder comprising Mg-containing iron oxide film-coated iron powder that has iron particles surface-coated with Mg—Fe—O ternary-based oxide films dispersing ultra-fine Fe grains in its matrix, wherein surfaces of particles of the Mg-containing iron oxide film-coated iron powder are further coated with MgO—$SiO_2$ composite oxide films composed of 2MgO—$SiO_2$. | 98 | 182 | 1.69 | 73 |
| Conventional composite soft magnetic powder. | Composite soft magnetic powder comprising Mg-containing ferrite-coated iron powder particles which have Mg-containing ferrite layers formed by a chemical process, | 98 | 165 | 1.62 | 10 |

TABLE 12-continued

| Type | Constitution of soft magnetic powder | Relative Density (%) | Transverse rupture strength (MPa) | Flux density B10KA/m | Resistivity (μΩm) |
|---|---|---|---|---|---|
| | wherein particle surfaces of the Mg-containing ferrite-coated iron powder are coated with silicone resin and MgO. | | | | |

From the results shown in Table 12, it is understood that compared to the composite soft magnetic materials made of the conventional composite soft magnetic powder, composite soft magnetic materials produced using the composite soft magnetic powders of the present invention have excellent transverse rupture strength, magnetic flux density, and resistivity.

INDUSTRIAL APPLICABILITY

By producing composite soft magnetic materials using the Mg-containing oxide film-coated iron powder of the present invention, it is possible to produce, stably, at low cost, composite soft magnetic materials having high resistivity, low eddy current loss, low coercive force, and low hysteresis loss. Therefore, the present invention has an excellent effect in terms of electric and electronic industries.

Where a composite soft magnetic materials is produced by press molding Mg-containing oxide film-coated iron powder of the present invention having Mg—Fe—O ternary-based oxide deposition film dispersing extremely fine metallic Fe particles in the matrix, the Mg—Fe—O ternary-based oxide deposition film has high toughness by the presence of extremely fine metallic Fe particles dispersed in the matrix, and is scarcely broken down during the press molding of the Mg-containing oxide film-coated iron powder. Therefore, the obtained composite soft magnetic material has high resistivity, and low eddy current loss, low coercive force, and low hysteresis loss. In the present invention, it is possible to produce composite soft magnetic materials having such properties. Therefore, the present invention has effective contribution to electric and electronic industries.

Where a composite soft magnetic material is produced by press molding deposition film-coated iron powder of the present invention, the deposition film has high toughness by the presence of fine iron phosphide particles dispersed in the matrix, and is scarcely broken down during the press molding of the deposition film-coated iron powder. Therefore, the obtained composite soft magnetic material has high resistivity, and low eddy current loss, low coercive force, and low hysteresis loss. In the present invention, it is possible to produce composite soft magnetic materials having such properties. Therefore, the present invention has effective contribution to electric and electronic industries.

By producing composite soft magnetic materials using oxide deposition film-coated iron silicide powder of the present invention, it is possible to produce, stably at low cost, composite soft magnetic materials having high resistivity, and low eddy current loss, low coercive force, and low hysteresis loss. Therefore, the present invention has effective contribution to electric and electronic industries, By producing composite soft magnetic materials using oxide deposition film-coated iron-based Fe—Si-based powder of the present invention, it is possible to produce, stably at low cost, composite soft magnetic materials having high resistivity, and low eddy current loss, low coercive force, and low hysteresis loss. Therefore, the present invention has effective contribution to electric and electronic industries.

According to the present invention, it is possible to provide composite sift magnetic materials having high strength, high resistance, and high magnetic flux density. Therefore, the present invention has effective contribution to electric and electronic industries.

The invention claimed is:

1. A deposition film-coated iron powder comprising iron particles and deposition films comprising Mg, Fe, P, and O coated on surfaces of the iron particles, wherein
    the deposition films comprise Mg—Fe—P—O quaternary-based phosphates composed of Mg, Fe, P, and O; Mg—Fe—O ternary-based oxides composed of Mg, Fe, and O; and fine iron phosphide grains dispersed in matrices thereof; and
    the Mg—Fe—P—O quaternary-based Mg—Fe—O ternary-based oxides include crystalline Mg—O dissolving wustite type phase.

2. A deposition film-coated iron power according to claim 1,
    wherein the deposition films have microcrystalline structures having a grain size of 200 nm or less.

3. A composite soft magnetic material having high resistivity, which has been produced using a deposition film-coated iron powder according to claim 1, wherein
    the deposition film-coated iron powder according to claim 1 is bonded by silicon oxide and/or aluminum oxide such that the composite soft magnetic material has an iron particle phase and train boundary phase surrounding the iron particle phase, where the grain boundary phase contains oxide including a MgO-dissolving wustite type phase.

4. A deposition film-coated iron power according to claim 1,
    wherein the iron powder has a mean grain size in a range from 5 to 500 μm.

5. A deposition film-coated iron power according to claim 1,
    wherein the deposition films have a thickness in a range from 5 to 500 nm.

6. A deposition film-coated iron power according to claim 1,
    wherein the Mg of the Mg—Fe—P—O quaternary-based phosphates and the Mg of Mg—Fe—O ternary-based oxides are partially replaced by one or more elements selected from the group consisting of Al, Si, Ni, Mn, Zn, Cu, and Co.

* * * * *